United States Patent
Abu-Ageel

(10) Patent No.: US 7,318,644 B2
(45) Date of Patent: Jan. 15, 2008

(54) COMPACT PROJECTION SYSTEM INCLUDING A LIGHT GUIDE ARRAY

(76) Inventor: Nayef M. Abu-Ageel, 45K Rolling Green Dr., Fall River, MA (US) 02720

( * ) Notice: Subject to any disclaimer, the term of this patent is extended or adjusted under 35 U.S.C. 154(b) by 76 days.

(21) Appl. No.: 11/066,616

(22) Filed: Feb. 25, 2005

(65) Prior Publication Data

US 2005/0286123 A1 Dec. 29, 2005

Related U.S. Application Data

(63) Continuation-in-part of application No. 10/458,390, filed on Jun. 10, 2003.

(60) Provisional application No. 60/548,814, filed on Feb. 27, 2004, provisional application No. 60/548,293, filed on Feb. 27, 2004, provisional application No. 60/548,619, filed on Feb. 27, 2004.

(51) Int. Cl.
*G02F 1/13357* (2006.01)
*G03B 21/14* (2006.01)

(52) U.S. Cl. ............... 353/20; 353/122; 353/102; 362/561; 349/62; 385/146

(58) Field of Classification Search .......... 353/32, 353/20, 94, 122, 102; 349/57, 62; 362/555, 362/558, 554, 552, 561; 348/800–804; 385/146
See application file for complete search history.

(56) References Cited

U.S. PATENT DOCUMENTS

| | | | | |
|---|---|---|---|---|
| 4,735,495 A | * | 4/1988 | Henkes | 349/62 |
| 5,347,433 A | * | 9/1994 | Sedlmayr | 362/554 |
| 5,594,526 A | * | 1/1997 | Mori et al. | 355/67 |
| 6,008,785 A | * | 12/1999 | Hewlett et al. | 345/85 |
| 6,318,863 B1 | * | 11/2001 | Tiao et al. | 353/31 |
| 6,343,862 B1 | * | 2/2002 | Sawai et al. | 353/1 |
| 6,424,786 B1 | * | 7/2002 | Beeson et al. | 385/146 |
| 6,520,649 B1 | * | 2/2003 | Lamvik | 353/94 |
| 6,969,177 B2 | * | 11/2005 | Li et al. | 362/19 |
| 2002/0196414 A1 | * | 12/2002 | Manni et al. | 353/31 |
| 2003/0025842 A1 | * | 2/2003 | Saccomanno | 348/758 |
| 2003/0214631 A1 | * | 11/2003 | Svardal et al. | 353/8 |
| 2004/0263989 A1 | * | 12/2004 | Cobb et al. | 359/634 |

FOREIGN PATENT DOCUMENTS

JP 11-160791 A * 6/1999

* cited by examiner

*Primary Examiner*—Andrew T Sever
(74) *Attorney, Agent, or Firm*—Gavrilovich, Dodd & Lindsey LLP

(57) ABSTRACT

An optical projection system comprises a light source, a substantially planar optical element array for receiving light emitted from the light source, and a display panel for selectively outputting light from the optical element array. The optical element array includes an optically transmissive substrate material and a plurality of optical micro-elements formed on at least one surface of the substrate material. The display panel has a plurality of pixels for selectively outputting light output from the optical element array. The micro-elements can include micro-lenses, micro-prisms, micro-waveguides, or any suitable combination of the foregoing, configured to alter the characteristics of light emitted from the light source to create a desired illumination source.

17 Claims, 74 Drawing Sheets

COMPACT PROJECTION SYSTEM INCLUDING A LIGHT GUIDE ARRAY

RELATED APPLICATIONS

This application is a continuation-in-part of U.S. patent application Ser. No. 10/458,390 filed on Jun. 10, 2003, titled "Light Guide Array, Fabrication Methods, and Optical System Employing Same". This application also claims the benefit of U.S. Provisional Application Nos. 60/548,814, 60/548,293 and 60/548,619, all filed on Feb. 27, 2004. It is also related to U.S. patent application Ser. No. 11/066,605, titled "Compact Polarization Conversion System For Optical Displays", filed on Feb. 25, 2005 and U.S. patent application Ser. No. 11/067,591, titled "Light Recycler And Color Display System Including Same", filed on Feb 25, 2005. The subject matter of the aforementioned applications is hereby incorporated by reference as though set forth in full.

TECHNICAL FIELD

The present invention relates generally to projection systems utilizing optical components that convert non-homogeneous light from a light source into a homogeneous and collimated illumination over a specific area. More particularly, the invention relates to an optical projection system, including one or more optical element arrays for delivering uniform and collimated light to an area such as the input of a light valve or display panel having plural pixels.

BACKGROUND

Light valves based on liquid crystal display (LCD) technology as well as MEMS (micro-electro-mechanical systems) technology have been used in various applications which include but are not limited to projectors, projection TVs, camcorders, digital still cameras, internet appliances, cell phones and headsets. In most of light valve applications, low cost, compactness and light weight of illumination systems are needed. In addition, a uniform, bright and stable image is an important requirement in such applications.

FIGS. 1A-1C show cross-sectional views of known projection systems 10, 20 and 220 that utilize light guide integrators and lens plates in order to provide uniform light to display panels 17, 27 and 227. In FIG. 1A, the input light 13 is focused into the entrance aperture of a straight light guide integrator 14. Light beam 15a exits light guide integrator 14 more uniform and homogeneous across the exit aperture in terms of spatial light intensity. The exit aperture of light guide integrator 14 is imaged onto the image gate of display panel 17 through a relay lens 16a. A set of lenses may be used to perform the function of relay lens 16a and collimate the light beam 15a. The light beam which passes through a transmissive display panel 17 (FIG. 1A) or gets reflected by a reflective display panel (not shown) is focused by a field lens 16b into the aperture of a projection lens 18, which in turn projects the image displayed on the display panel 17 onto a screen 19. In addition to the shown components, polarizer and analyzer are usually inserted before and after display panel 17, 27 and 227, respectively, in a projection system 10, 20 and 220 that utilizes liquid crystal display panels.

Light guide 14 can be straight 14a as shown in FIG. 1D, tapered 14b as shown in FIG. 1E, asymmetrical 14c as shown in FIG. 1F and hexagonal 14d as shown in FIG. 1G. In addition, light guides 14a, 14b, 14c and 14d can be solid glass rods with polished surfaces or hollow tunnels with reflective surfaces. The light enters the entrance aperture 1, 3 and 6 and emerges from the exit aperture 2, 4 and 7 more uniform after experiencing multiple reflections, in case of hollow light tunnels, or multiple total internal reflections, in case of solid light rods. The light uniformity at the exit aperture increases with the increase in light guide 14a, 14b, 14c and 14d length L. As shown in FIG. 1D, the entrance 1 and exit 2 apertures of straight light guide 14a have equal $W_1 \times W_2$ cross-sectional areas. Tapered light guides 14b of FIG. 1E deliver uniform and more collimated light in comparison with straight light guides of FIG. 1D. A tapered light guide 14b usually has unequal cross-sectional areas of its entrance $A_1$ and exit $A_2$ apertures. Entrance 3 and exit 4 apertures can have unequal sizes and similar aperture shapes such as square, rectangular or circular as well as unequal sizes and different aperture shapes. Such light guides have been described in U.S. Pat. No. 6,332,688, of Magarill and U.S. Pat. No. 4,765,718, of Henkes, which are both incorporated by reference. Asymmetrical light guides 14c of FIG. 1F are used to compensate for Keystone distortion, illumination overfill regions, and illumination drop-off regions. Asymmetrical light guides have been described in U.S. Pat. No. 6,517,210, of Peterson, which is hereby incorporated by reference. In U.S. Pat. No. 5,059,013, which is also incorporated by reference, Kantilal Jain places a quartz diffuser 8 with a thickness td at the exit aperture 7 of a hexagonal light guide 14d as shown in FIG. 1G in order to convert light emerging from the light guide exit aperture into self luminous light (i.e. each point across light beam emits light in a range of directions or numerical aperture). Disadvantages of projection system that uses a diffuser at the exit aperture of a light guide are lack of compactness as well as the difficulty to control the direction and/or shape of diffused light with most of available diffusers, thus, leading to inefficient light coupling and reduced brightness. In general, known projection systems 10 which utilize light guides 14a, 14b, 14c and 14d to uniformize light suffer from lack of compactness and light losses due to lack of control over the numerical aperture of output light.

In FIGS. 1B-1C, the parabolic 21 and 221 mirror is used to collimate the light emitted by the light source 22 and 222. Lens arrays 23 and 223 divide the substantially collimated input light beam 24a and 224a into sub-beams 24b and 224b. Condenser lenses 25a and 225 focus, in a superimposing manner, the light output from each micro-lens onto the display panel 27 and 227, and in that the width/height ratio of each lens in lens arrays 23a, 23b and 223 corresponds to the width/height ratio of the display panel cross-section in the xy-plane. The light beams which pass through a transmissive display panel 27 and 227 (FIGS. 1B-1C) or get reflected by a reflective display panel (not shown) are focused by field lenses 25b and 228 into the apertures of projection lenses 28 and 229, which in turn project the image displayed on the display panels 27 and 227 onto screens 29 and 230. In projection system 20 of FIG. 1B, two separate lens arrays 23a and 23b are used rather than a single lens array 223 (FIG. 1C). Lens array 223 typically has large number of small-size lenses when compared to lens array 23a and 23b, which requires more precise alignment of lenses on both sides of lens array 223, thus, resulting in difficult manufacturing and more expensive lens arrays 223. Disadvantages of projection systems 20 and 220 include lack of compactness, need for alignment of both plates 23a and 23b and difficulty to control the cone angle distribution (i.e. numerical aperture) of output light 24*b* and 224*b* over light valve area, limited light coupling and limited display brightness.

Known projection systems and light integrating technologies suffer from inefficiency in light coupling and lack of compactness. Therefore, there is a need for compact, light weight, efficient and cost-effective illumination systems that provide control of spatial distribution of light in terms of intensity and angle over a certain area such as the active area of a display panel. Such illumination systems enable projection systems with smaller light valves (≦0.5″) leading to more compact and less expensive projection systems.

SUMMARY

The present invention provides a compact, light weight, efficient and cost-effective projection system utilizing an illumination system capable of producing an output light beam of selected cross-sectional spatial distribution in terms of intensity and angle. Such an illumination system can efficiently couple light from sources having wide variety of sizes and shapes into light valves of various shapes and sizes.

According to an aspect of the invention, a projection system uses one or more optical element arrays, light guides and lenses to form a projector illumination system which is capable of providing a desired spatial distribution of output light in terms of angle and intensity over a predefined area, such as the image gate of a display panel.

Other embodiments, features, aspects, advantages, systems and methods of the invention will be or will become apparent to one with skill in the art upon examination of the following drawings and detailed description. It is intended that all such additional embodiments, features and advantages be included within this description, be within the scope of the invention, and be protected by the accompanying claims.

BRIEF DESCRIPTION OF THE DRAWINGS

It is to be understood that the drawings are solely for purposes of illustration and not as a definition of the limits of the invention. Furthermore, it is to be understood that the drawings are not necessarily drawn to scale and that, unless otherwise stated, they are merely intended to conceptually illustrate the systems, structures and methods described herein. In the figures, like reference numerals designate corresponding parts throughout the different views.

DETAILED DESCRIPTION

Figure 1A:
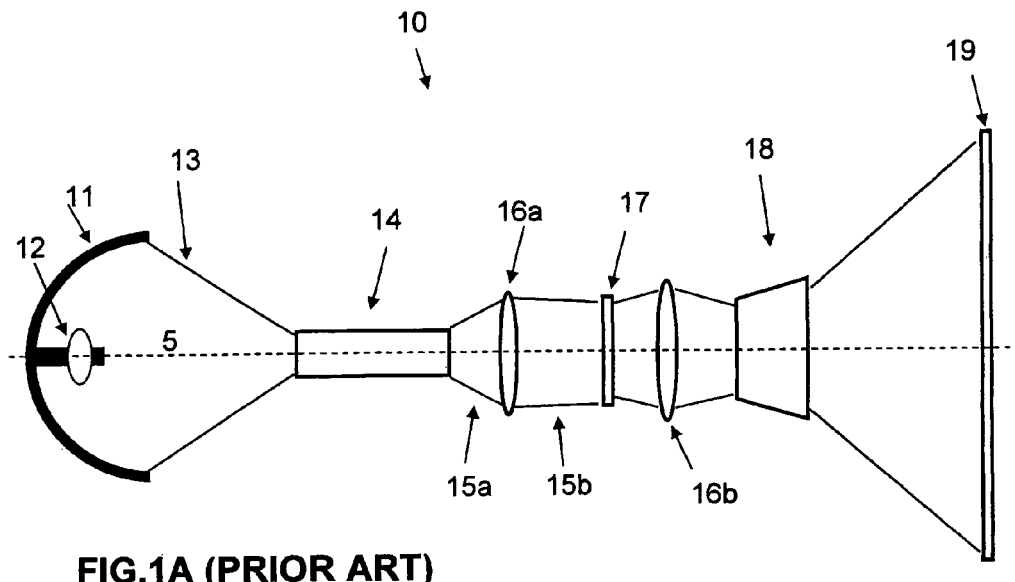
FIG. 1A shows a cross-sectional view of a prior art projection system that utilizes a conventional light guide to provide uniform light distribution.

A first exemplary projection system architecture uses a homogenizer, which consists of a light guide and at least one optical element array. The optical element array splits a light beam into a large number of sub-beams, which mix in a superimposing manner within a light guide leading to a uniform light distribution across the exit aperture of the light guide.

A second exemplary projection system architecture uses optical element arrays to split a light beam into a large number of sub-beams and uses lenses to focus these sub-beams on a certain area in a superimposing manner, resulting in a uniform light distribution over the illuminated area.

A third exemplary projection system architecture uses one or more optical element arrays to provide a selected spatial distribution of light in terms of angle and intensity across the exit aperture of an optical element array.

In the projection systems disclosed herein, an optical element array consists of a large number of optical microelements, such as micro-lenses, prisms, and waveguides (WGs), and/or the like, which can split an input light beam into a large number of output sub-beams, as well as provide control over the distribution and cone angle (numerical aperture) of a light beam.

Turning now to the drawings, and in particular to FIGS. 2A-2F, these figures show cross-sectional views of projection systems 30, 50, 80, 100, 110 and 120 that use transmissive display panels 37, 58 and 115 such as liquid crystal display panels as well as reflective display panels 67, 108 and 125. Examples of reflective panels include reflective LCOS (liquid crystal on silicon) panels and DMD (digital micro mirror) panels. The projection systems 30, 50, 80 100, 110 and 120 include light source 12 housed in an elliptical 11 mirror, homogenizer 34, optical element arrays 54, 104, 112, and 122, relay lenses 36, 66, 114 and 124, collimating lenses 56 and 106, and display panels 37, 58, 67, 108, 115 and 125. When a liquid crystal display (LCD) panel is used in projection systems 30, 50, 80, 100, 110 and 120, two additional components, polarizer and analyzer, need to be inserted before and after the LCD panel, respectively. In projection systems 30, 50, 80, 100, 110 and 120, light sources housed in parabolic mirrors or other type of mirrors can also be used instead of light sources 12 housed in elliptical mirrors 11.

Figure 2A:
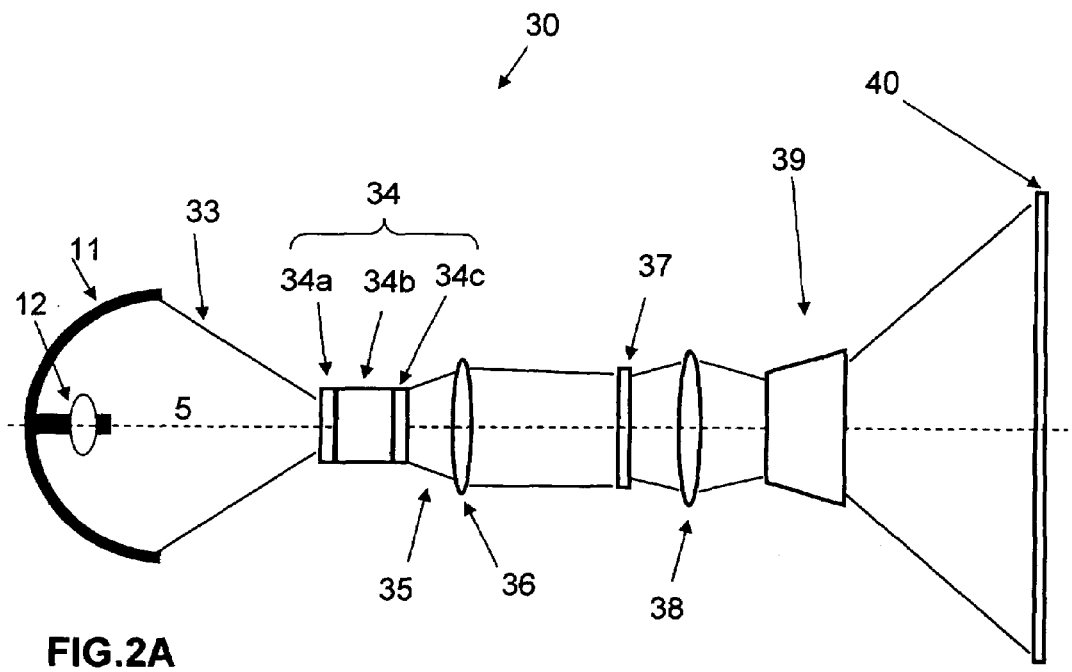
FIG. 2A shows a cross-sectional view of a projection system utilizing a homogenizer to provide uniform light distribution to a transmissive display panel in accordance with a first embodiment of the present invention.
Figure 2B:
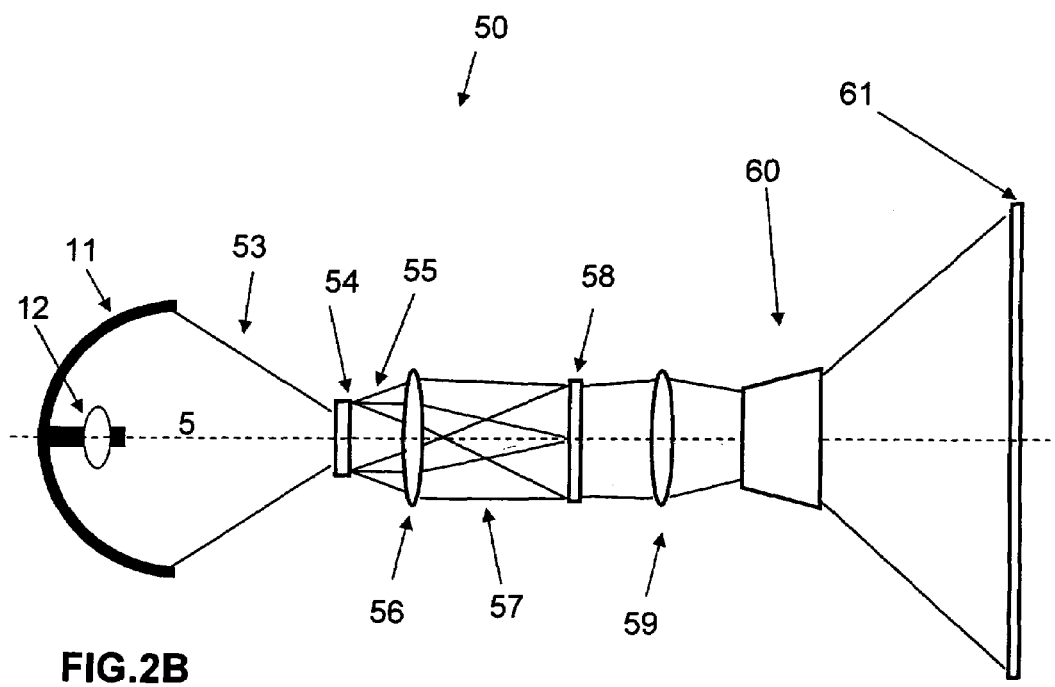
FIG. 2B shows a cross-sectional view of a projection system utilizing an optical element array and a focusing lens to provide uniform light distribution to a transmissive display panel in accordance with a second embodiment of the present invention.
Figure 2C:
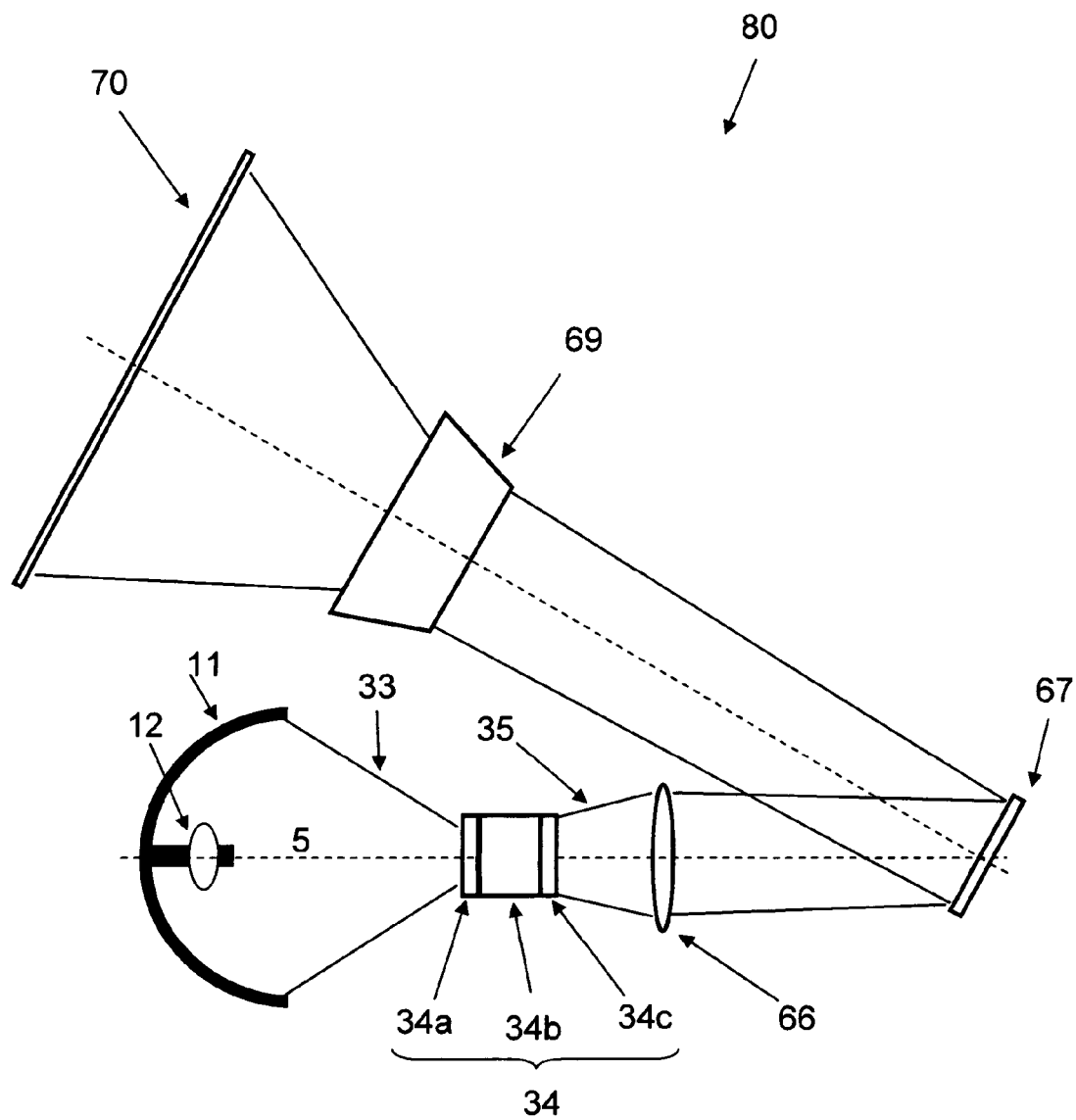
FIG. 2C shows a cross-sectional view of a projection system utilizing a homogenizer to provide uniform light distribution to a reflective display panel in accordance with a third embodiment of the present invention.

As shown in FIGS. 2A and 2C, the input light 33 is focused into the entrance aperture of homogenizer 34. Light beam 35 exits homogenizer 34 more uniform and homogeneous across the exit aperture in terms of light intensity, color and view angle. The exit aperture of homogenizer 34 is imaged onto the image gate (entry face) of display panels 37 and 67 through a relay lenses 36 and 66. The display panels 37 and 67 include a multitude of individual lights valves for selectively outputting light that is incident on their respective image gates areas. The light beam which passes through the light valve 37 is focused by a field lens 38 into the aperture of a projection lens 39, which in turn projects the image displayed on the light valve 37 onto a screen 40. In projection system of FIG. 2C, the image displayed on the light valve 67 is projected onto the screen 70 through a projection lens 69 and without using a field lens.

Homogenizer 34 consists of optical element array 34*a*, light guide 34*b* and optional optical element array 34*c* as shown in FIG. 2A. These components are attached together with a thin layer of an optical adhesive which can be applied to the whole or part of the surface areas of optical element arrays 34*a* and 34*b*. Subsequently, the optical element arrays 34*a* and 34*b* are bonded to both sides of light guide 34*b* and finally the adhesive is cured. Perspective views of the homogenizer 34 after and before the assembly are shown in FIG. 2G and FIG. 2H, respectively.

Light guide 34*b* can be a solid light guide made of optically transmissive material such as glass with polished surfaces or hollow light guide with reflective sidewalls and can also be straight (FIG. 1C) or tapered (FIG. 1D) light guide. The length of light guide ranges from few millimeters to tens of millimeters depending on the size of its entrance and exit apertures, cone angle of light propagating within the light guide 34b and degree of desired light uniformity. The entrance and exit apertures of light guide 34b are independent in terms of size and shape and can have different sizes and different shapes such as square, rectangular, circular, trapezoidal, polygonal, asymmetrical and even irregular shapes.

Figure 1B:
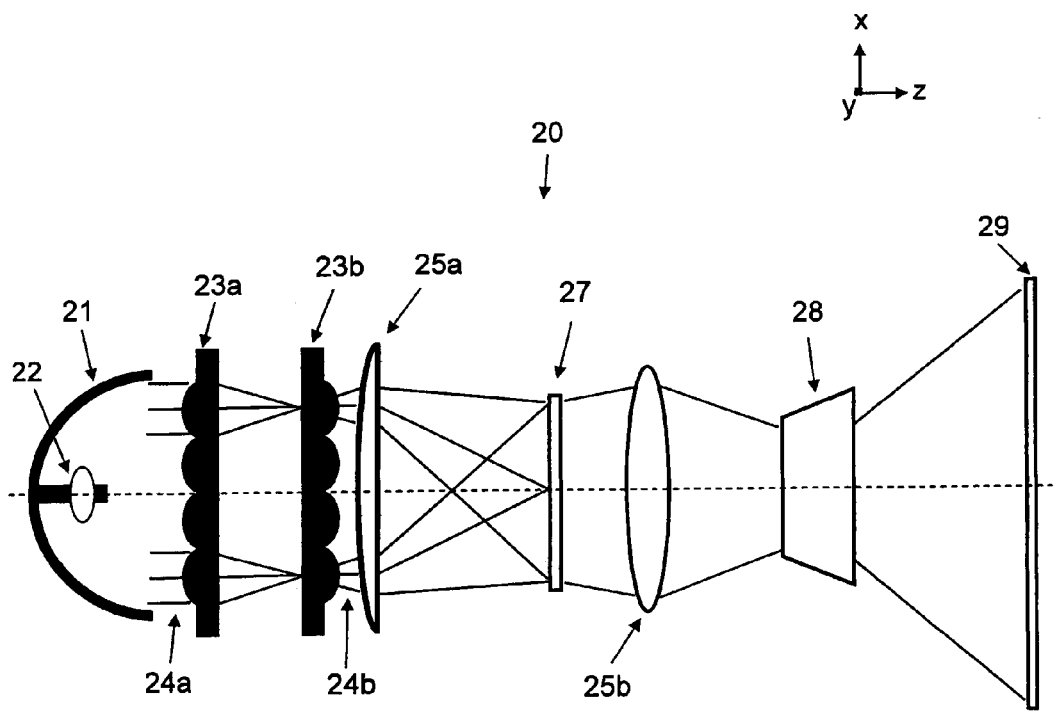
FIG. 1B shows a cross-sectional view of a prior art projection system that utilizes two lens-array plates to provide uniform light distribution.
Figure 1C:
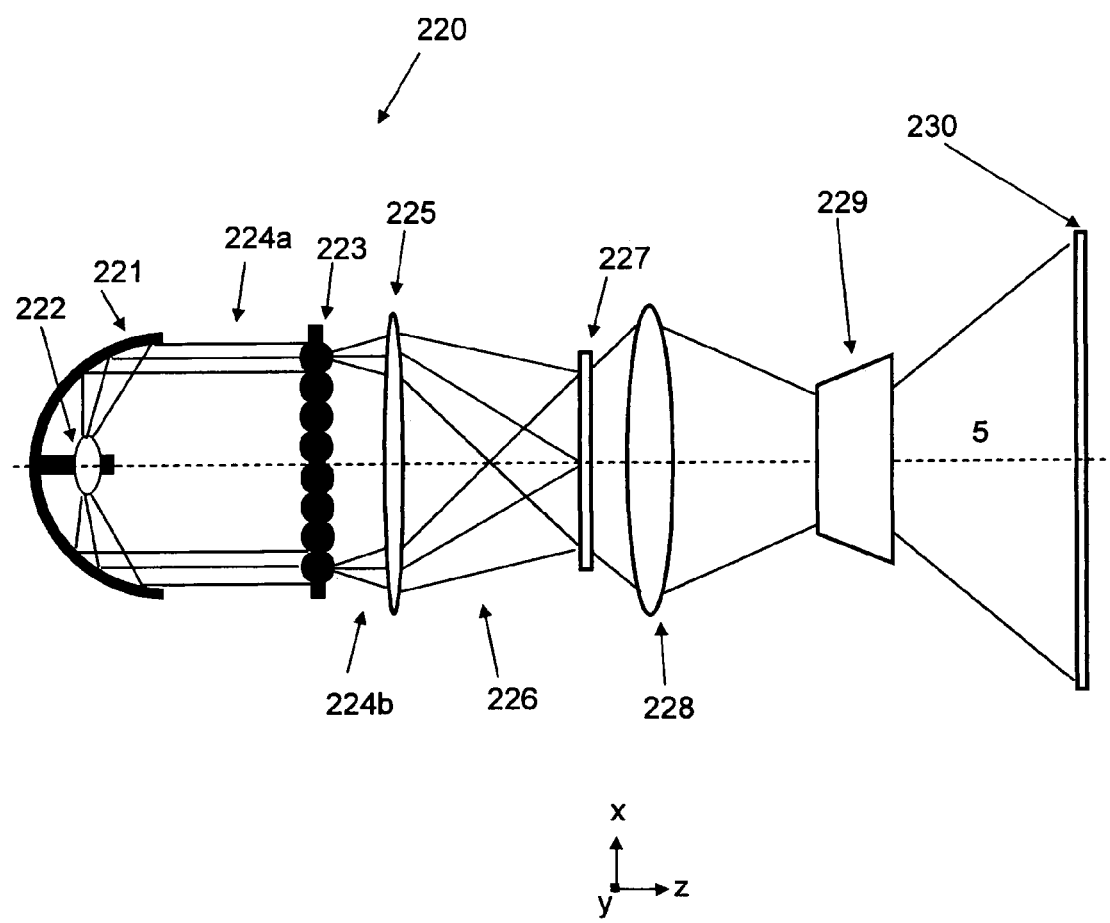
FIG. 1C shows a cross-sectional view of a prior art projection system that utilizes a single lens-array plate to provide uniform light distribution.
Figure 1D:
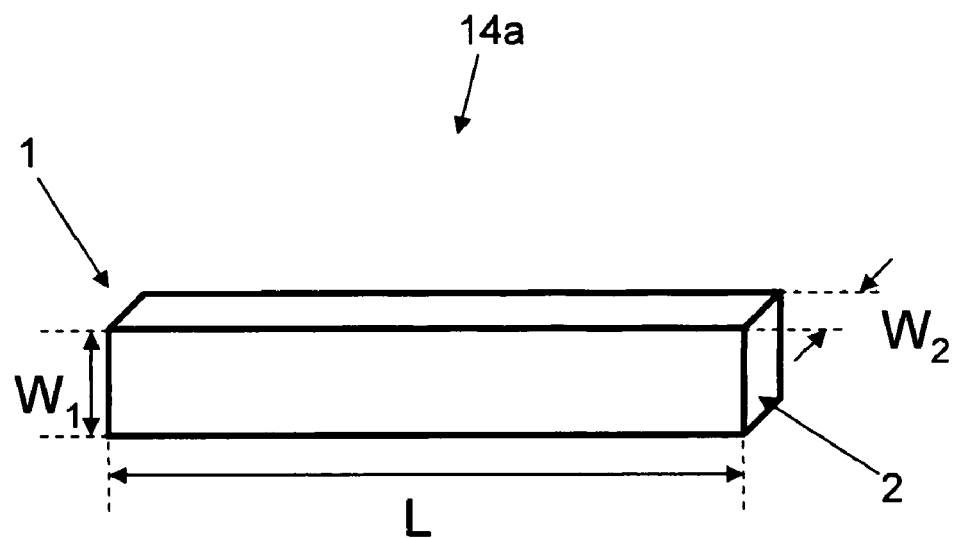
FIG. 1D shows a side perspective view of a prior art straight light guide. The entrance and exit apertures have $W_1 \times W_2$ dimensions.
Figure 1E:
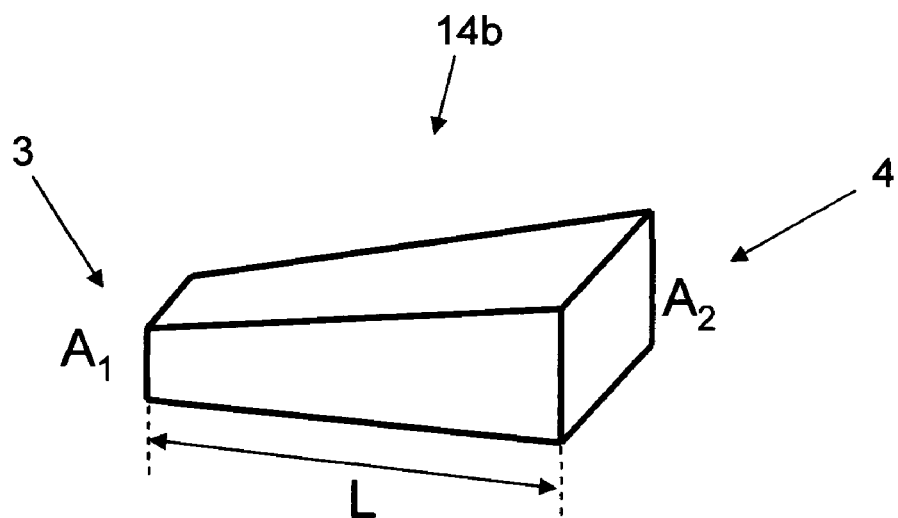
FIG. 1E shows a side perspective view of a prior art tapered light guide. The areas of entrance and exit apertures are $A_1$ and $A_2$, respectively.
Figure 1F:
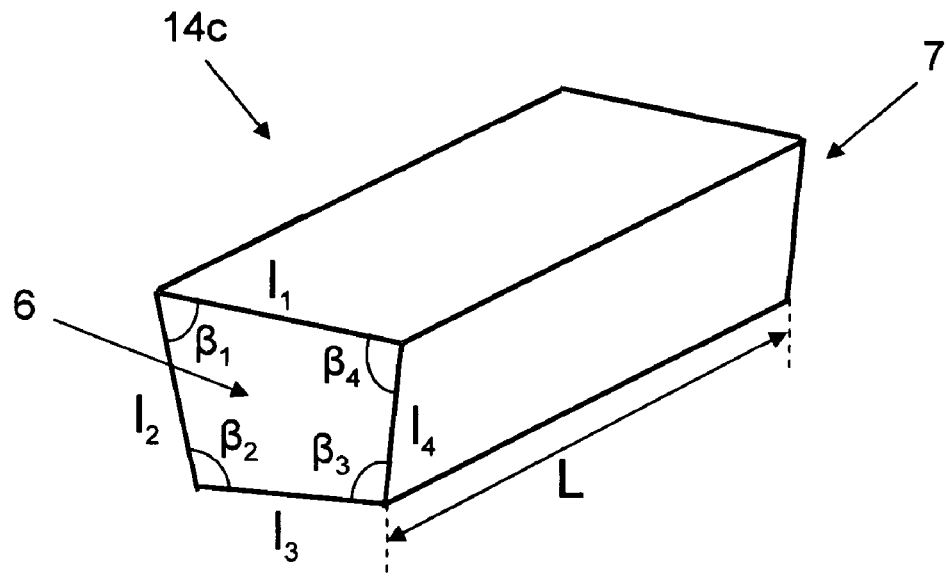
FIG. 1F shows a perspective view of a prior art asymmetrical light guide.
Figure 1G:
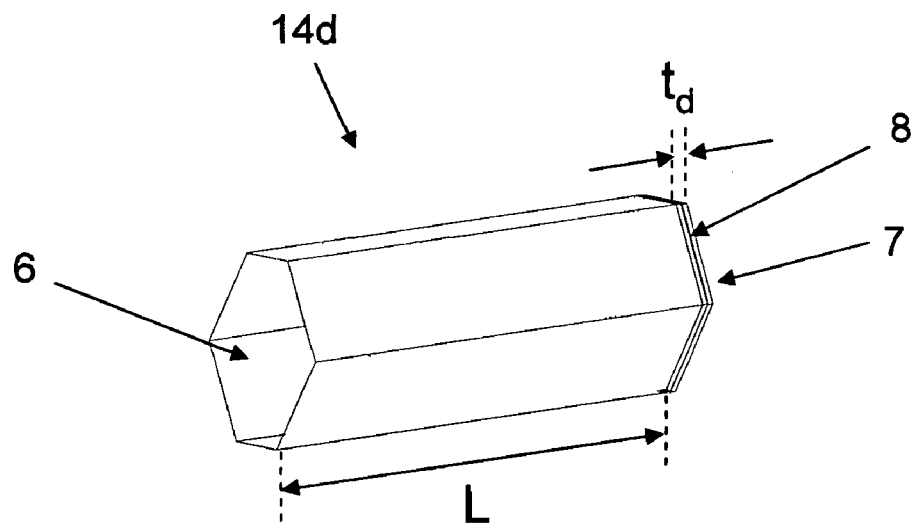
FIG. 1G shows a perspective view of a prior art hexagonal light guide with a diffuser attached to its exit aperture.

Asymmetrical light guides 14c, such as nonrectangular and trapezoidal guides as shown in FIG. 1F, can be used in homogenizer 34 and 440 to compensate for Keystone distortion, illumination overfill regions, and illumination drop-off regions, which occur when the display panel is tilted obliquely from the optical axis 5 of the system as shown in FIG. 2C. Thus, the use of asymmetrical light guides results in reducing light loss, increasing brightness, and enhancing brightness uniformity across the display panel surface area. Design parameters of asymmetrical light guides 14c include light guide length L, lengths $l_1$, $l_2$, $l_3$ and $l_4$ of input aperture and those of exit aperture, as well as angles $\beta_1$, $\beta_2$, $\beta_3$ and $\beta_4$ of input aperture and those of exit aperture.

Cross-sectional areas (in the xy-plane of FIGS. 2G-2H) of optical element arrays 34a and 34b are preferably made to match the shapes and sizes of the entrance and exit apertures of light guide 34b, respectively. The three components 34a, 34b and 34c of light guide 34 of FIG. 2G can be integrated together on one piece of optically transmissive substrate. A cross-sectional view of an integrated homogenizer 440 is shown in FIG. 2K. In this case, optical element arrays 440a and 440c are fabricated on both sides of light guide 440b. The light guides 34b and 440b typically have the same cross section aspect ratio as the display panel used in the projection system.

Keystone distortion, illumination overfill regions, and illumination drop-off regions can be corrected by using rectangular 34b, 440b rather than asymmetrical light guide in homogenizer 34 and 440 coupled with optical element arrays 34a and 440a designed to compensate for Keystone distortion, illumination overfill regions, and illumination drop-off regions. In this case, design parameters of micro-elements within optical element arrays 34a and 440a include size of micro-elements (entrance aperture, exit aperture and length), shape of micro-elements entrance and exit apertures (square, rectangular, circular, trapezoidal, asymmetrical and irregular shapes), taper of sidewalls along micro-element length, orientation of each micro-element with respect to the optical element array, and distribution of micro-elements over the optical element array surface area. Since optical element array 34a and 440a are fabricated with IC like process, it is much easier and less expensive to use optical element array 34a and 440a to compensate for Keystone distortion, illumination overfill regions, and illumination drop-off regions. These homogenizers have the advantage of using simpler and less expensive rectangular rather than more complex asymmetrical light guides to compensate for Keystone distortion, illumination overfill regions, and illumination drop-off regions, thus, reducing light loss, increasing brightness, and enhancing brightness uniformity across the display panel surface area at a lower cost.

The operation of the homogenizer 34 and 440 is described as follows. The light beam 33 is received first by the optical element array 34a and 440a which divides the light beam into a number of sub-beams proportional to the number of the micro-elements (e.g., waveguides, micro-lenses or micro-tunnels) within the optical element array 34a and 440a. Arrays 34a and 440a can have endless number of designs. For example, FIGS. 4-5 show some designs, which will be discussed later on. In one example, FIG. 2I shows a cross-sectional view of optical element array 34a along line C of FIG. 2H. Arrays 34a and 440a of FIG. 2I and FIG. 2K, respectively, can be two-dimensional arrays such as the one shown in FIG. 4A with micro-elements of FIG. 4F. In this case, light incident on the array 34a and 440a is divided into sub-beams 345a and 346a (for the purpose of drawing clarity, only two sub-beams are shown in FIG. 2I) proportional to the number of the waveguides 341a and 441a. The cone angle of the sub-beam 345a and 346a exiting the waveguides 341a is larger than the cone angle $\theta$ of the incident beam and equal to $(\theta+2.n.\alpha)$ where n is the number of total internal reflections within the waveguide 341a and 441a, and $\alpha$ is the taper angle of the waveguide 341a and 441a assuming that the taper angle of the four sidewalls of waveguide 341a and 441a is the same. Even though FIG. 2I shows that all rays experience total internal reflection (TIR), it is important to remember that TIR occurs within the waveguide 341a and 441a as long as the incident angle of a light ray is larger than the critical angle of waveguide 341a and 441a. If one uses hollow light guide (i.e. light tunnel) with reflective surfaces, sub-beams 345a and 346a will be guided within the light tunnel regardless of the cone angle of the guided light. Light uniformity at the exit aperture of the light guide increases with the increasing number of light reflections or total internal reflections within the light guide 34b and 440b. Thus, increasing the cone angle of the light sub-beams entering the light guide reduces the light guide 34b and 440b length L required to obtain a certain light uniformity leading to a more compact homogenizer 34 and 440.

The sub-beams 345a and 346a mix within the light guide 34b and 440b leading to more uniform light at its exit aperture. The light leaving light guides 34b and 440b enters optical element arrays 34c and 440c, which in turn reduces the cone angle of the received light beam. As the cone angle of the light beam exiting optical element array 34c and 440c decreases, more light can be utilized by the display panel and projection lens resulting in a more efficient projection system. Various examples of optical element arrays that can be used to perform the function of optical element array 34c and 440c are shown in FIGS. 4-5 with array 440c being single sided (FIG. 4) rather than double sided (FIG. 5). FIG. 2J shows a cross-sectional view of one example of optical element array 34c along line D of FIG. 2H. Array 34c and 440c of FIG. 2J and FIG. 2K, respectively, can be a two-dimensional array such as the one shown in FIG. 4A with micro-elements of FIG. 4H. In this case, light incident on the arrays 34c and 440c is divided into sub-beams proportional to the number of the waveguides 341c and 440c. The cone angle of the sub-beams exiting optical element array 340c is smaller than the cone angle of the light beam entering it. Optical element array 341c allows further reduction in the cone angle of the light rays received from 340c. Therefore, using a double sided optical element array 34c of FIG. 2J provides more collimation than using a single sided optical element array such as optical element array 440c of FIG. 2K. It is worth noting that optical element array 34a of FIG. 2I can be used to diverge or collimate light. When light is received by the optical element array 34a as shown in FIG. 2I, the light beam exits the optical element array 34a with a larger cone angle. If the light beam direction is reversed (i.e. light is received by the smaller aperture 348a of the waveguides 341a), the light beam exits the larger aperture 349a of the waveguides 341a with a smaller cone angle. Therefore, rotating optical element array 34a of FIG. 2I by 180° about x- or y-axis permits its use in performing the function of optical element array 34c of FIG. 2J. The rotated array 34a will look like optical element array 340c. Using the similar optical element arrays at the entrance and exit apertures of light guide 34b leads to design and manufacturing cost reductions of homogenizer 34.

More efficient homogenizers can be formed. In such homogenizers, one or more optical element arrays 34a can be bonded to the entrance aperture of a light guide 34b while having one or more optical element arrays 34c bonded to the exit aperture of a light guide 34b. It is also possible to have one or more optical element arrays such as the ones shown in FIGS. 4 and 5 bonded to the entrance aperture of homogenizer 440 of FIG. 2K while having one or more optical element arrays such as the ones shown in FIGS. 4 and 5 bonded to the exit aperture of homogenizer 440 of FIG. 2K. Such optical element arrays preferably have polished edges and/or coated with a reflective layer so that light loss through edges is prevented. Efficient homogenizers of this type can be used in projection systems of FIGS. 2A, 2C, 3A and 3C.

Simpler homogenizers can be formed. These homogenizers consist of two components, optical element array 34a and light guide 34b, without including optical element array 34c. This simple homogenizer provides high light uniformity at the exit aperture of light guide 34b at a lower cost. In this case, optical element array 34a and the taper of light guide 34b determine the cone angle of the light beam exiting the simpler homogenizer. These homogenizers can be used in projection systems of FIGS. 2A, 2C, 3A and 3C.

Projection systems such as those of FIGS. 2B, 2D, 3B and 3D can be implemented using groups of optical element arrays rather than a single optical element array 54, 104, 154 and 204. A group of optical element arrays is formed by having more than one optical element array such as the ones shown in FIGS. 4 and 5 bonded together or arranged serially while leaving an air gap (i.e. without bonding) between adjacent optical element arrays.

The homogenizer 34 and 440 disclosed herein (FIGS. 2A, 2C and 2K) has at least four advantages over known light integrators such as solid and hollow light guide (FIG. 1A, 1D, 1E, 1F and 1G) and fly's eye lens integrators (FIG. 1B-1C). First, the homogenizer 34 and 440 provides higher compactness due to the use of the optical element array 34a and 440a at the entrance aperture of a solid or hollow light guide 34b and 440b. This optical element array 34a and 440a splits incident light into a large number (up to millions) of sub-beams with a specific cone angle. This splitting enhances light mixing and allows the use of a short light guide 34b and 440b. In addition, the cone angle of light exiting the optical element array 34a and 440a can be increased allowing further enhancement in the light uniformity and/or the use of a shorter light guide 34b and 440b. Second, the homogenizer 34 and 440 can provide higher level of light uniformity due to the large number of virtual sources formed by optical element arrays 34a, 34c, 440a and 440c as well as light guide 34b and 440b. Images of these virtual sources are superimposed on top of each other forming an extremely uniform distribution of light at the exit aperture of the homogenizer 34 and 440. Third, higher coupling efficiency between the light source and the display panel (light valve) can be provided by the homogenizer 34 and 440 resulting in more efficient use of light by the display panel. The enhanced coupling efficiency is achieved by lowering the cone angle population of the light beam delivered to the display panel. Fourth, the homogenizer 34 and 440 provides self luminous light across its exit aperture, which is demanded by some applications. Self luminance of light means that each point across the exit aperture of homogenizer 34 and 440 (i.e. exit aperture of optical element array 34c and 440c) emits light into a selected numerical aperture of emission. The distribution of the numerical aperture across the exit aperture of homogenizer 34 and 440 can be uniform or non-uniform. It is possible to design each point across the exit aperture of homogenizer 34 and 440 to have its own numerical aperture of emission which is independent of numerical apertures of other points. The diameter of each point is preferably 5 microns or more to avoid light diffraction effects.

Figure 2D:
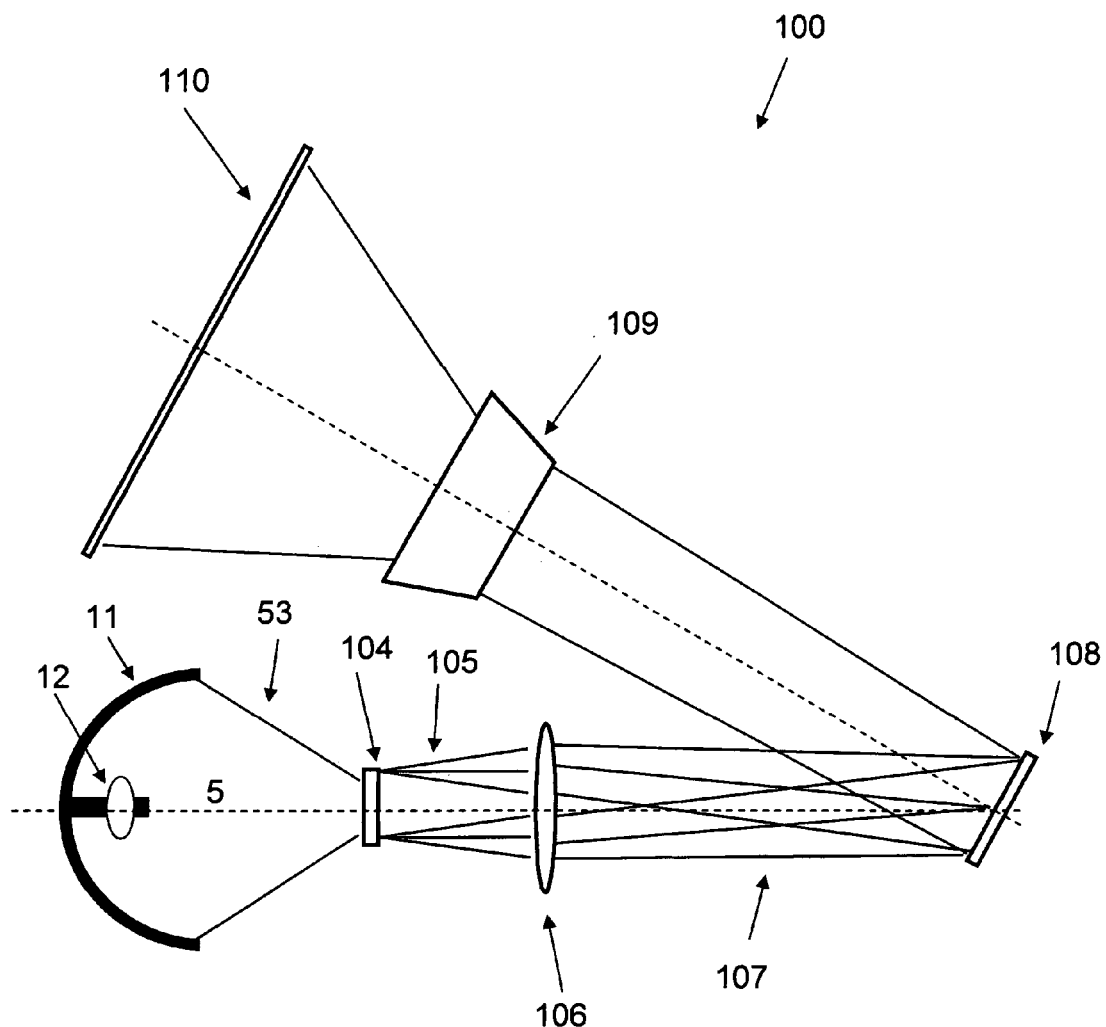
FIG. 2D shows a cross-sectional view of a projection system utilizing an optical element array and a focusing lens to provide uniform light distribution to a reflective display panel in accordance with a fourth embodiment of the present invention.

FIGS. 2B and 2D show projection systems that use optical element arrays 54 and 104 rather than a homogenizer 34. The input light 53 is focused into the entrance aperture of optical element arrays 54 and 104. FIGS. 4-5 and FIGS. 8D-8J show variations of optical element arrays that can perform the function of optical element arrays 54 and 104. The operation of optical element arrays 54 and 104 is similar to the operation of optical element array 34a and 34c. Thus, the preceding discussion of the operation of the optical element arrays 34a and 34c as well as the following discussion associated with FIGS. 4-5 are applicable to the operation of optical element arrays 54 and 104.

The light beam 53 received by optical element arrays 54 and 104 is divided into large number of sub-beams 55 and 105 as shown in FIGS. 2B and 2D. The cone angle of the received light beam 53 can be maintained, decreased or increased depending on the size, shape and taper of the individual micro-elements as well as their density and distribution within the optical element arrays 54 and 104. The sub-beams are transmitted through relay optics, such as a condenser lens 56 and 106, which focuses, in a superimposing manner, the light output from each micro-element onto the image gate (entry face) of a light valve (display panel) 58 and 108. It is important to note that the cross-sectional shape (i.e. the exit aperture) of the micro-elements within the optical element array 54 and 104 can be adapted to the cross-sectional shape of the display panel 58 and 108. This condition is not necessary for the optical element arrays 34a, 34c, 112, 122, 440a and 440c, used in the homogenizer 34 and 440 of FIGS. 2A, 2C, 2D, 2E and 2K. As shown in FIG. 2B, the light beam which passes through the light valve 58 is focused by an optional field lens 59 into the aperture of a projection lens 60, which in turn projects the image displayed on the light valve 58 onto a screen 61. FIG. 2D shows a projection system that uses a reflective display panel 108. The display panel 108 reflects the received light beam into the aperture of a projection lens 109 without using an optional field lens. Projection lens 109 projects the image displayed on display panel 108 onto a screen 110.

Figure 2E:
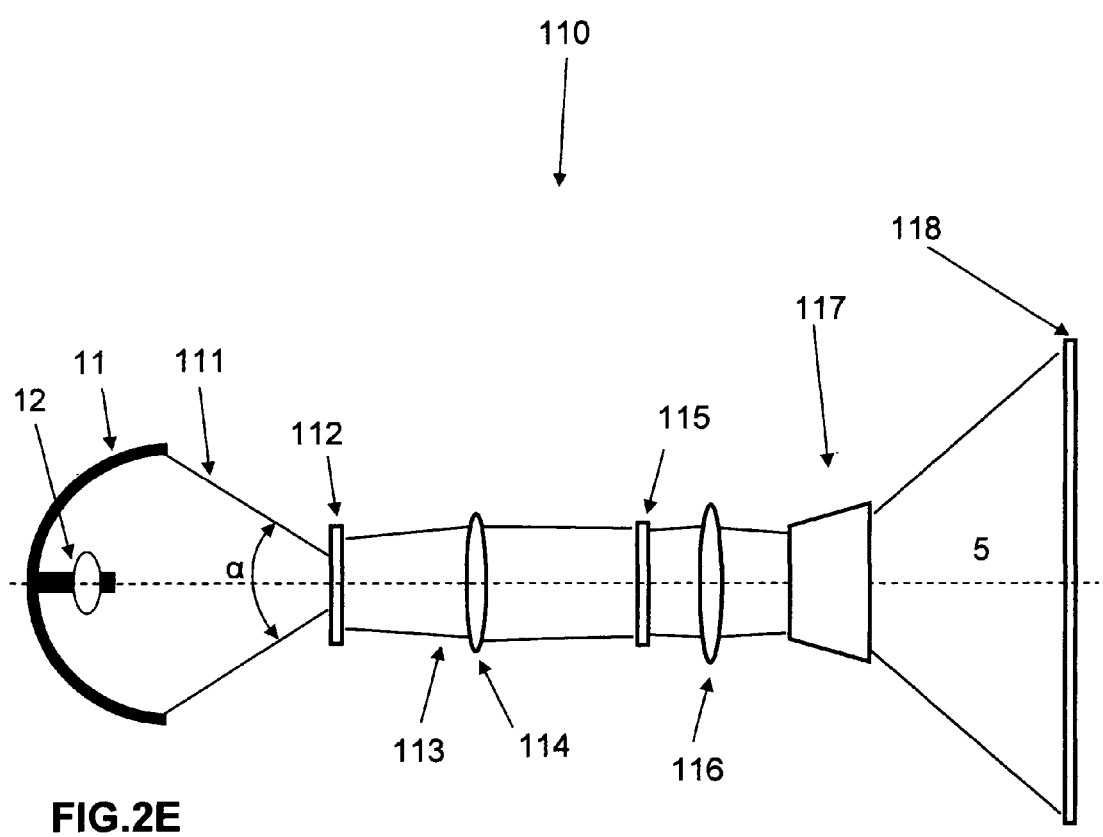
FIG. 2E shows a cross-sectional view of a projection system utilizing an optical element array to provide uniform light distribution to a transmissive display panel in accordance with a fifth embodiment of the present invention.
Figure 2F:
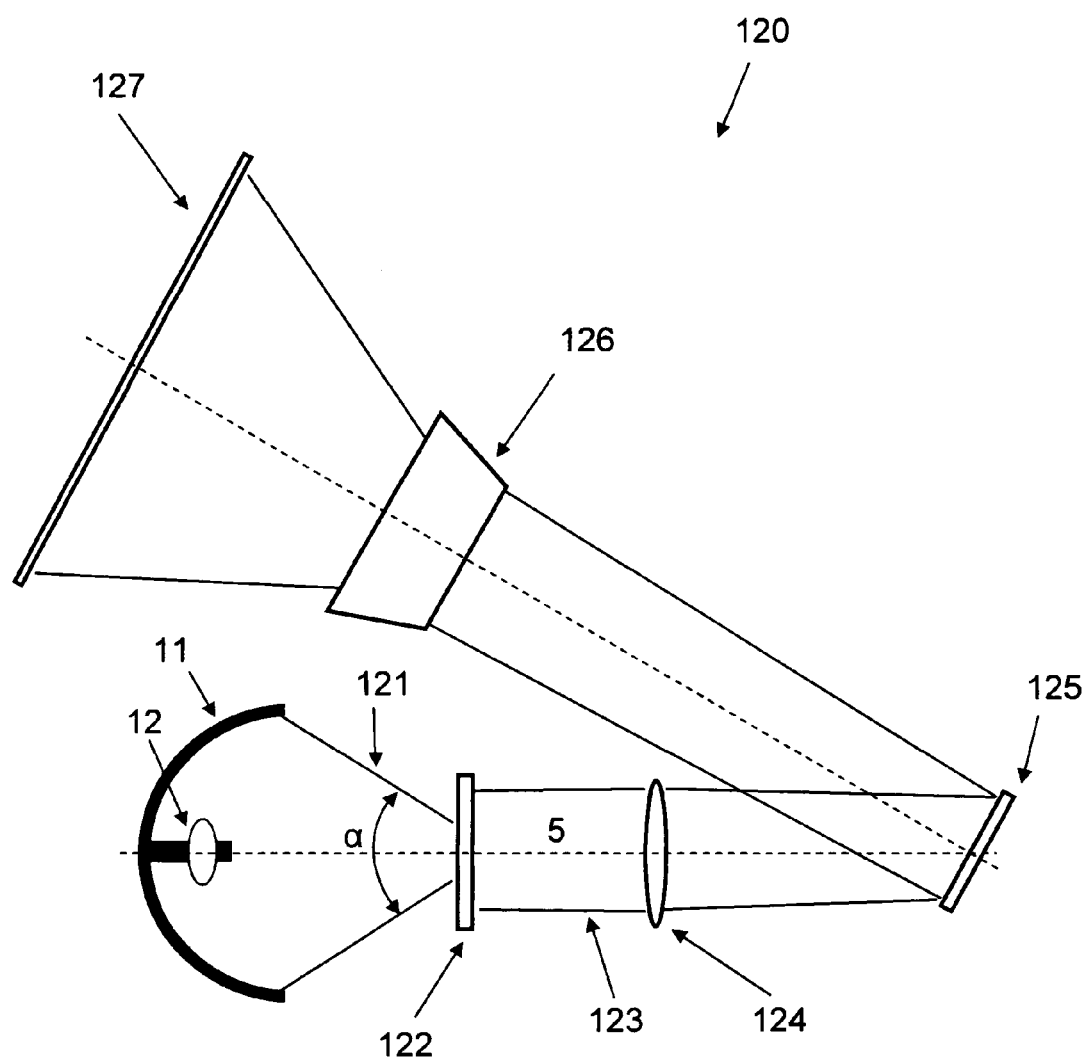
FIG. 2F shows a cross-sectional view of a projection system utilizing an optical element array to provide uniform light distribution to a reflective display panel in accordance with a sixth embodiment of the present invention.
Figure 2G:
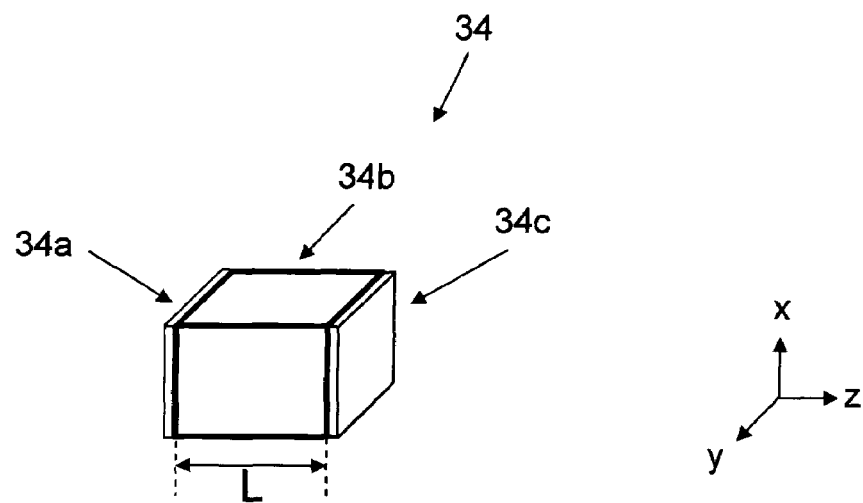
FIG. 2G shows a side perspective view of the homogenizer used in the projection systems of FIGS. 2A and 2C.
Figure 2H:
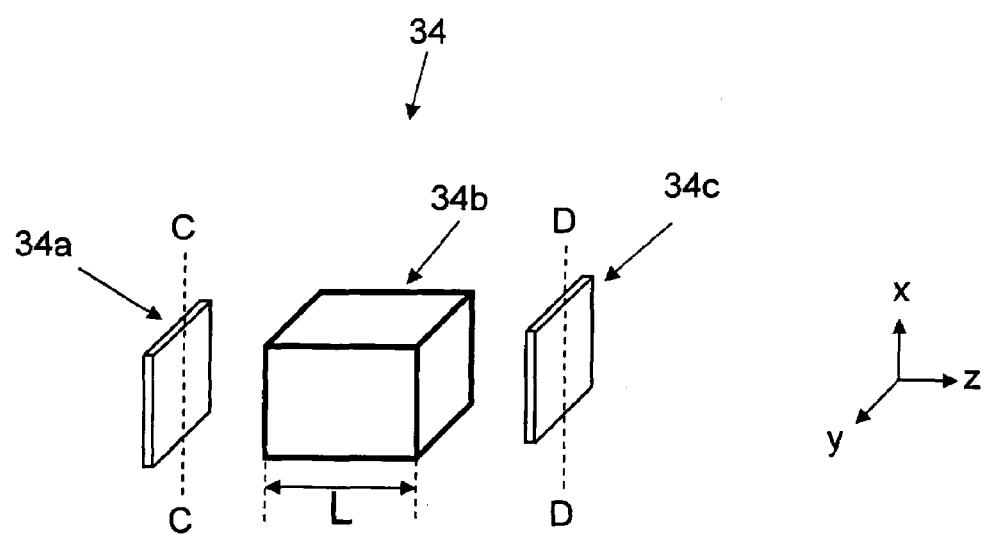
FIG. 2H shows an exploded view of the components of the homogenizer shown in FIG. 2G.
Figure 2I:
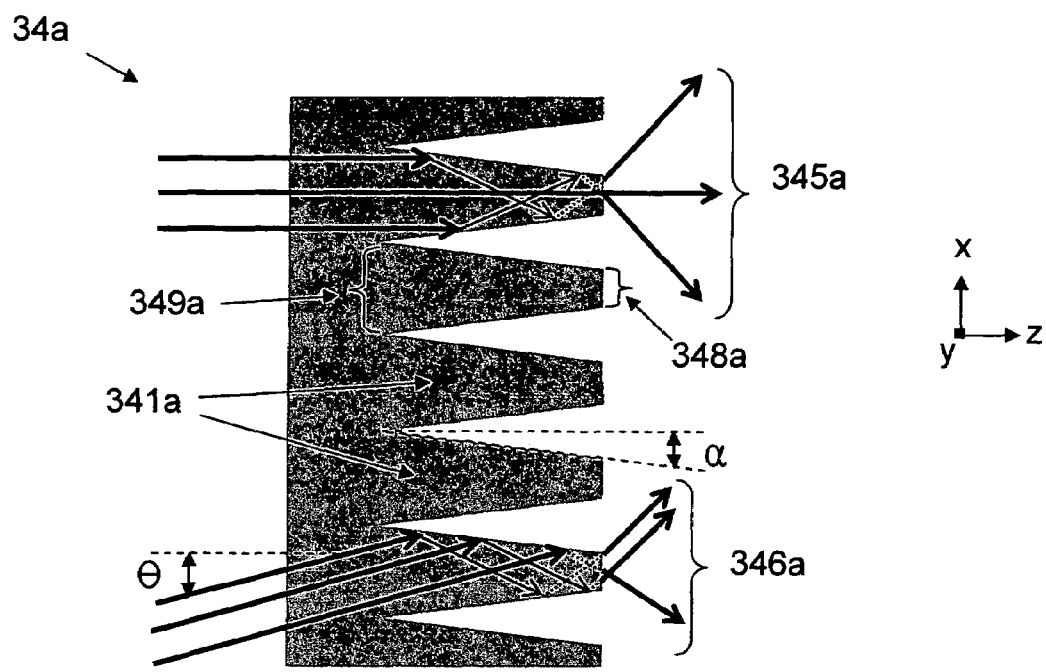
FIG. 2I shows a cross-sectional view of the optical element array 34*a* of FIG. 2H along line C.
Figure 2J:
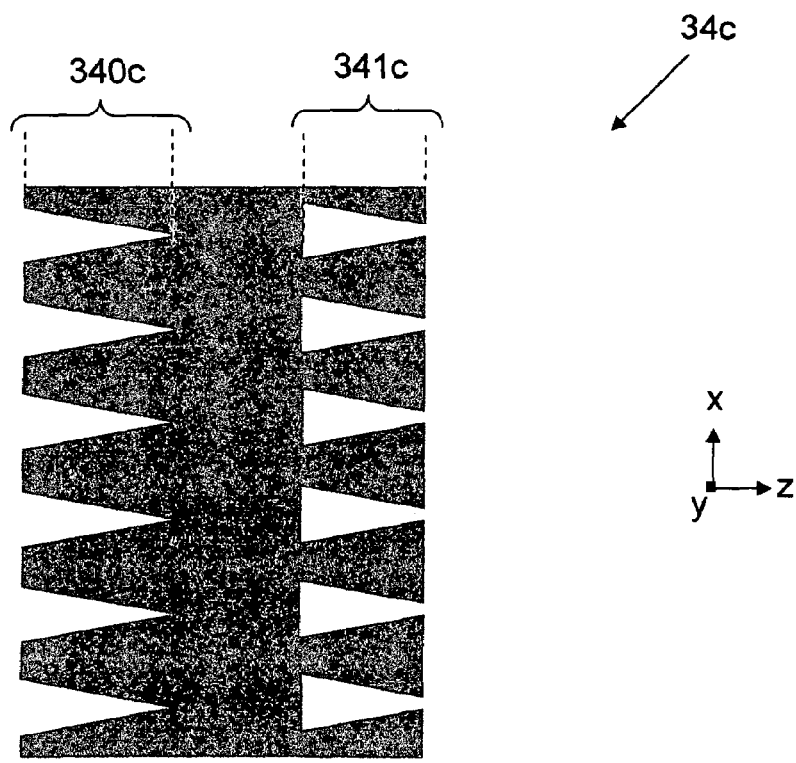
FIG. 2J shows a cross-sectional view of the optical element array 34*c* of FIG. 2H along line D.
Figure 2K:
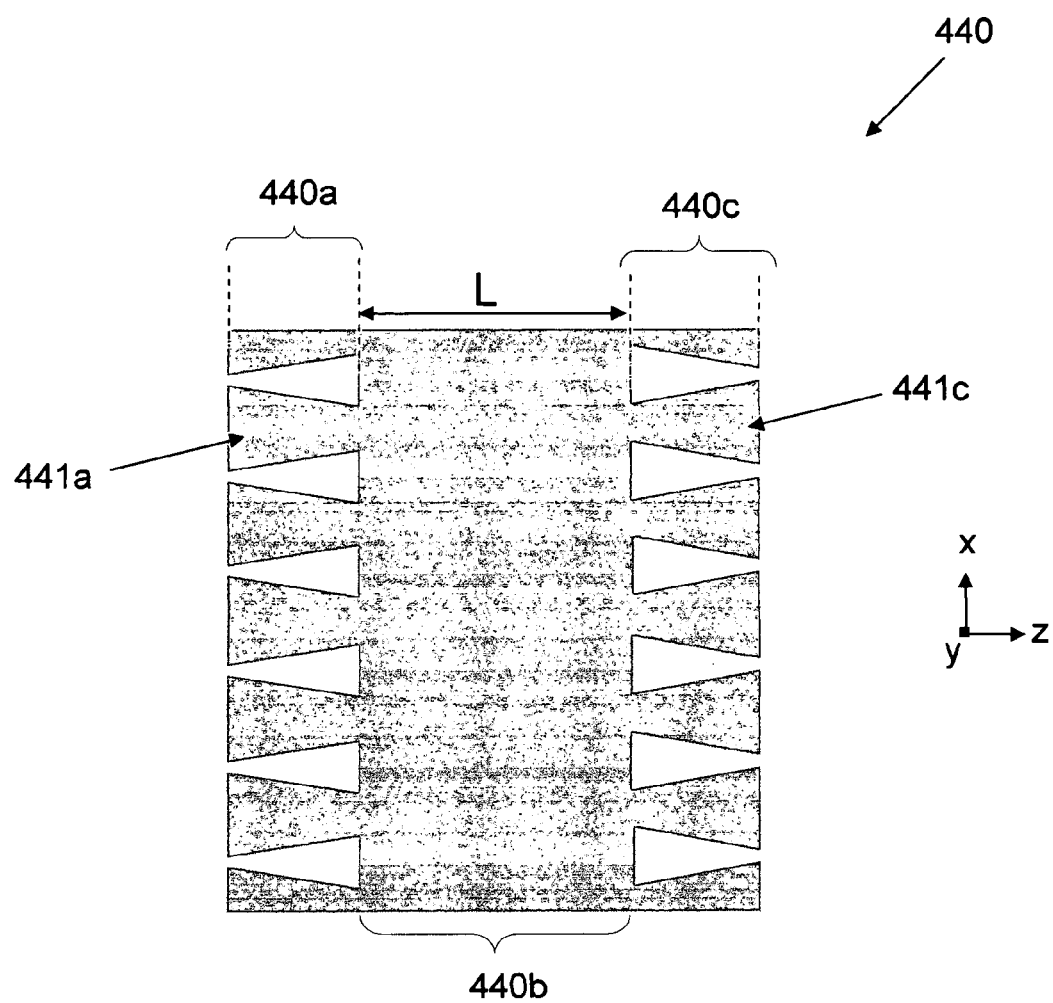
FIG. 2K shows a cross-sectional view of an integrated homogenizer.
Figure 6A:
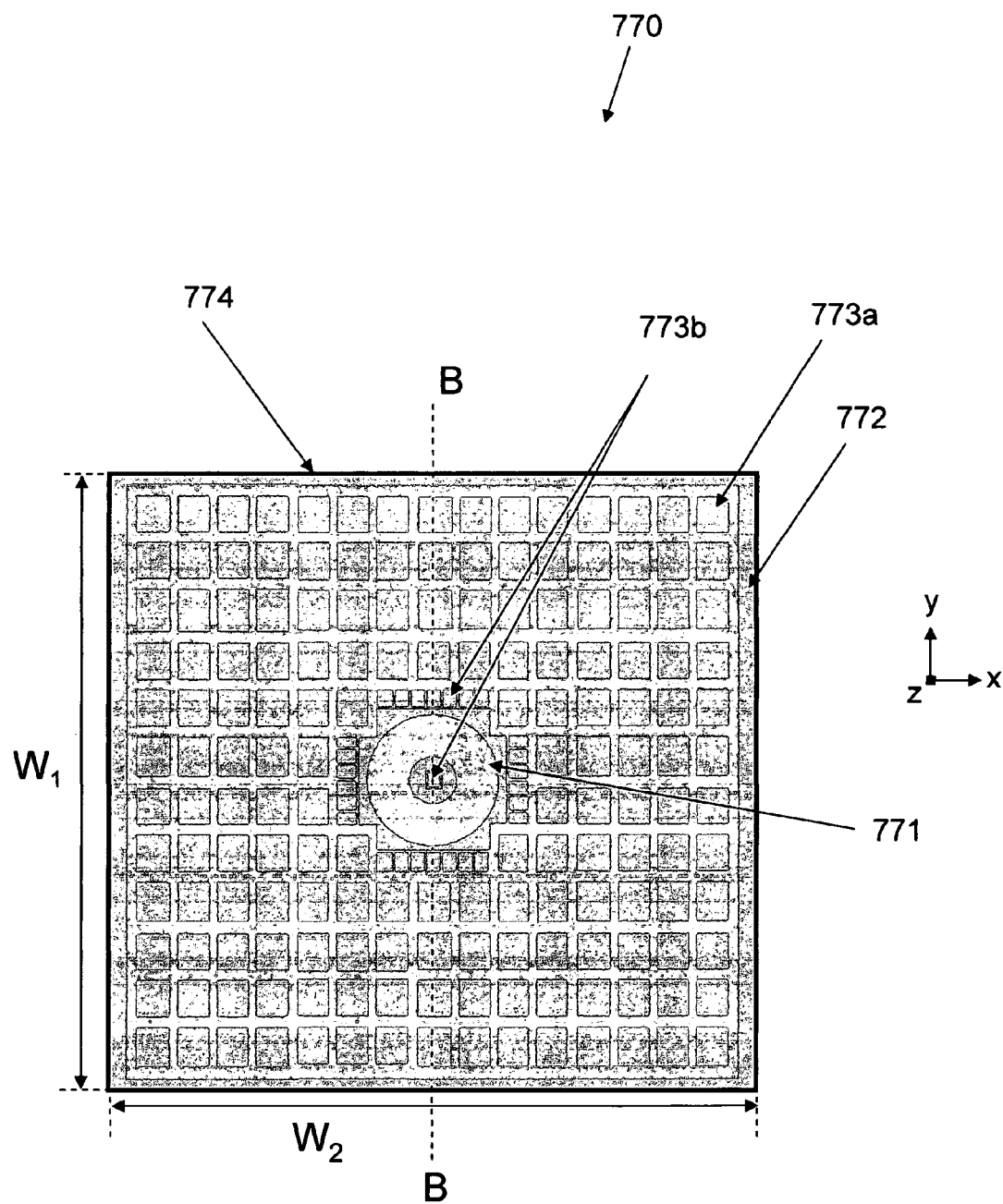
FIG. 6A shows a front plan view of an optical element array with circulation and extraction elements, which is usable in the projection system described herein.
Figure 6B:
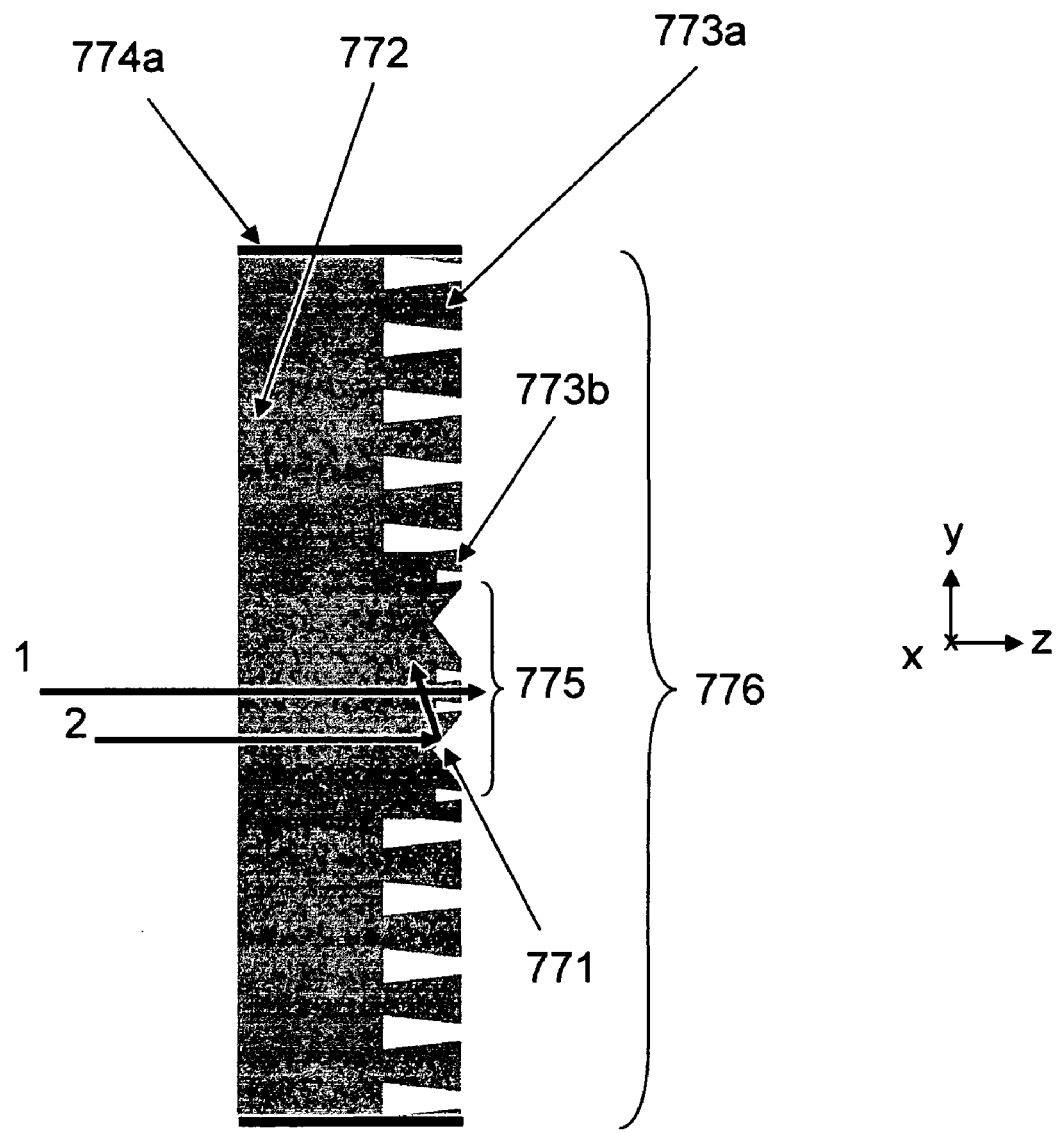
FIG. 6B shows a cross-sectional view of FIG. 6A along line B. In this figure, circulation and extraction micro-elements are formed on the back side of the array.
Figure 6C:
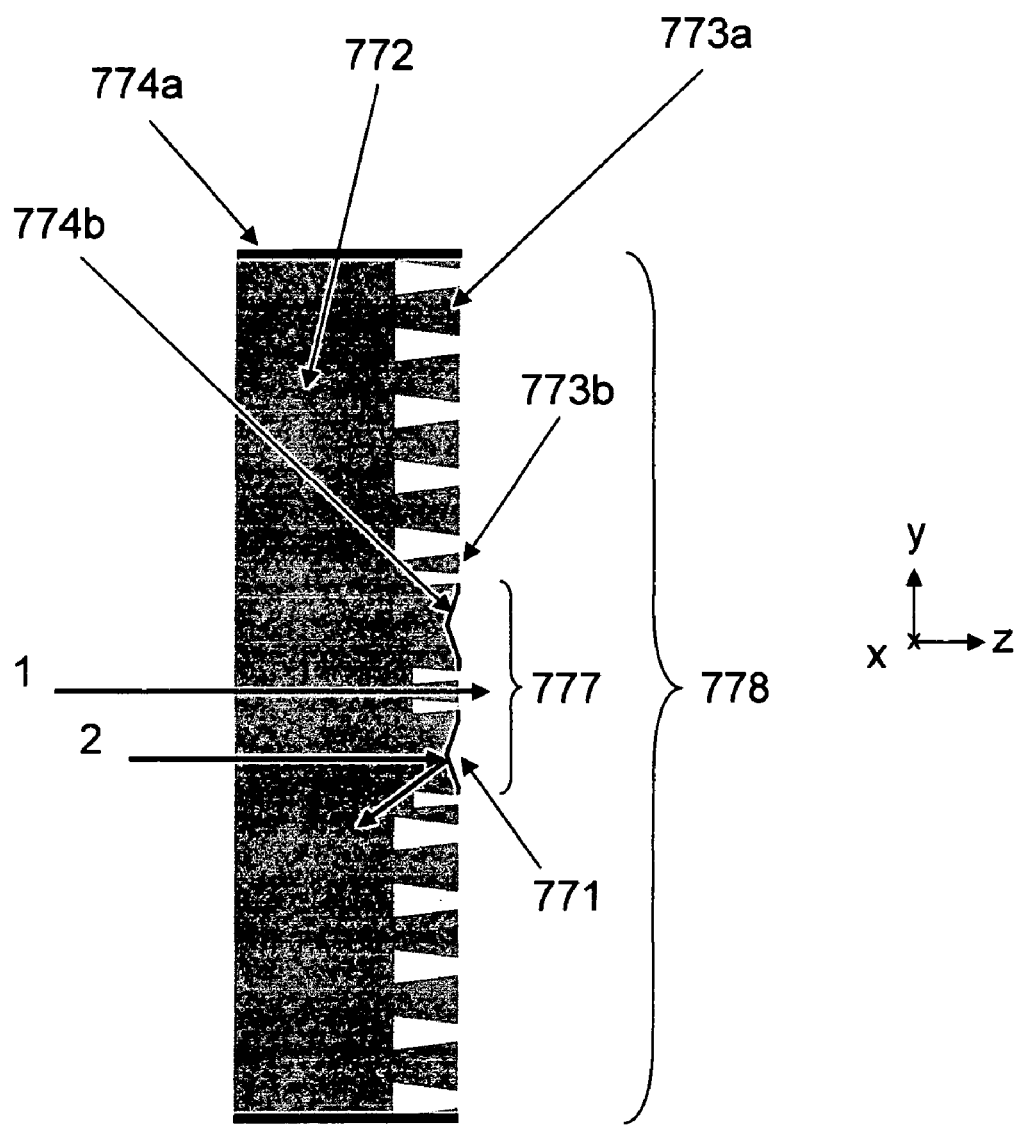
FIG. 6C shows a cross-sectional view, along line B, of an alternative optical element structure for the array of FIG. 6A. In this figure, circulation and extraction micro-elements are formed on the back side of the array and circulation micro-elements are coated with a reflective layer.
Figure 6D:
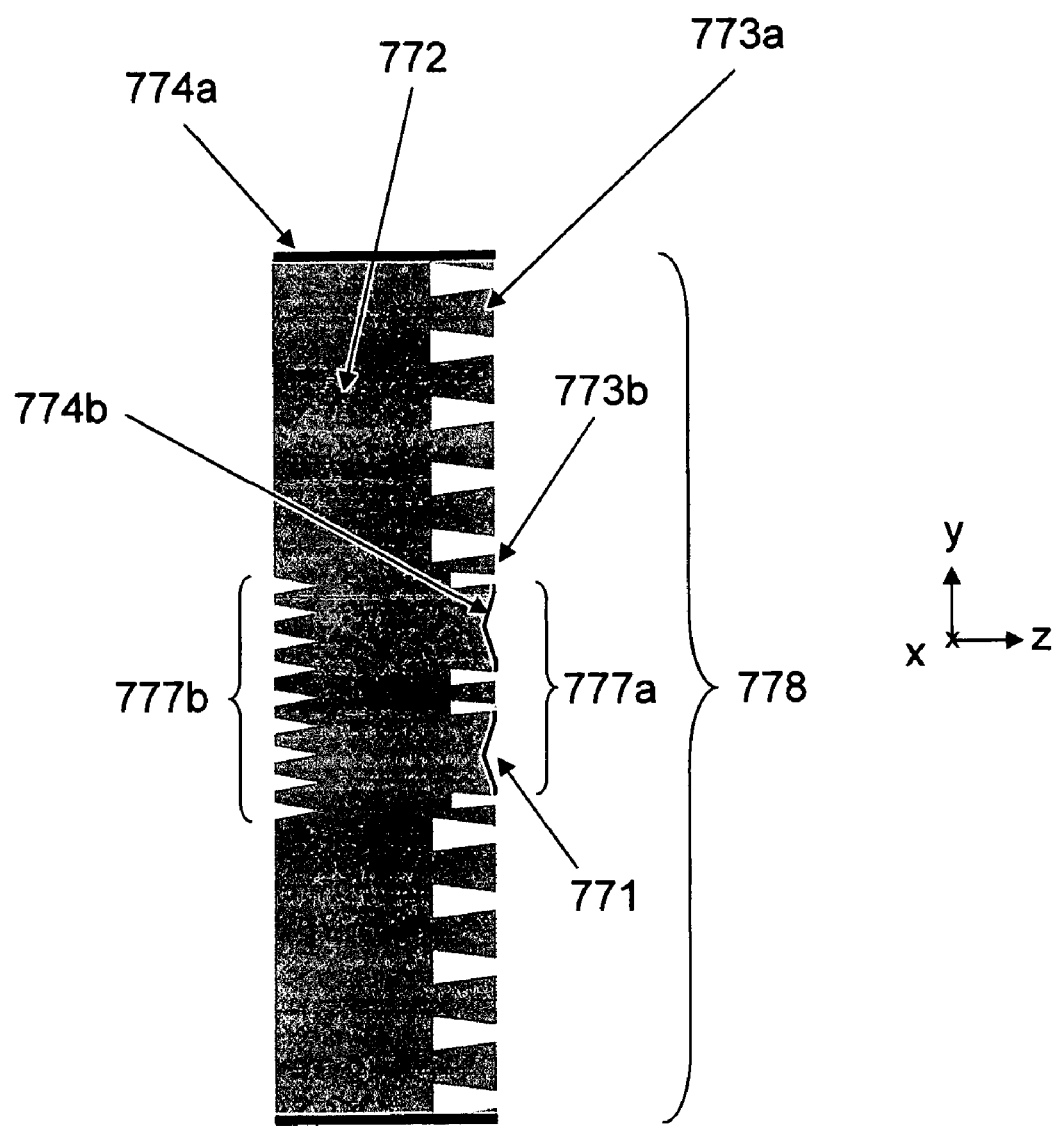
FIG. 6D shows a cross-sectional view of another alternative optical element structure for the array of FIG. 6A along line B. This example is similar to the one of FIG. 6C except for the formation of optical element array at the entrance aperture of the array.

FIGS. 2E and 2F show projection systems that use optical element arrays 112 and 122 coupled with optional relay lenses 114 and 124 according to other exemplary embodiments of the invention. Optical element arrays 112 and 122 are made of optically transmissive material such as glass (Pyrex, quartz, corning 1737F) and polymers (PMMA, PC, Arton, Zeonor). The input light 111 and 121 is focused into all or portion of the entrance aperture of optical element arrays 112 and 122. FIGS. 6A-6F, FIGS. 6N-6O, FIG. 7A, FIGS. 12A-12B and FIG. 12G show variations of optical element arrays that can perform the function of optical element arrays 112 and 122. The operation of optical element arrays 112 and 122 is based on circulating the input light within the body of the optical element array using micro-elements to uniformly extract circulated light out of the body of the waveguide. Examples of optical element arrays 112 and 122 are shown in FIGS. 6A-6S as well as in FIG. 7A, FIGS. 12A, 12B and 12G. For sake of simplicity, these figures are drawn with a very limited number of extraction and circulation micro-elements. FIG. 6A shows a plan view of a two-dimensional optical element array 770, which consists of extraction micro-elements 773 and circulation micro-elements 771 arranged in two dimensions (x and y). FIG. 6B shows a cross-sectional view of optical element array 770 along line B of FIG. 6A. The input light enters optical element array 770 perpendicularly with a cone angle of a (FIGS. 2E-2F and FIG. 6Q) and impinges on the circulation micro-elements 771 within the circulation array 775 (FIG. 6B) which redirects portion of the input light so that it is guided within the body 772 of optical element array 770 via total internal reflection (TIR) and/or pure reflection off of reflective surfaces of optical element array 770. In case of TIR, circulation micro-elements 771 may reflect all or part of incident light beam and transmit the rest of it depending on the angle of incidence of light beam and the critical angle of circulation micro-elements. Two rays of light are shown in FIGS. 6B-6C. Ray 1 enters and exits optical element array 770 through collimating waveguide 773b at the array's center without being circulated within the body 772 of the optical element array 770. Ray 2 is reflected by TIR at the prism 771 sidewall (FIG. 6B) or is reflected off of the reflective coating 774b at the prism 771 sidewall (FIG. 6C). Ray 2 is then circulated within the body 772 of the optical element array 770 via TIR off of uncoated surfaces and via pure reflections off of reflective layer 774a until it enters one of the waveguides 773a and 773b within extraction array 776 and 778. Circulation micro-elements 771 can be micro-prisms as shown in FIG. 6B, truncated micro-prisms, micro-lenses or any other shape suitable for redirecting the light beam and are preferably distributed within the area that receives the input light beam. Design parameters of each circulation micro-element 771 within an array 770 include shape and size of entrance and exit apertures, depth, sidewalls shape and taper, and orientation. Circulation micro-elements 771 within an array 770 can have uniform, non-uniform, random or non-random distributions and range from thousands to millions with each micro-element 771 being distinct in its design parameters. The size of the entrance/exit aperture of each circulation micro-element is preferably ≧5 μm in case of visible light in order to avoid light diffraction phenomenon. However, it is possible to design micro-elements with sizes of entrance/exit aperture being <5 μm. In such case, the design should use the diffraction phenomenon of light to provide homogeneous light distributions in terms of intensity, viewing angle and color over a certain area. Circulation micro-elements 771 can be arranged as a one-dimensional array, two-dimensional array, circular arrays (FIG. 6A) and can be aligned or oriented individually and/or as a circulation array with respect to the length/width of optical element array 770. Circulation micro-elements 771 within a circulation array 777 can be coated with a reflective layer 774b as shown in FIG. 6C which results in reflecting all the light impinging on the circulation micro-elements 771 regardless of the angle of incidence of light beam. The input aperture of the circulation 775 and 777 and extraction 776 and 778 arrays can be aligned or oriented with respect to each other as well as with respect to the input aperture of optical element array 770 and can have any shape such as square, rectangular, circular, trapezoidal, hexagonal, asymmetrical and irregular. Embedding the circulation array within the extraction array (FIG. 6A) rather than separating (FIG. 6T) both arrays leads to reduction in the overall size of optical element array 770 which consists of both arrays.

An optical element array can be used to provide a more uniform light beam with a specific numerical aperture to the circulation array. For example, FIG. 6D shows a cross-sectional view of another variation of optical element array 770 where a collimating optical element array 777b facing circulation array 777a is fabricated. This array 777b receives the input light from a light source and delivers more collimated and more uniform light beam to the circulation array 777a. Collimating optical element array 777b can be replaced by other types of optical element arrays such as those discussed in FIGS. 4-5.

Figure 6E:
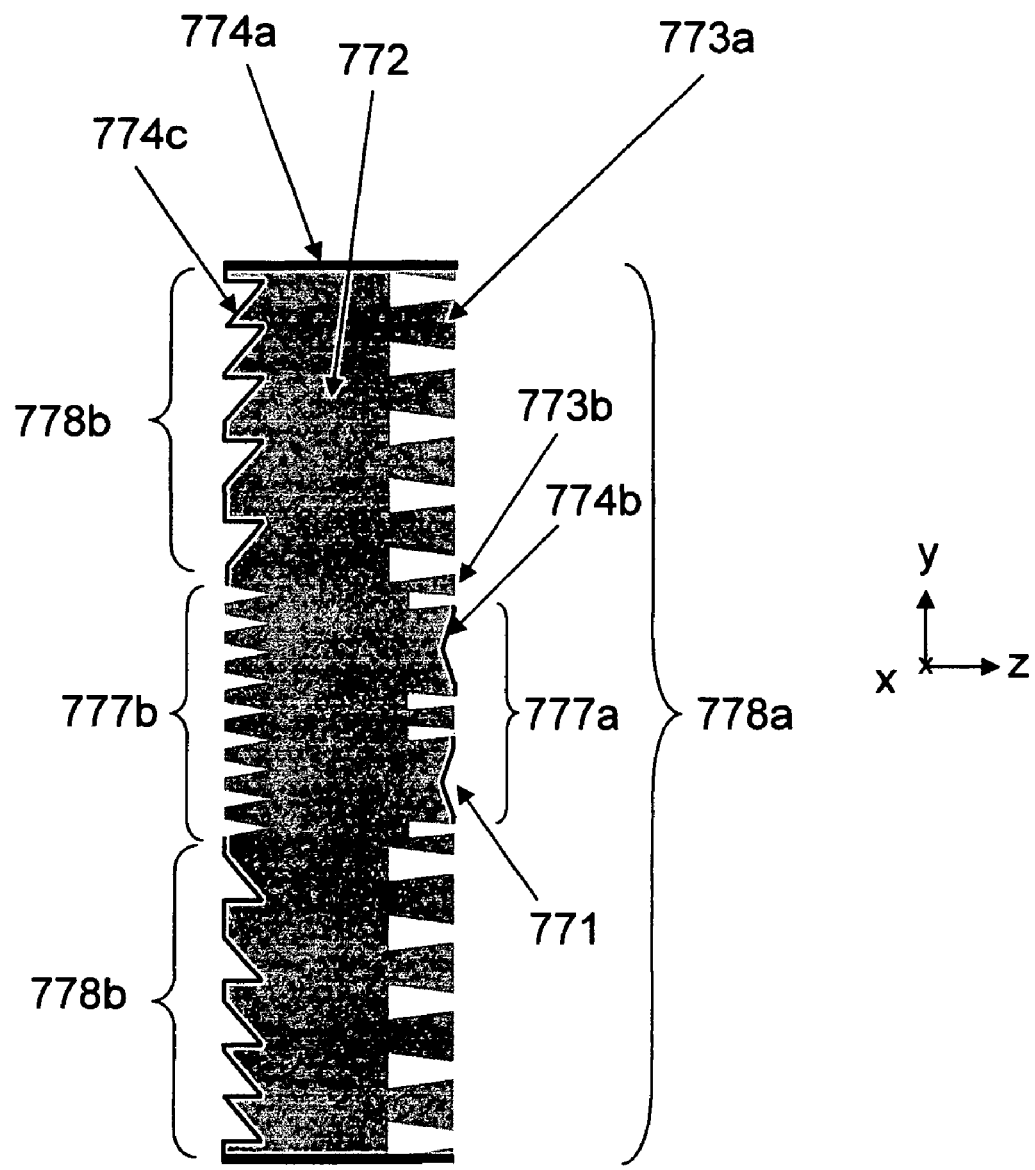
FIG. 6E shows a cross-sectional view of another alternative optical element structure for the array of FIG. 6A, along line B. This example is similar to the one of FIG. 6D except for having extraction arrays on both sides of the optical element array.
Figure 6F:
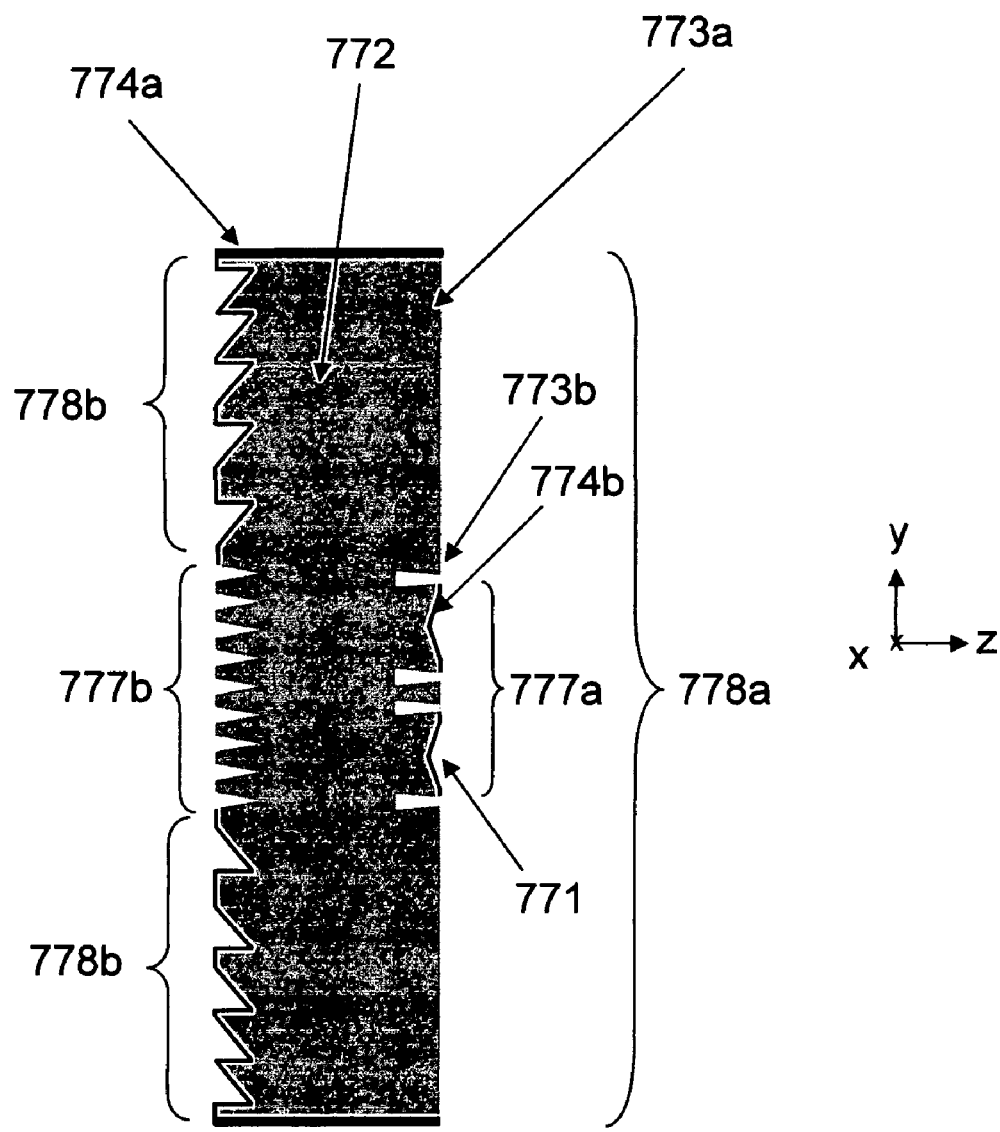
FIG. 6F shows a cross-sectional view of another alternative optical element structure for the array of FIG. 6A, along line B. This example is similar to the one of FIG. 6E except for having no extraction array on the exit aperture of the optical element array.
Figure 12A:
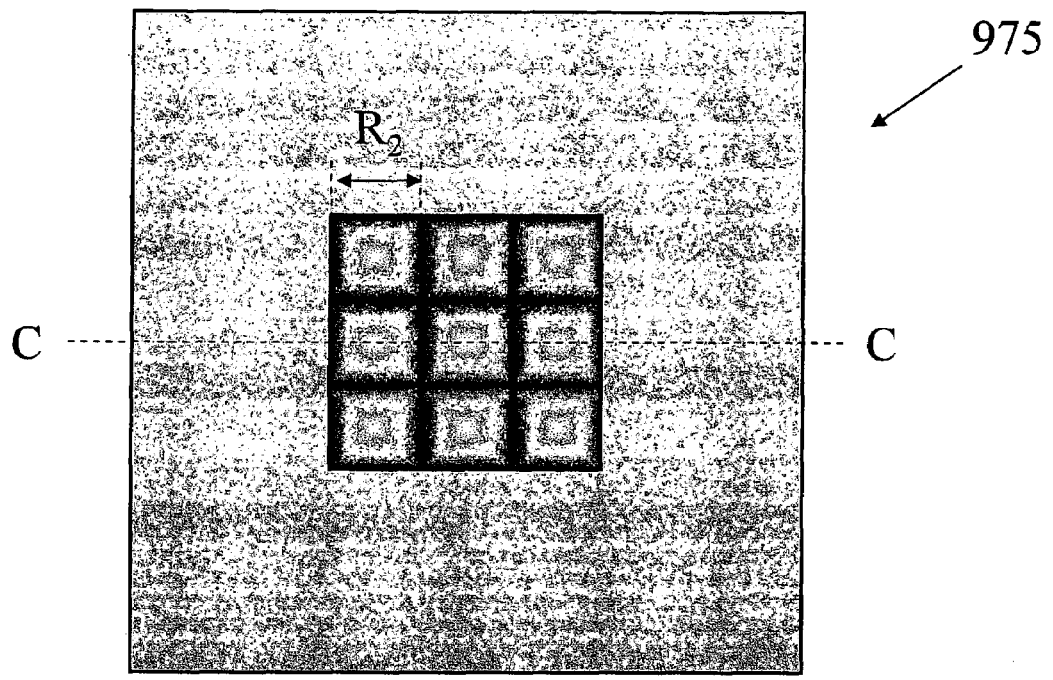
FIGS. 12A-12B show front plan and back plan views of another type of optical element array with circulation and extraction arrays.
Figure 12B:
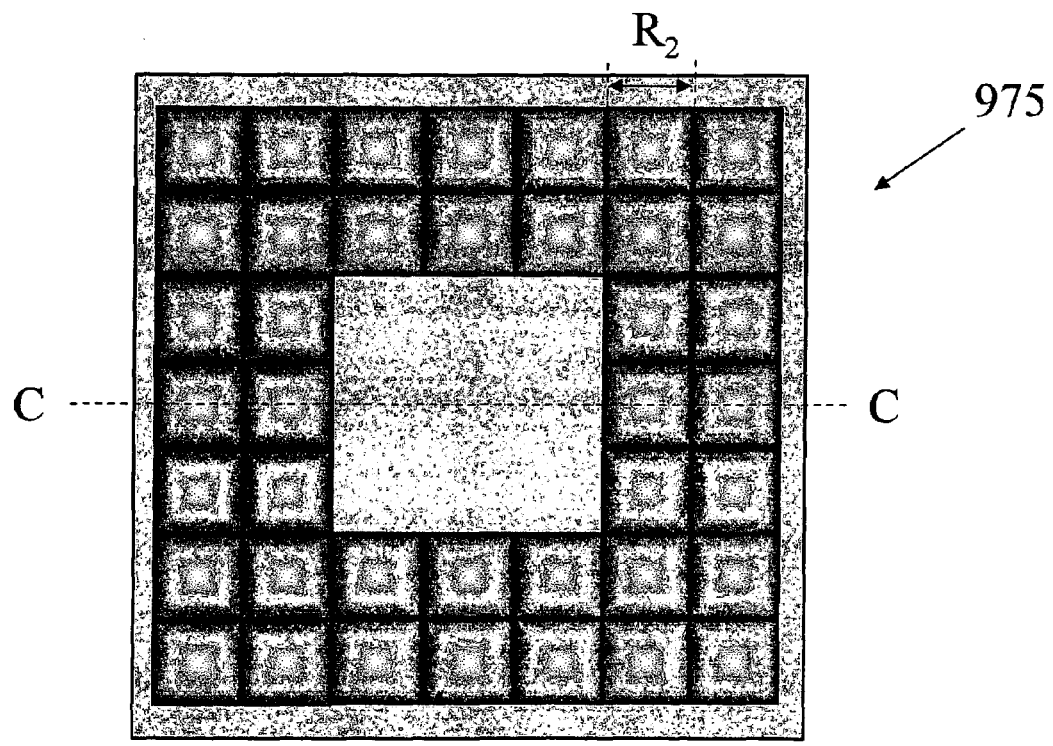

Alternatively, the extraction array 778 is introduced on both sides (778a and 778b) of the optical element array 770 as shown in FIG. 6E. In this example, extraction array 778b is coated with a reflective layer 774c. Various types and combinations of circulation, extraction and optical element arrays can be used on both sides of the optical element array 770. For example, FIG. 6F shows an extraction array 778b on one side of the optical element array 770. Another example is shown in FIGS. 12A-12B and 12G where the circulation and extraction arrays are located on the front (FIG. 12A) and back (FIG. 12B) sides of array 975, respectively. As shown in FIG. 12G, the light entrance aperture 981 of array 975 has no optical element array for increasing or decreasing the cone angle of received light.

Figure 6G:
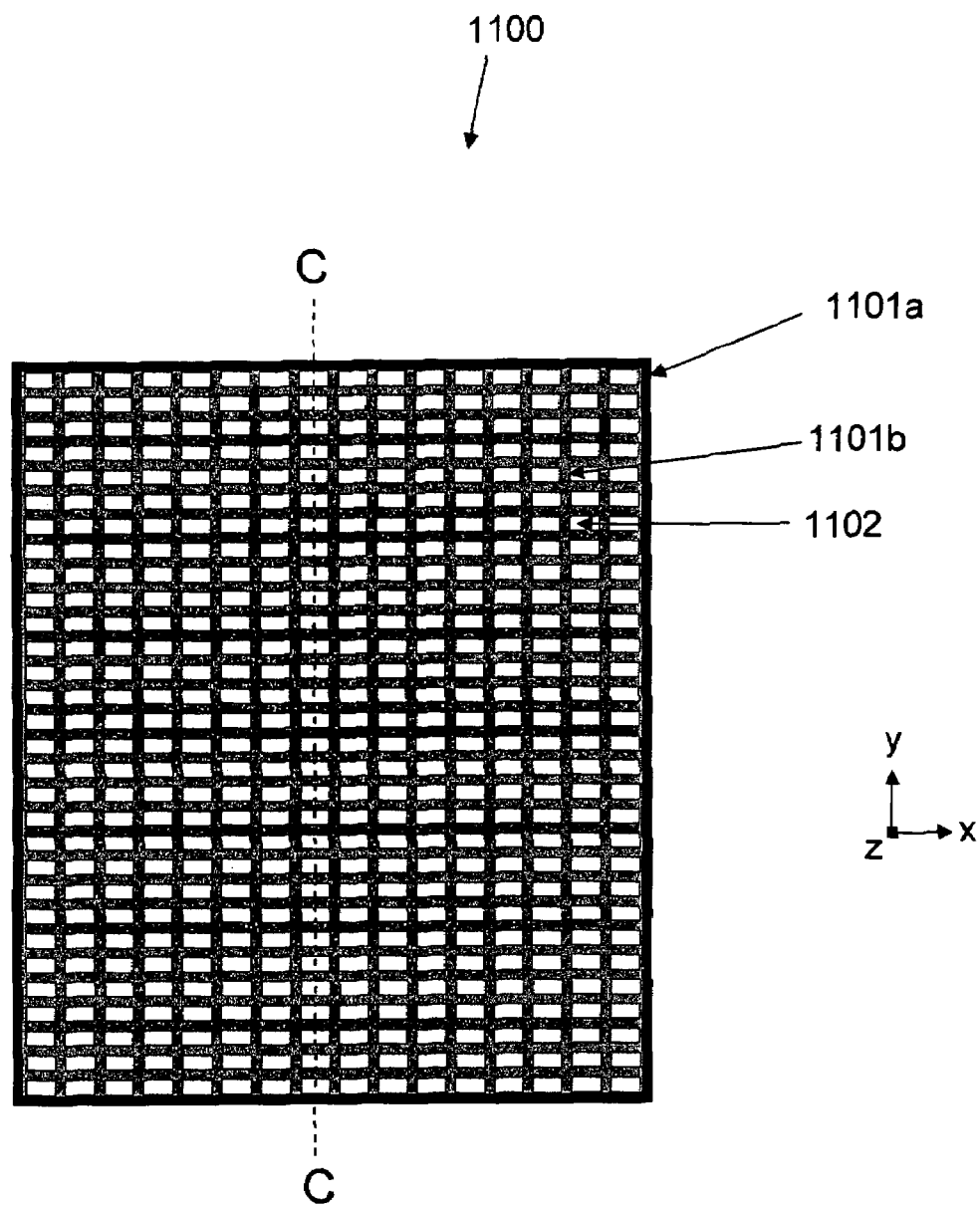
FIG. 6G shows a front plan view of a circulation array with circulation micro-elements distributed over the full surface of the array.
Figure 6H:
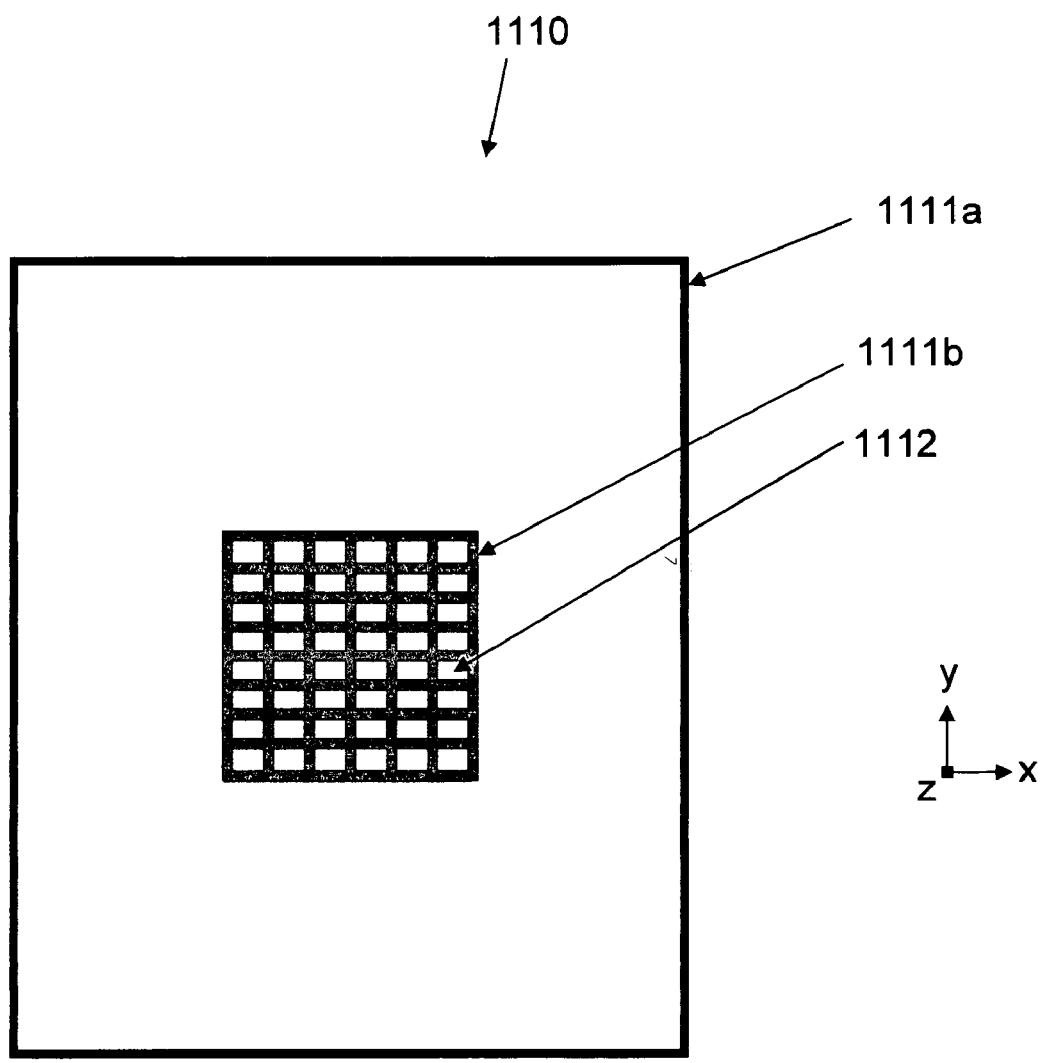
FIG. 6H shows a front plan view of a circulation array with circulation micro-elements distributed only over central part of the array.
Figure 6I:
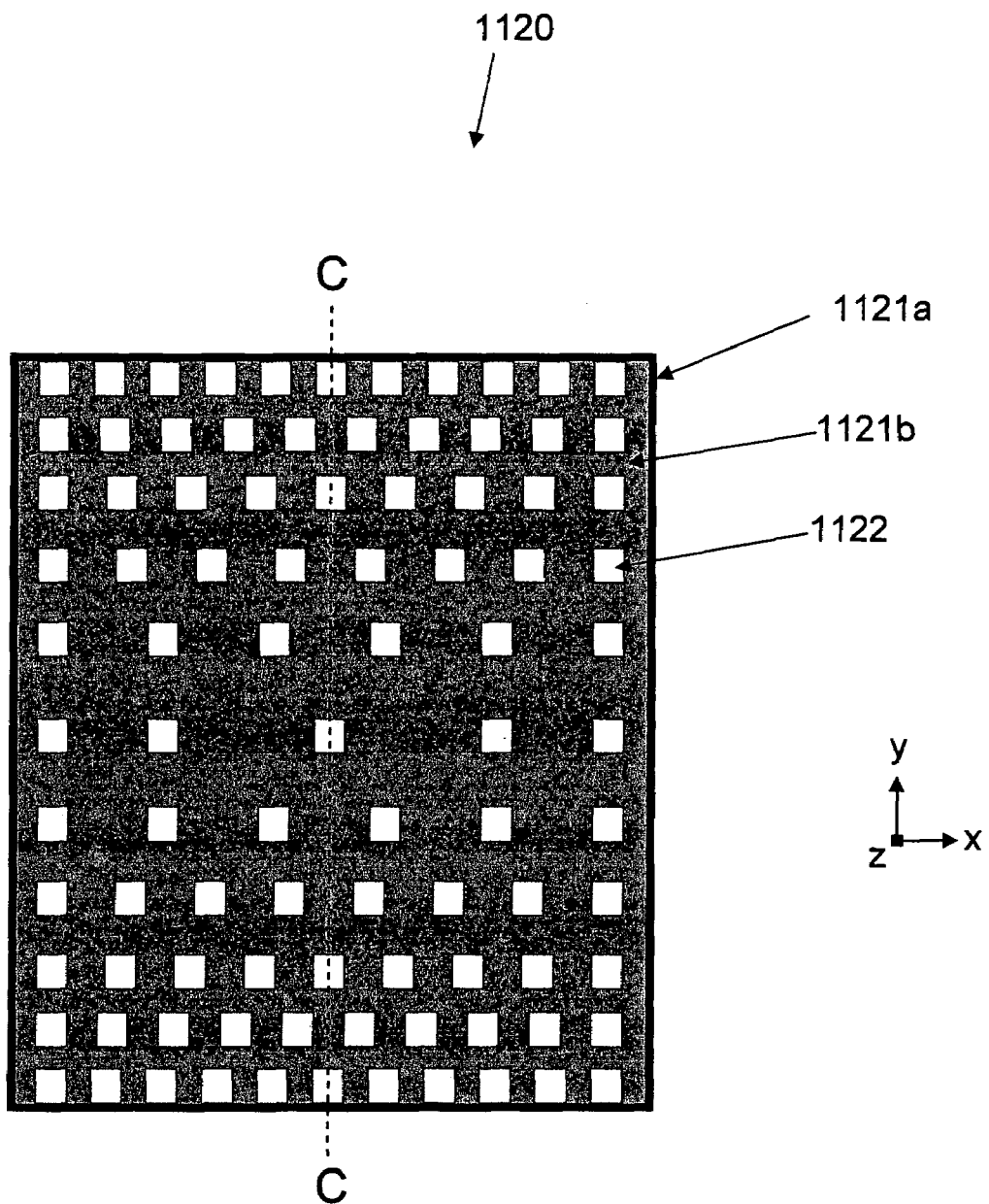
FIG. 6I shows a back plan view of an extraction array with extraction micro-elements located on its back side.
Figure 6J:
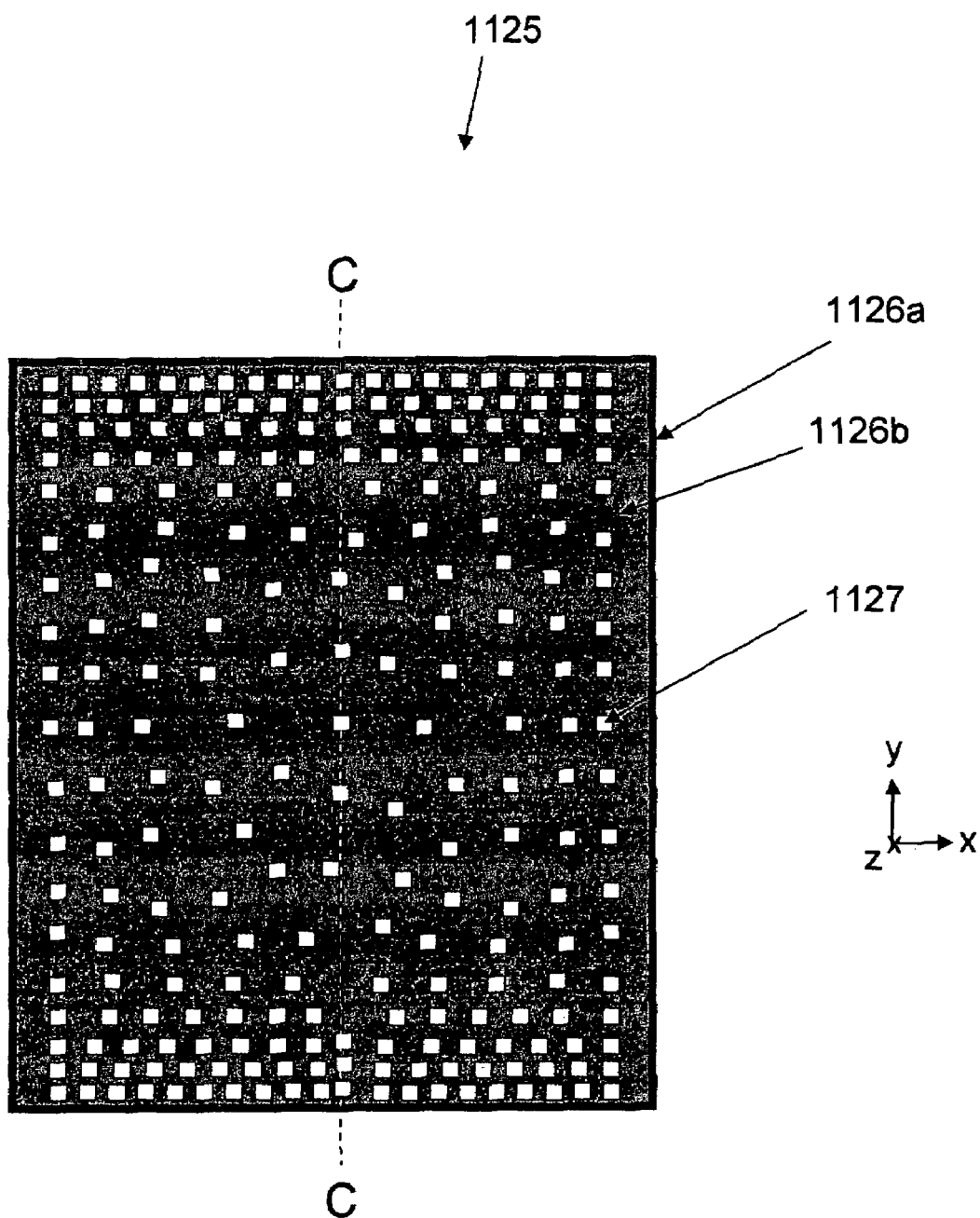
FIG. 6J shows a front plan view of an extraction array with extraction micro-elements located on its front side.
Figure 6K:
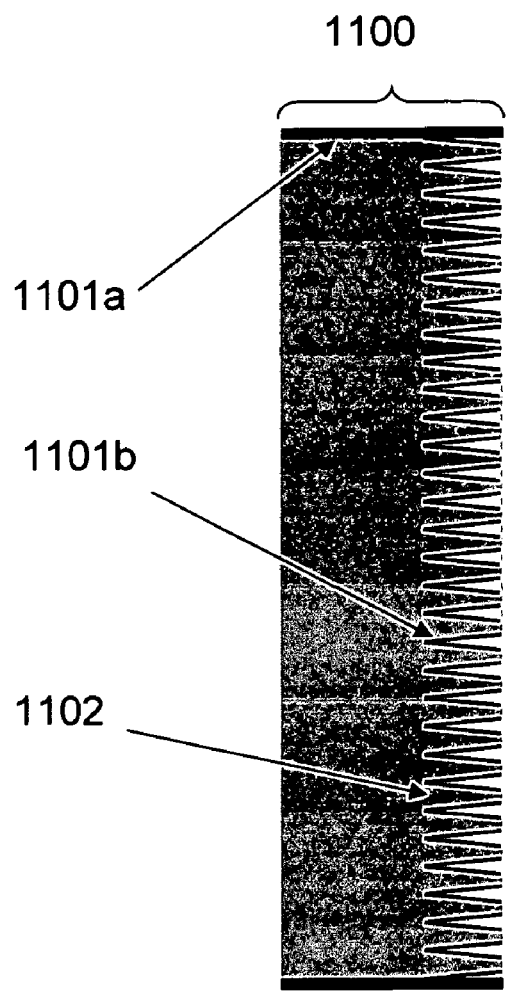
FIG. 6K shows a cross-sectional view of circulation array of FIG. 6G.
Figure 6K:
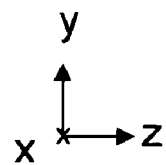
Figure 6L:
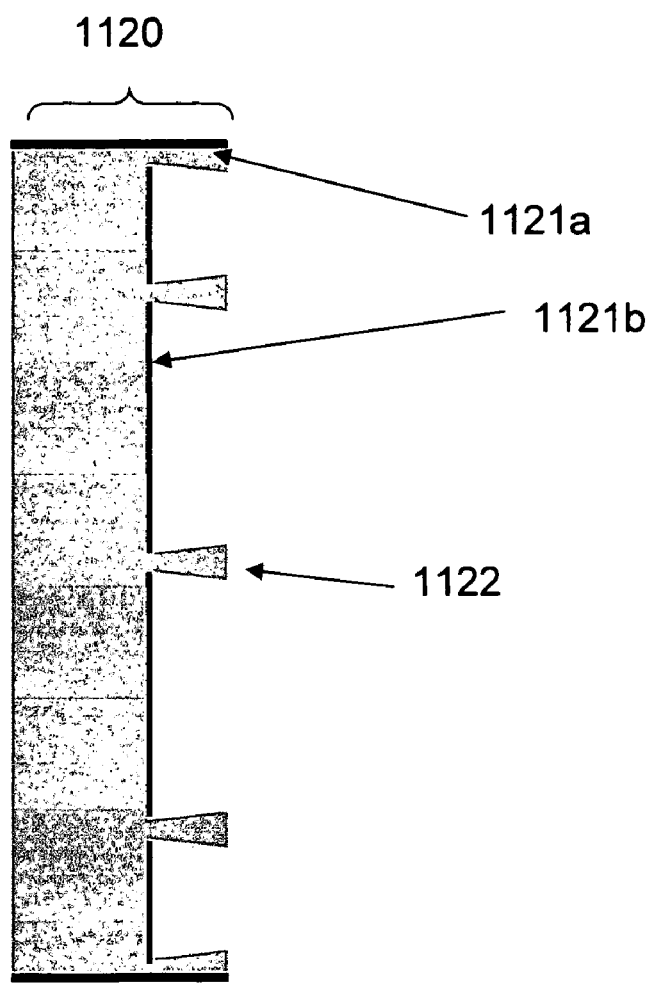
FIG. 6L shows a cross-sectional view of extraction array of FIG. 6I.
Figure 6M:
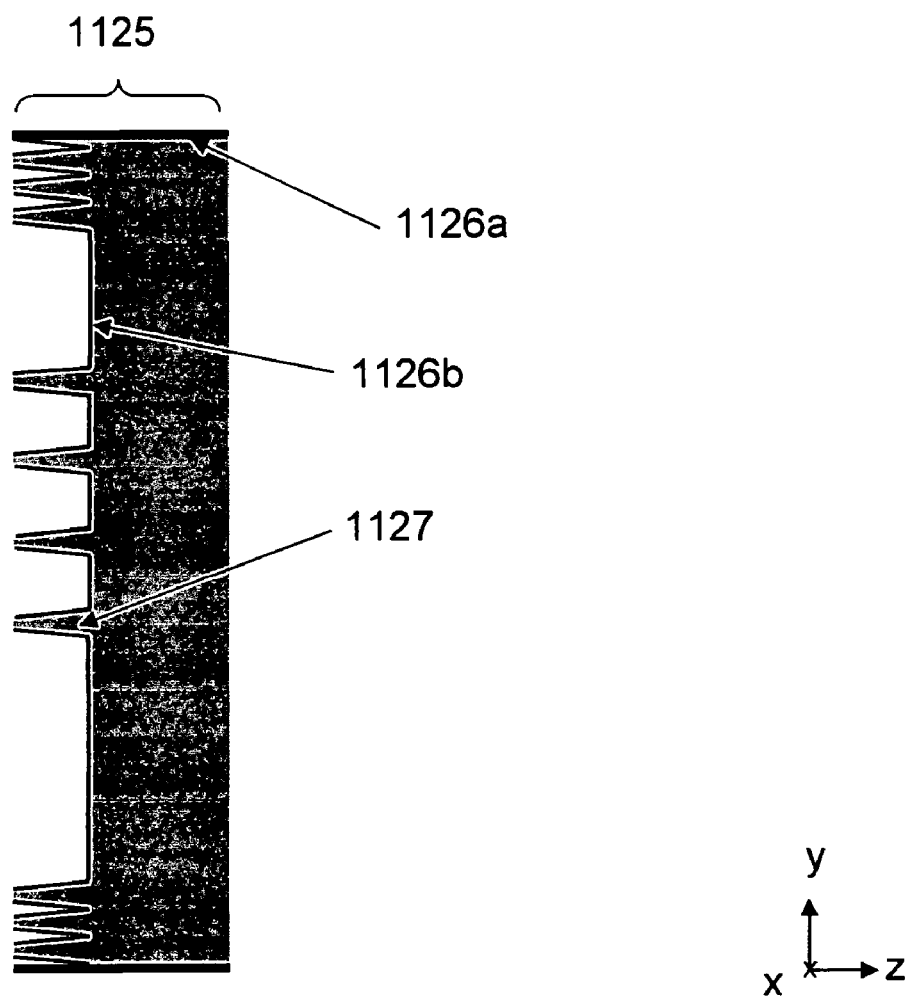
FIG. 6M shows a cross-sectional view of extraction array of FIG. 6J.
Figure 6N:
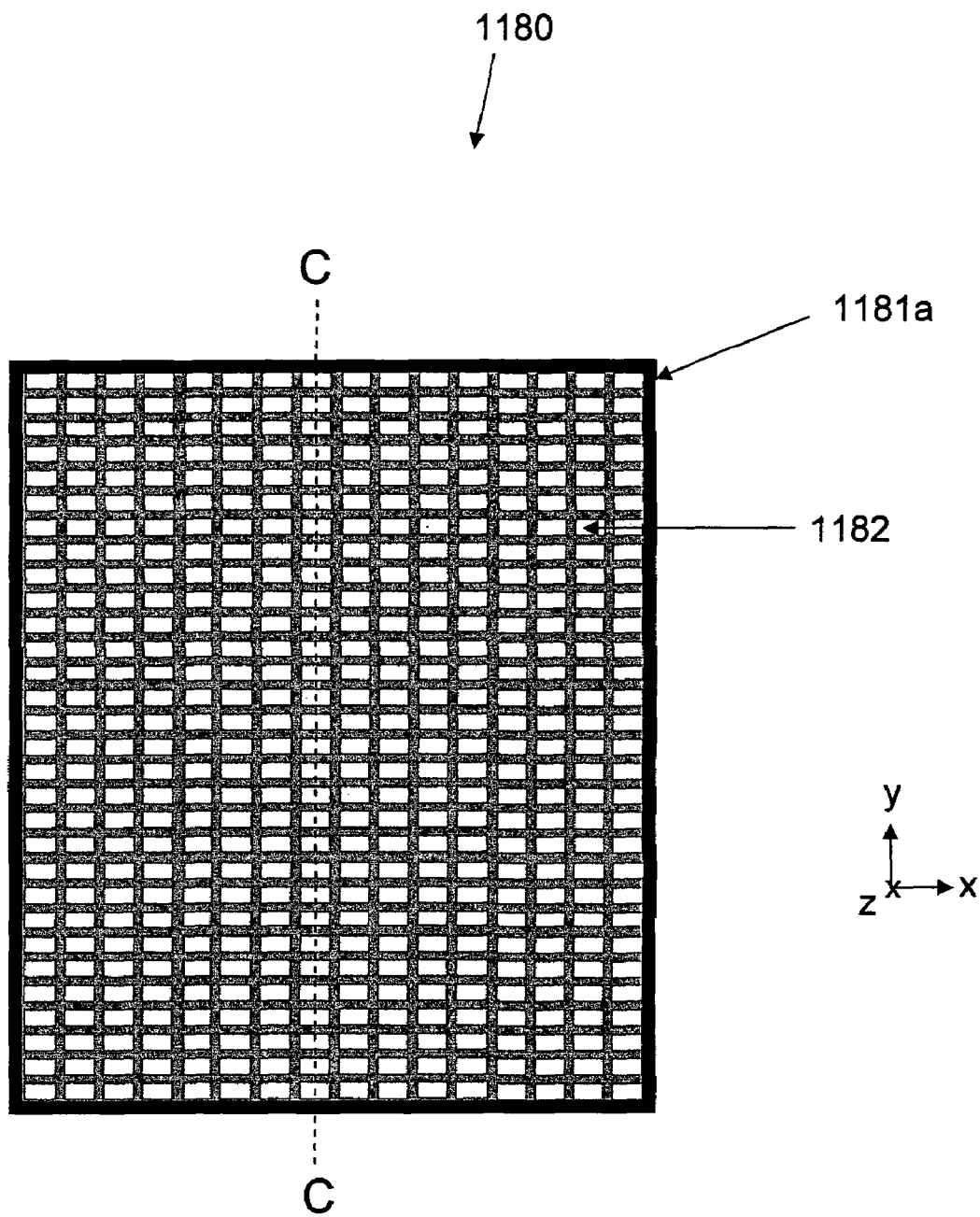
FIG. 6N shows a front plan view of a collimation array with micro-prisms distributed over the full surface of the array.
Figure 6O:
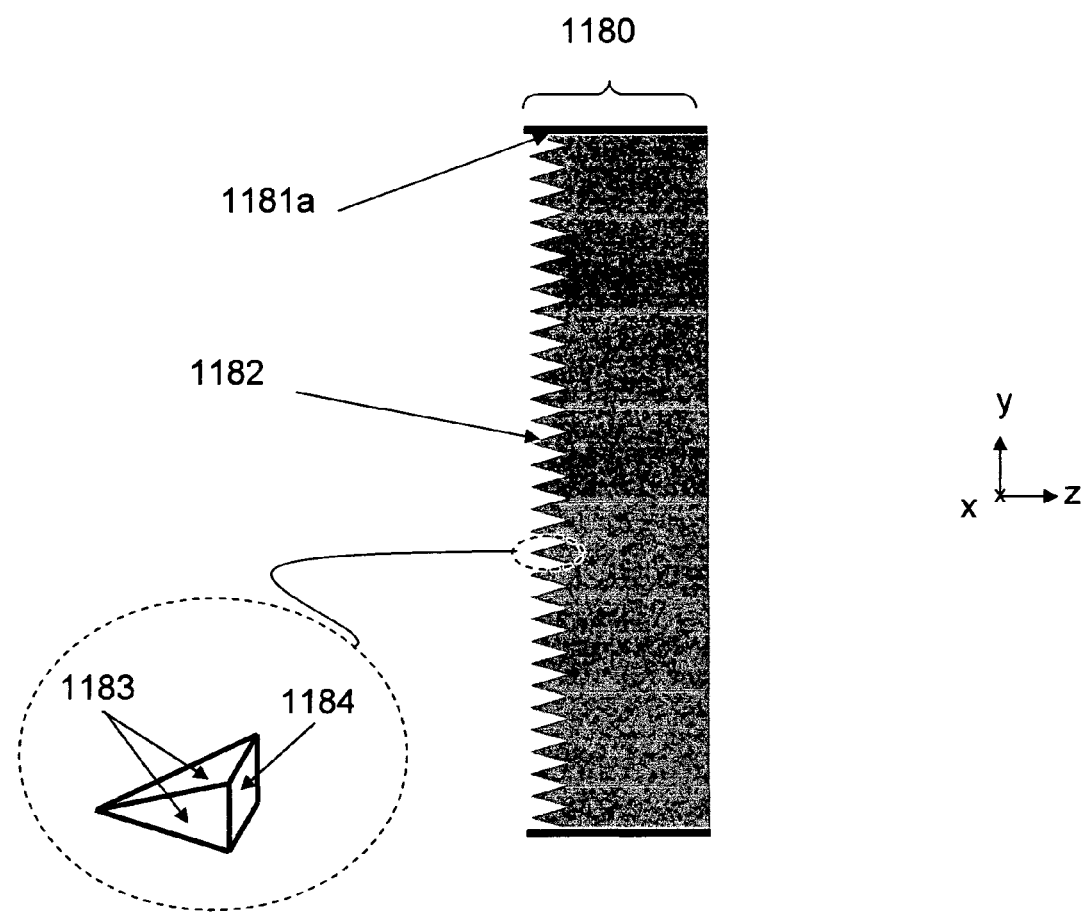
FIG. 6O shows a cross-sectional view of collimation array of FIG. 6N.

Alternatively, the circulation and extraction arrays are made on separate substrates as shown in FIGS. 6G-6S. FIG. 6G shows a plan view of a two-dimensional optical element array 1100, which consists of circulation micro-elements 1102 arranged in two dimensions (x and y) and occupying the full surface area of array 1100. As shown in FIG. 6H, it is also possible to have the circulation micro-elements 1102 spread over part of the surface area of array 1110 while the rest of the array has no micro-elements. The distribution of circulation micro-elements 1102 and 1112 can be uniform, non-uniform, random, and non-random. Optional reflective layers 1101a and 1111a are bonded or deposited on the edges of circulation arrays 1100 and 1110, respectively. In addition, optional reflective layers 1101b and 1111b are deposited on the sidewalls of circulation micro-elements 1102 and 1112, respectively. FIG. 6I-6J show plan views of a two-dimensional extraction arrays 1120 and 1125. The extraction micro-elements 1122 and 1127 are distributed non-uniformly over the surface area of arrays 1120 and 1125. The density of extraction micro-elements 1122 and 1127 is lowest at the array 1120 and 1125 center where the intensity of received light is highest and increases as the light intensity decreases leading to highest density levels of extraction micro-elements near the array 1120 and 1125 edges. The area around the extraction micro-elements 1122 and 1127 can be air or any other material with lower refractive index than that of the micro-elements 1122 and 1127 themselves. Cross-sectional views 1100, 1120 and 1125 along line C of FIGS. 6G, 6I and 6J are shown in FIGS. 6K, 6L and 6M, respectively. As shown in FIGS. 6L-6M, the areas between extraction micro-elements 1122 of array 1120 as well as areas between extraction micro-elements 1127 and their sidewalls of array 1125 are coated with reflective layers 1121b and 1126b. FIG. 6N shows a plan view of micro-prisms 1182 arranged in a two-dimensional micro-prism array 1180. Reflective layer 1181a is bonded to or deposited on the four sidewalls of array 1180. FIG. 6O shows a cross-sectional view of micro-prism array 1180 along line C of FIG. 6N with an exploded three-dimensional view of micro-element 1182. As shown in FIG. 6O, each micro-prism 1182 has four sidewalls 1183 (only two sidewalls are shown in the perspective view of the exploded micro-prism) as well as entrance 1183 and exit 1184 apertures.

Figure 6P:
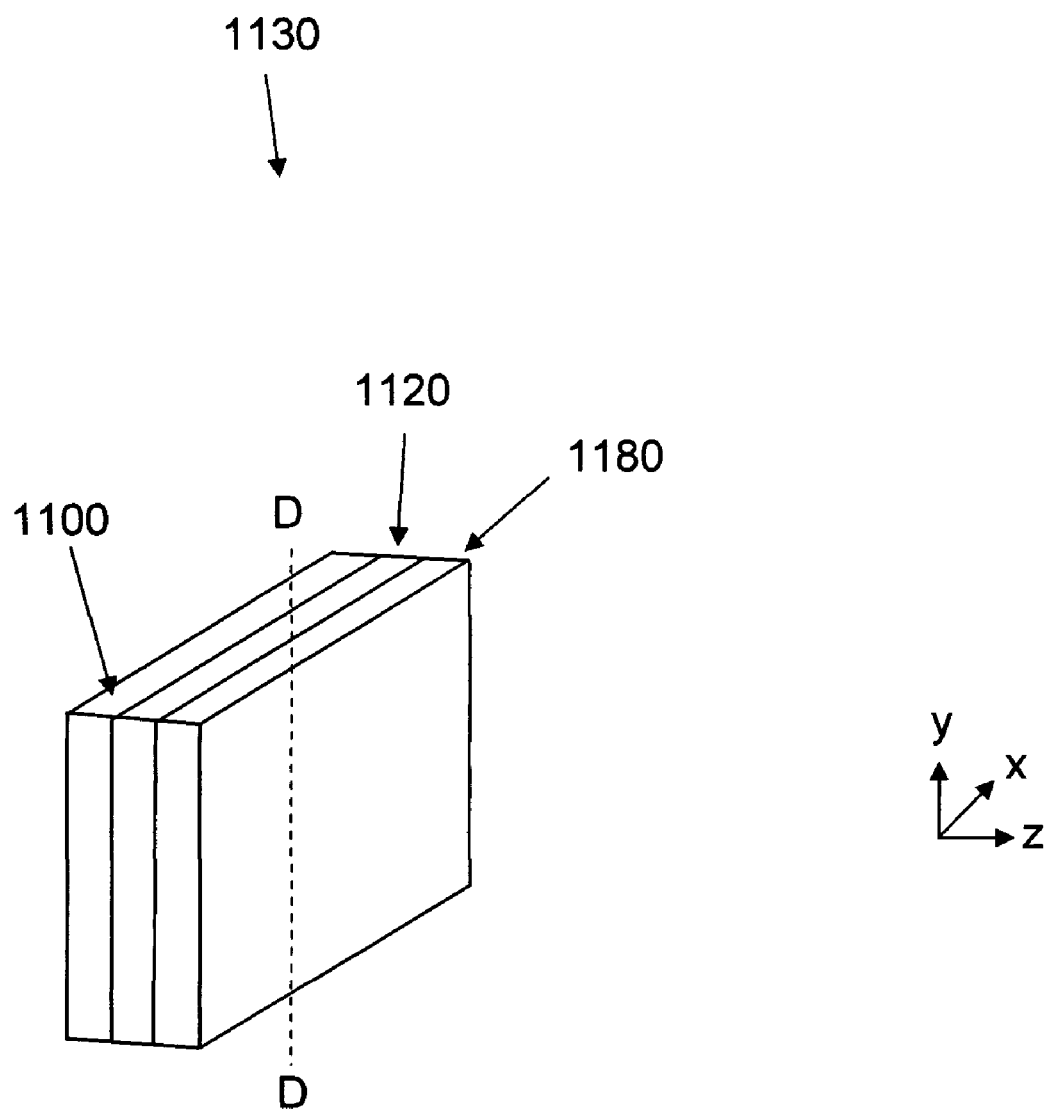
FIG. 6P shows a perspective view of a compact homogenizer with a collimation array, which homogenizer is usable with the projection systems described herein.
Figure 6Q:
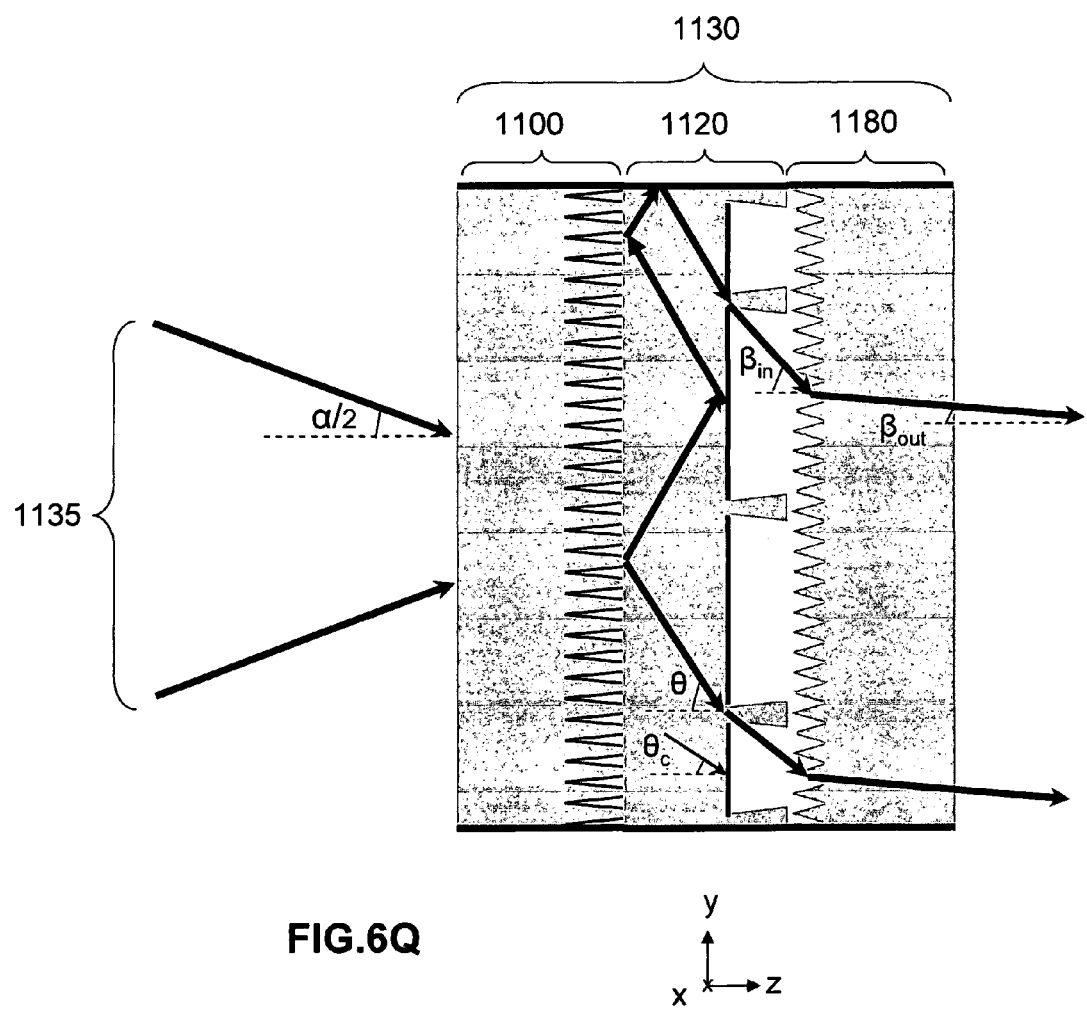
FIG. 6Q shows a cross-sectional view of the compact homogenizer of FIG. 6P.
Figure 6R:
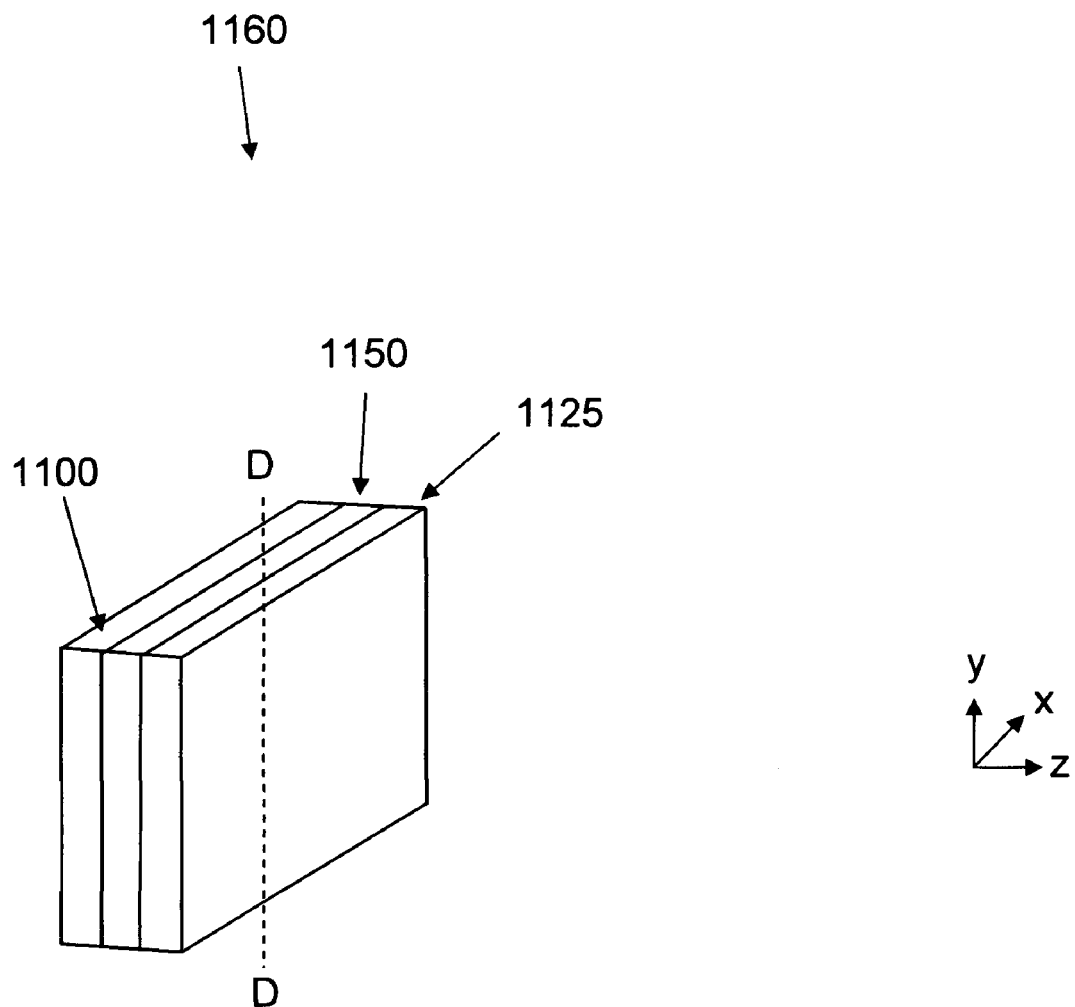
FIG. 6R shows a perspective view of a compact homogenizer without a collimation array, which homogenizer is usable with the projection systems described herein.
Figure 6S:
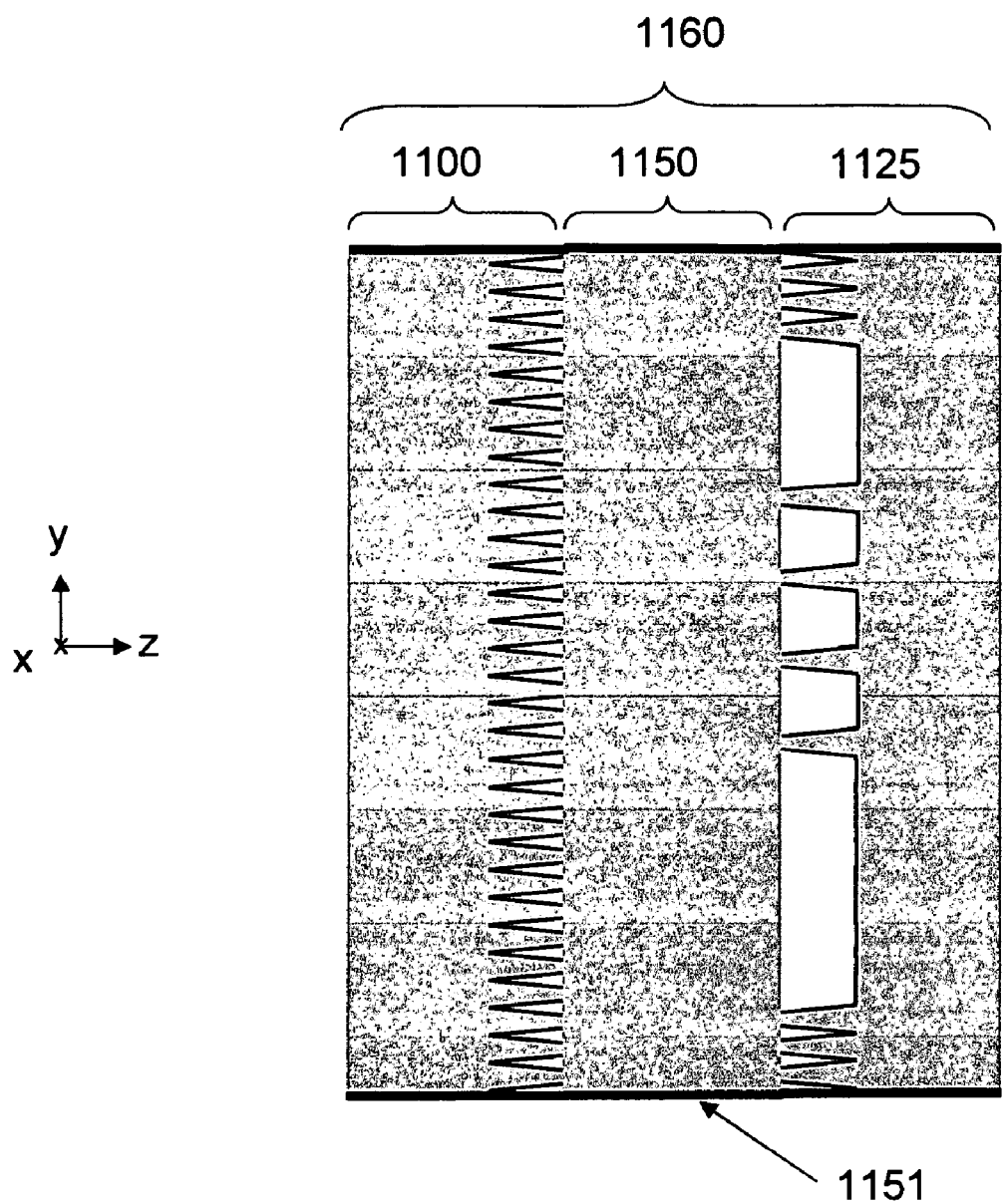
FIG. 6S shows a cross-sectional view of the compact homogenizer of FIG. 6R.

FIGS. 6P and 6R show perspective views of two homogenizers 1130 and 1160. FIGS. 6Q and 6S show the corresponding cross-sectional views of homogenizers 1130 and 1160 along line D of FIGS. 6P and 6R. Homogenizer 1130 consists of circulation optical element array 1100, extraction optical element array 1120 and micro-prism array 1180, which are attached or bonded together as shown in FIGS. 6P-6Q. As shown in FIGS. 6R-6S, homogenizer 1160 consists of circulation optical element array 1100, plain glass plate 1150 with reflective layer on its four sidewalls and extraction optical element array 1125, which are attached or bonded together.

Homogenizers 1130 and 1160 receive a non-homogeneous light beam such as beam 1135 of FIG. 6Q at their center and provide uniform and collimated light beam over their surface area (i.e. exit aperture). Arrays 1130 and 1160 can be used with optional relay lenses to couple light sources to display panels in projection systems such as these of FIGS. 2E and 2F. As shown in FIG. 6Q, optical element array 1100 receives a light beam with a certain cone angle $\alpha$ at its center, increases its cone angle via reflection through waveguides 1102 and delivers it to the body of optical element array 1120. This light beam travels within the body of optical element array 1120 via TIR except for the portion of light beam whose angle of incidence is smaller than the critical angle $\theta_c$ of array 1120, which exits the body of array 1120 without experiencing TIR and travels toward array 1180 through waveguides 1122 and areas 1121b between them. The part of the light traveling via TIR within the body of array 1120 is extracted and collimated by waveguides 1122. To ensure the uniformity of extracted light over the exit aperture of optical element array 1120, distribution of waveguides 1122 over the surface area of array 1120 should be inversely proportional to the light intensity within the body of array 1120. In homogenizer 1160 of FIG. 6R-6S, the input light is focused onto the center of optical element array 1100, which in turn increases the angle of this light and delivers it to the body of glass plate 1150. The function of array 1100 is the same in both homogenizers 1130 and 1160. The light travels within glass plate 1150 via total internal reflection (TIR) and reflection off of reflective sidewalls of glass plate unless it is extracted by micro-elements 1127 within extraction array 1125. Extraction array 1125 is designed as described to uniformly extract light from the glass plate 1150. In recycler 1160, light gets collimated within the tapered waveguides 1127. In addition, it is possible to use a collimating optical element array or micro-prism array after array 1125 to enhance light collimation.

Figure 6T:
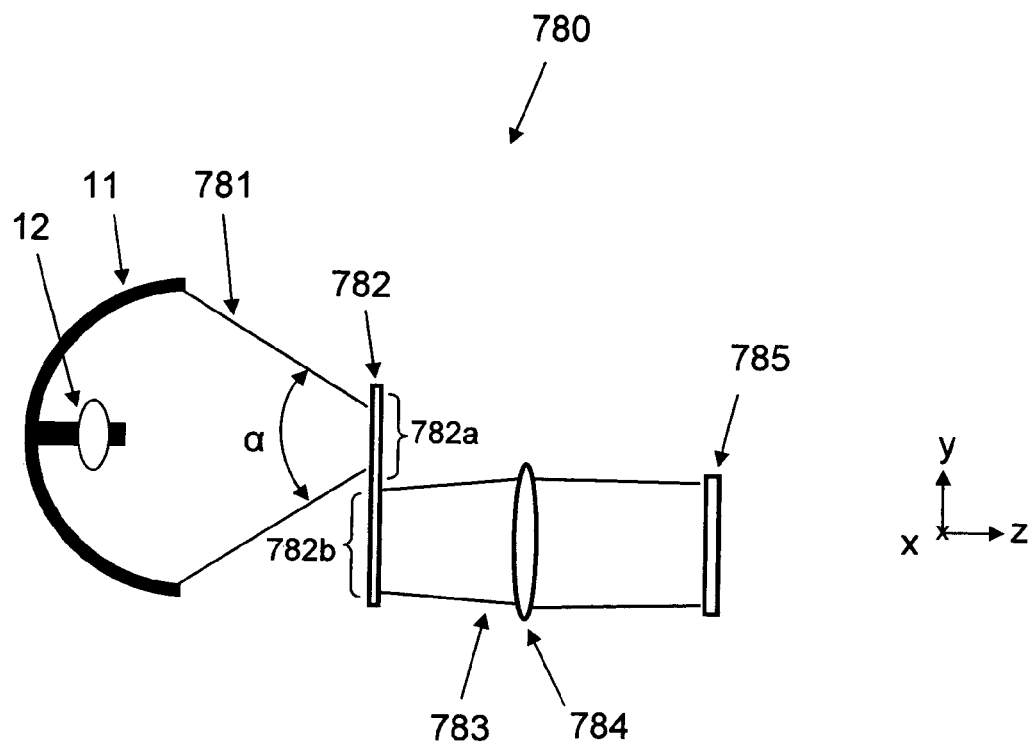
FIG. 6T shows a cross-sectional view of an illumination system utilizing an optical element array with non-overlapping circulation and extraction arrays in accordance with a thirteenth embodiment of the present invention.

In another exemplary embodiment of the invention, non-overlapping circulation and extraction arrays are used. FIG. 6T shows a cross-sectional view of an illumination system 780 using an optical element array 782, which consists of non-overlapping circulation 782a and extraction 782b arrays. Input light 781 is focused onto the input aperture of circulation array 782a, which directs light beam 781 toward extraction array 782b after experiencing multiple TIR and/or reflections within the body of optical element array 780. Extraction array 782b extracts light out of the body of optical element array 780 and directs it toward an optional relay lens 784, which in turn images the exit aperture of the extraction array 782b onto the display panel 785.

Extraction array 776, 778, 782b and 791 consists of micro-elements that may have random, non-random, uniform and non-uniform distributions over the exit aperture of the optical element array 770, 782 and 790. Forms of micro-elements and optical element arrays discussed in this disclosure such as those shown in FIGS. 4-5 can be used in forming extraction arrays and their micro-elements. The operation of micro-elements within the optical element arrays discussed in this disclosure including those of FIGS. 4-5 is similar to the operation of micro-elements within the extraction arrays.

Figure 6U:
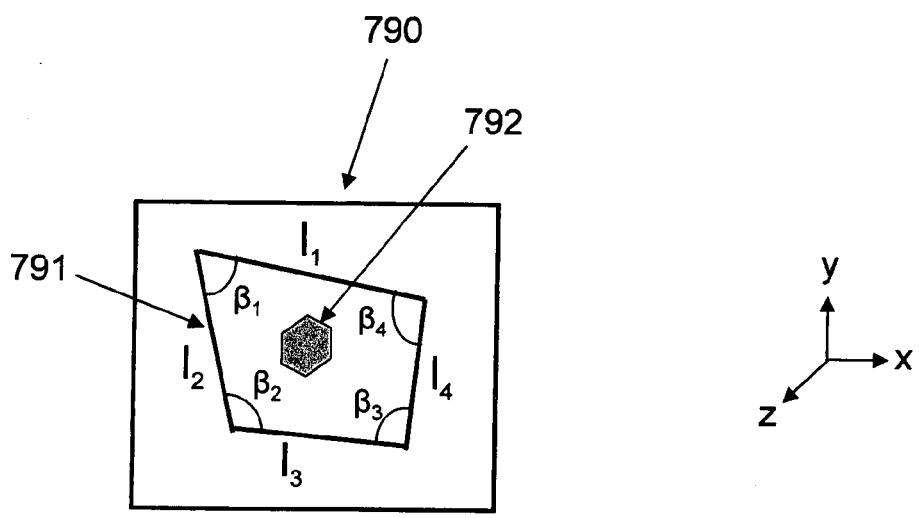
FIG. 6U shows a front plan view of an asymmetrical optical element array with overlapping circulation and extraction arrays.

An asymmetrical extraction array can be used to compensate for Keystone distortion, illumination overfill regions, and illumination drop-off regions which occur in some projection systems. A perspective view of a rectangular optical element array 790 which has an asymmetrical extraction array 791 and hexagonal circulation array 792 embedded within the extraction array 791 is shown in FIG. 6U. Extraction array 791 leads to reduced light loss, increased brightness, and enhanced brightness uniformity across the display panel surface area. Design parameters of asymmetrical extraction array 791 include array lengths $l_1$, $l_2$, $l_3$ and $l_4$ and angles $\beta_1$, $\beta_2$, $\beta_3$ and $\beta_4$ as well as design parameters of micro-elements within extraction array 791. Circulation array 792 and extraction array 791 can be non-overlapping.

Figure 6V:
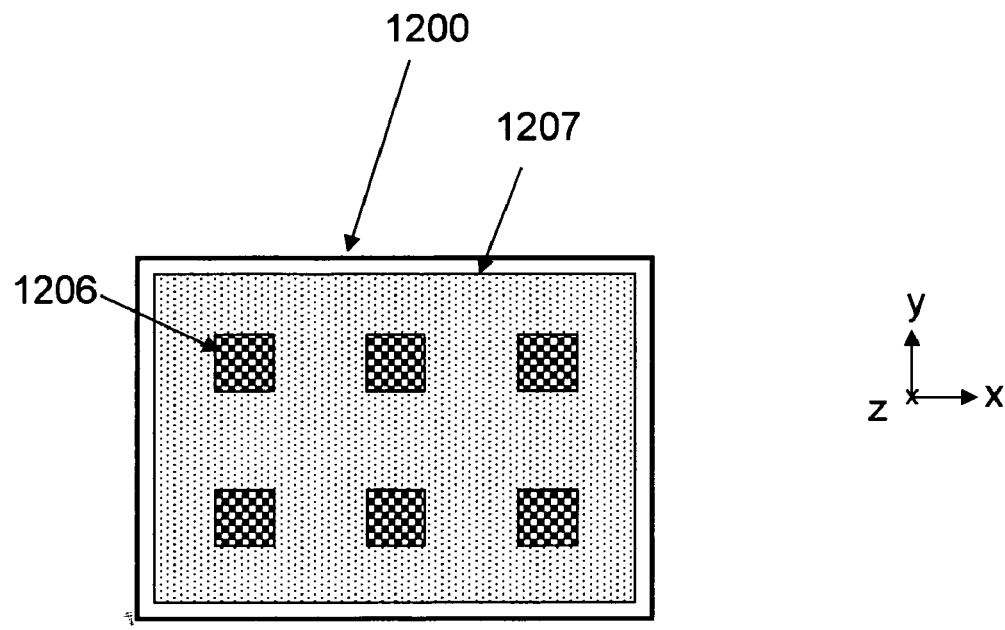
FIG. 6V shows a front plan view of an optical element array with six circulation arrays embedded in one extraction array.
Figure 6W:
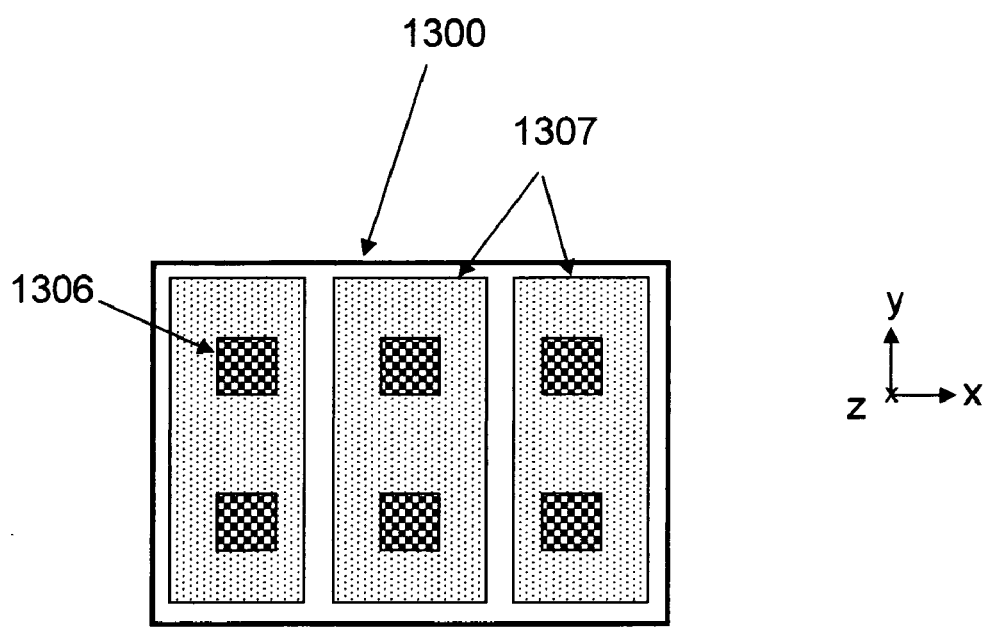
FIG. 6W shows a front plan view of an optical element array with six circulation arrays and three extraction arrays.

FIGS. 6V-6W show optical element arrays 1200 and 1300 that can handle an array of light sources. In FIG. 6V, optical element array 1200 has six circulation arrays 1206 embedded in one extraction array 1207. FIG. 6W shows optical element array 1300 which has six circulation arrays 1306 embedded in three separate extraction arrays 1307. Shapes, sizes and distribution of circulation arrays 1206 and 1306 and extraction arrays 1207 and 1307 within optical element arrays 1200 and 1300 are considered part of the design parameters. These kinds of optical element arrays 1200 and 1300 are suitable for illumination systems that use arrays of light sources such as light emitting diodes and semiconductor lasers. Antireflection coating (ARC) can be applied to the front and/or back sides of the optical element arrays of FIGS. 6A-6W to reduce Fresnel reflections.

Figure 3A:
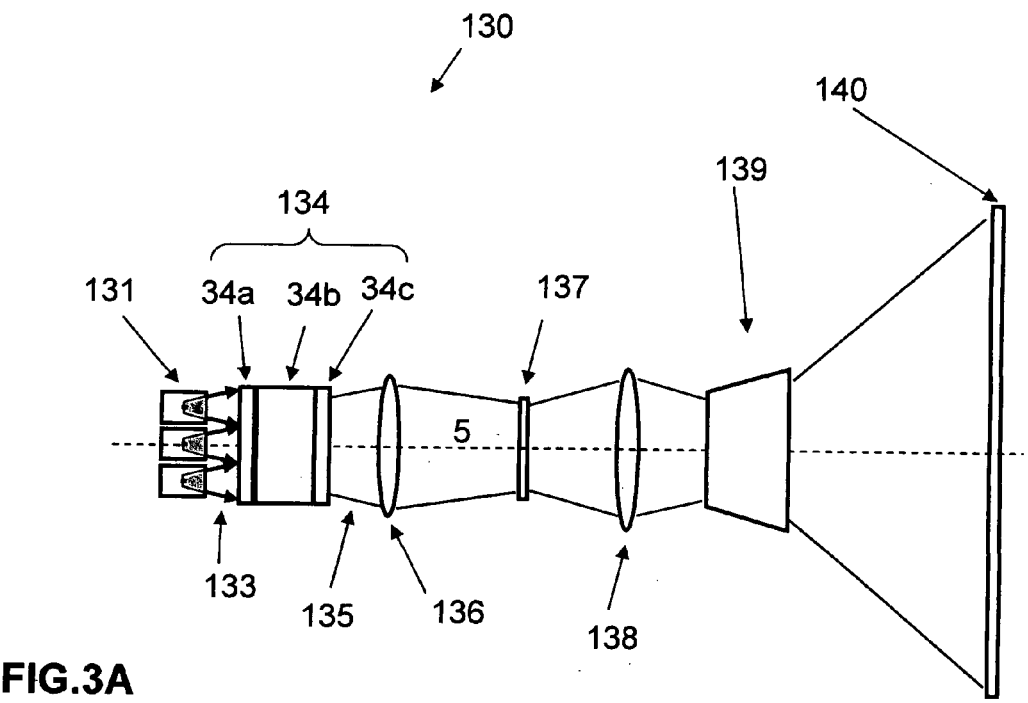
FIG. 3A shows a cross-sectional view of a projection system utilizing an array of light sources (e.g., LEDs, lasers, CCFLs) and a homogenizer to provide uniform light distribution to a transmissive display panel in accordance with a seventh embodiment of the present invention.
Figure 3B:
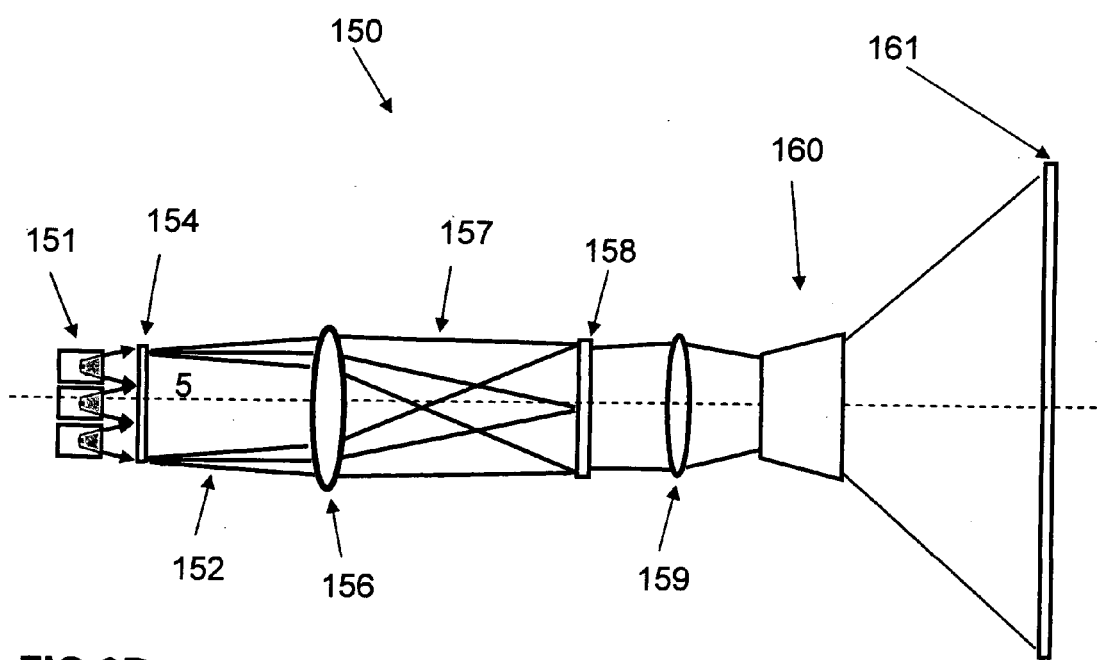
FIG. 3B shows a cross-sectional view of a projection system utilizing an array of light sources (e.g., LEDs, lasers, CCFLs) and an optical element array coupled with a focusing lens to provide uniform light distribution to a transmissive display panel in accordance with a eighth embodiment of the present invention.
Figure 3C:
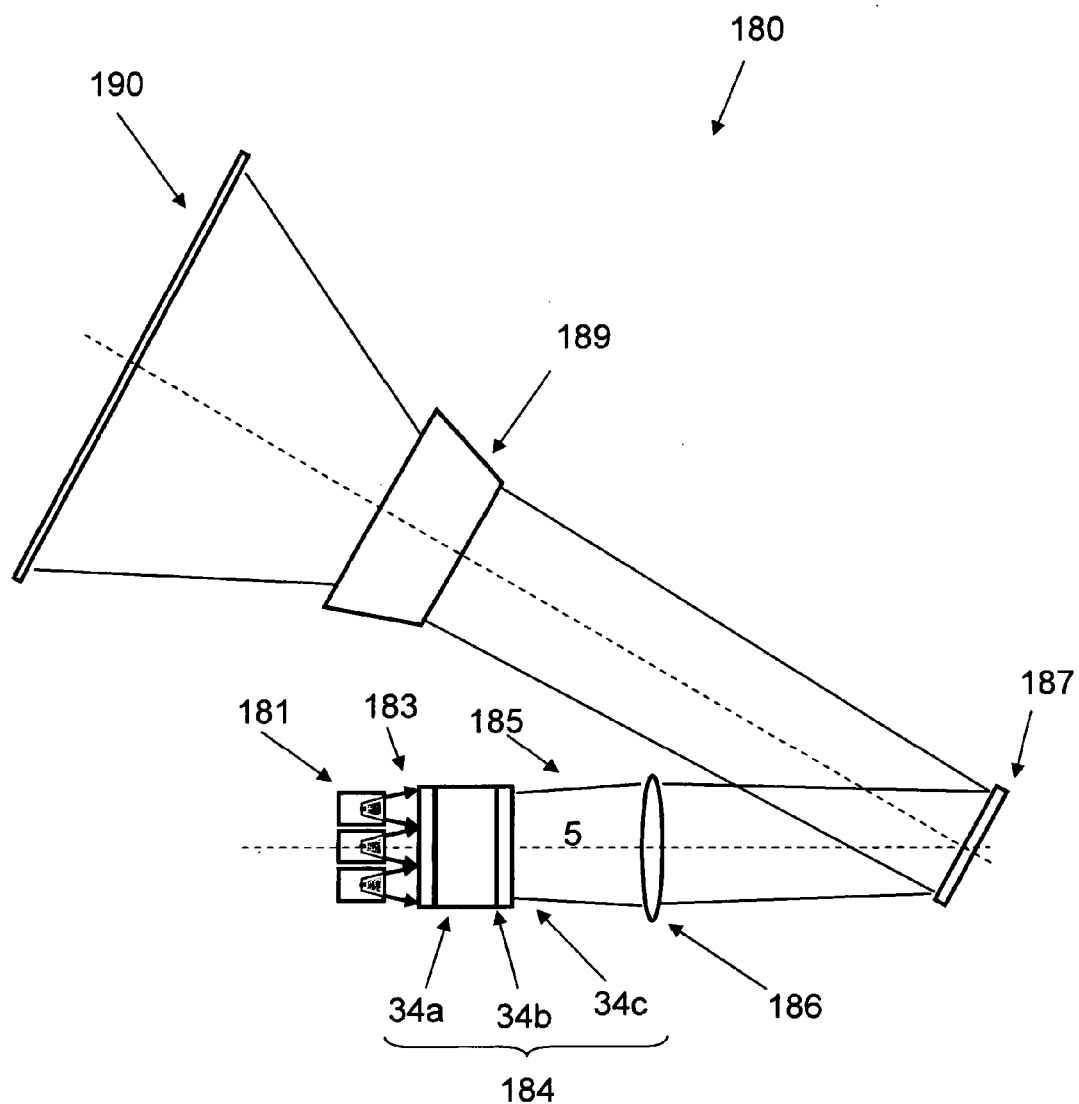
FIG. 3C shows a cross-sectional view of a projection system utilizing an array of light sources (e.g., LEDs, lasers, CCFLs) and a homogenizer to provide uniform light distribution to a reflective display panel in accordance with a ninth embodiment of the present invention.

FIGS. 3A-3F show cross-sectional views of projection systems 130, 150, 180 200, 250 and 280 that use arrays 131, 151, 181, 201, 251 and 281 of light sources such as Light Emitting Diodes (LEDs), semiconductor laser devices, organic electroluminescence devices and/or cold cathode fluorescent lamps (CCFLs), in accordance with further exemplary embodiments of the present invention. These arrays 131, 151, 181 201, 251 and 281 may consist of one light source such as a single LED and may consist of two or more light sources arranged in one-dimensional or two-dimensional arrays. In FIGS. 3A and 3C, arrays 131 and 181 are placed next to homogenizers 134 and 184. The emitted light 133 and 183 is received by the homogenizers 134 and 184, which in turn deliver more uniform light beams 135 and 185 with lower cone angle to the display panels 137 and 187 through relay lenses 136 and 186. Whereas in FIGS. 3B, 3D, 3E and 3F, arrays 151, 201, 251 and 281 are placed next to optical element arrays 154, 204, 253 and 283. Excluding the light sources, the structures and operations of projection systems 130, 150, 180, 200, 250 and 280 of FIGS. 3A-3F are similar to these of projection systems 30, 50, 80 and 100 of FIGS. 2A-2D. The homogenizers 134 and 184 are similar to homogenizers 34 and 440 of FIGS. 2A, 2C and 2K and may consist of three (light guide 34b and 440b as well as optical element arrays 34a, 34c, 440a and 440c) or two (light guide 34b and 440b as well as optical element array 34a and 440a) components. A polarizer and analyzer (not shown) need to be inserted before and after the display panel, respectively, when liquid crystal display panels are used.

Figure 4A:
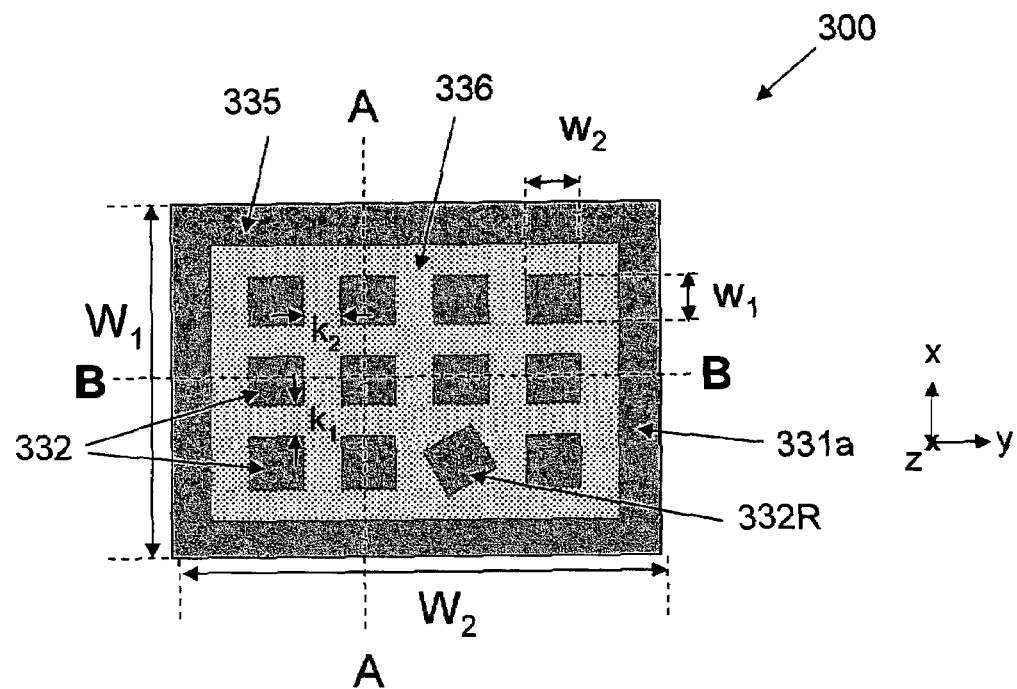
FIG. 4A shows a front plan view of a two-dimensional straight, rectangular optical element array usable in the projection systems described herein.
Figure 4B:
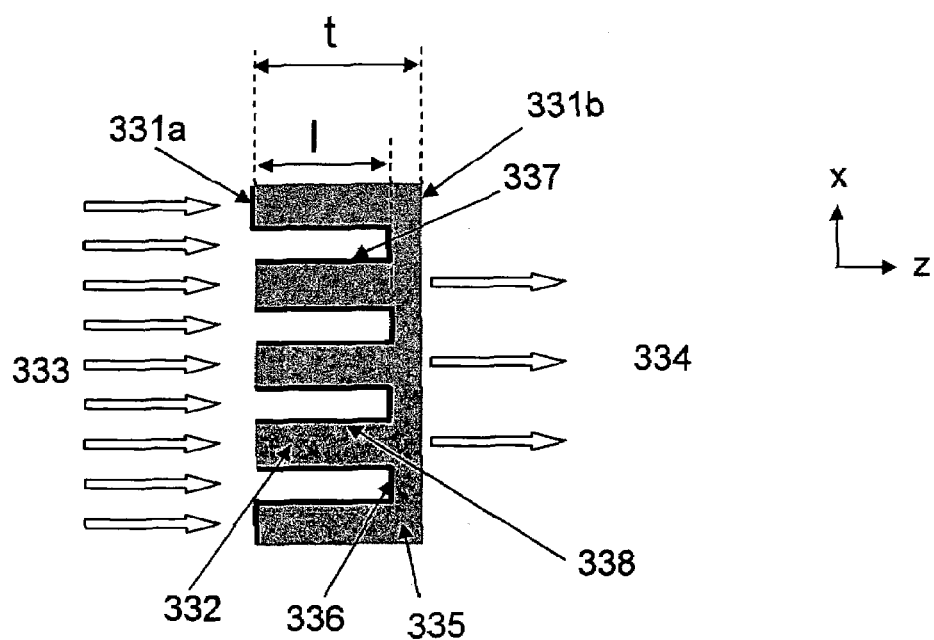
FIG. 4B shows a cross-sectional view of the straight optical element array of FIG. 4A, along line A. The sidewalls and areas between waveguides are coated with a reflective layer.
Figure 4C:
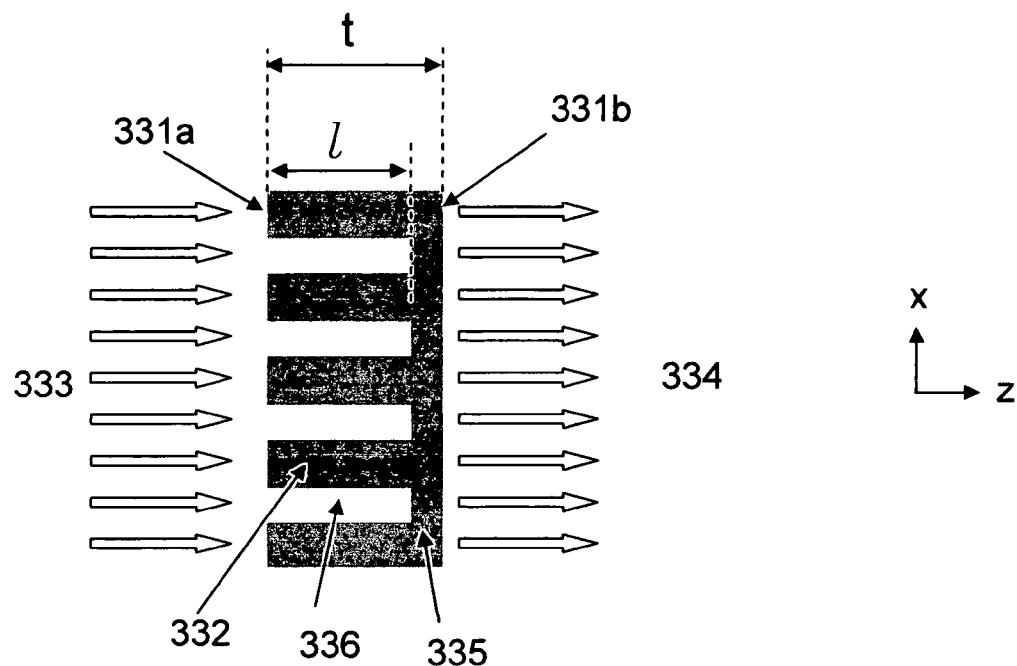
FIG. 4C shows a cross-sectional view of the straight optical element array of FIG. 4A, along line A, where no reflective coating is used.
Figure 4D:
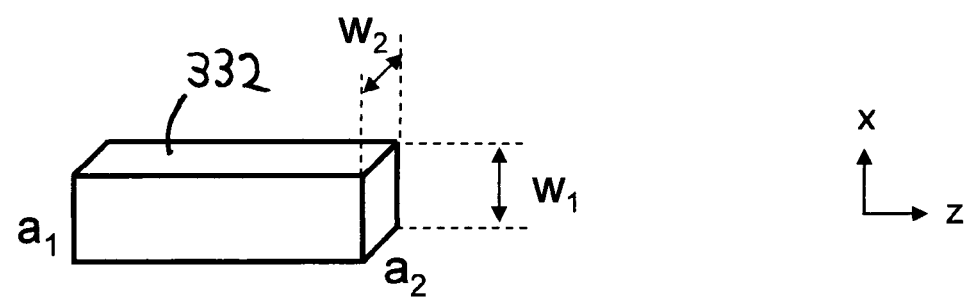
FIG. 4D shows a side perspective view of one of the straight waveguides of FIGS. 4A-4C. The entrance and exit apertures have $w_1 \times w_2$ dimensions.
Figure 4E:
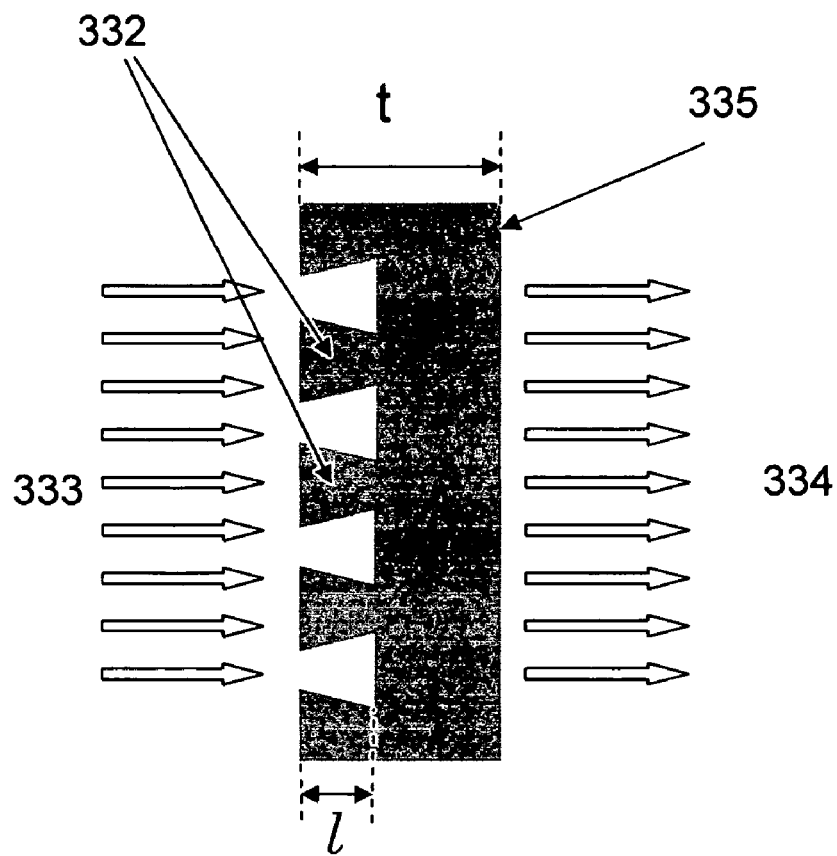
FIG. 4E shows a cross-sectional view of a tapered optical element array along line A of FIG. 4A. No reflective coating is used.
Figure 4F:
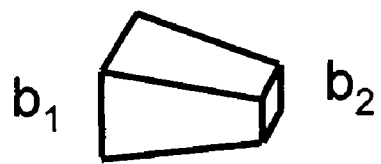
FIG. 4F shows a side perspective view of one of the tapered waveguides of FIG. 4E. The size of the entrance aperture $b_1$ is larger than that of the exit aperture $b_2$.
Figure 4G:
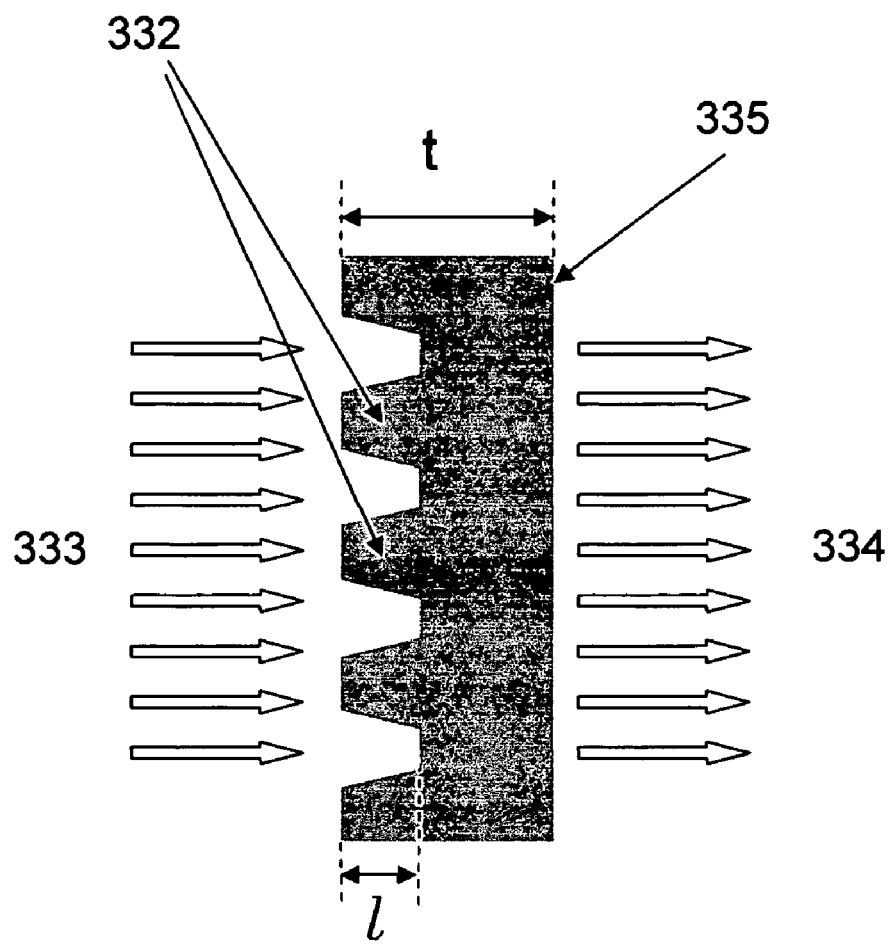
FIG. 4G shows a cross-sectional view of a second type of tapered optical element array along line A of FIG. 4A. No reflective coating is used.
Figure 4H:
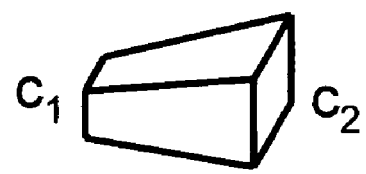
FIG. 4H shows a side perspective view of one of the tapered waveguides of FIG. 4G. The size of the entrance aperture $c_1$ is smaller than that of the exit aperture $c_2$.
Figure 4I:
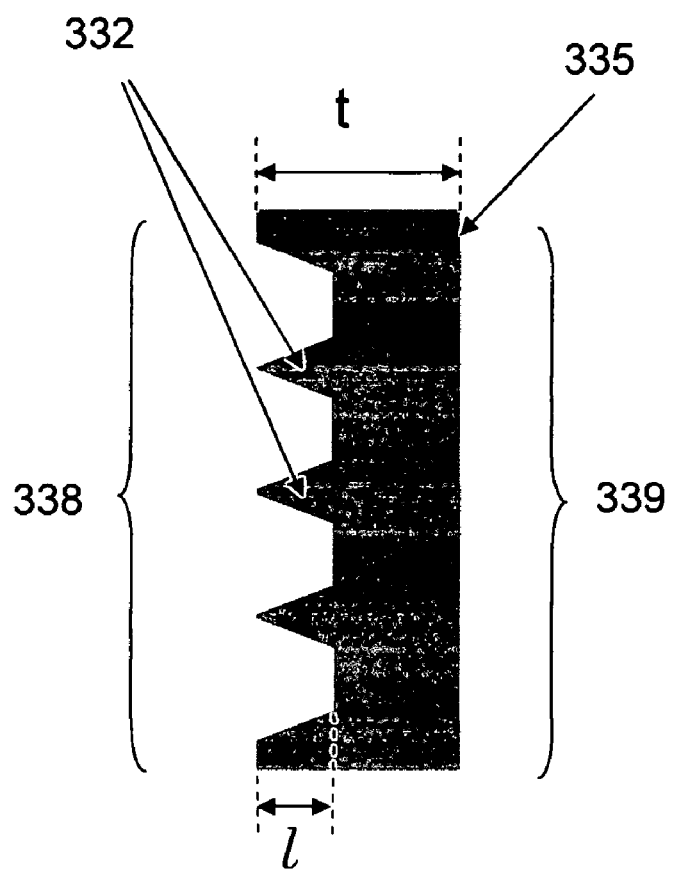
FIG. 4I shows a cross-sectional view of a micro-prism array along line A of FIG. 4A. No reflective coating is used.
Figure 4J:
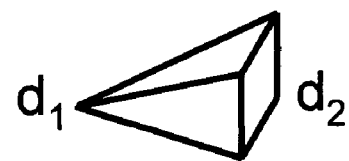
FIG. 4J shows a side perspective view of one of the micro-prisms of FIG. 4I.
Figure 4K:
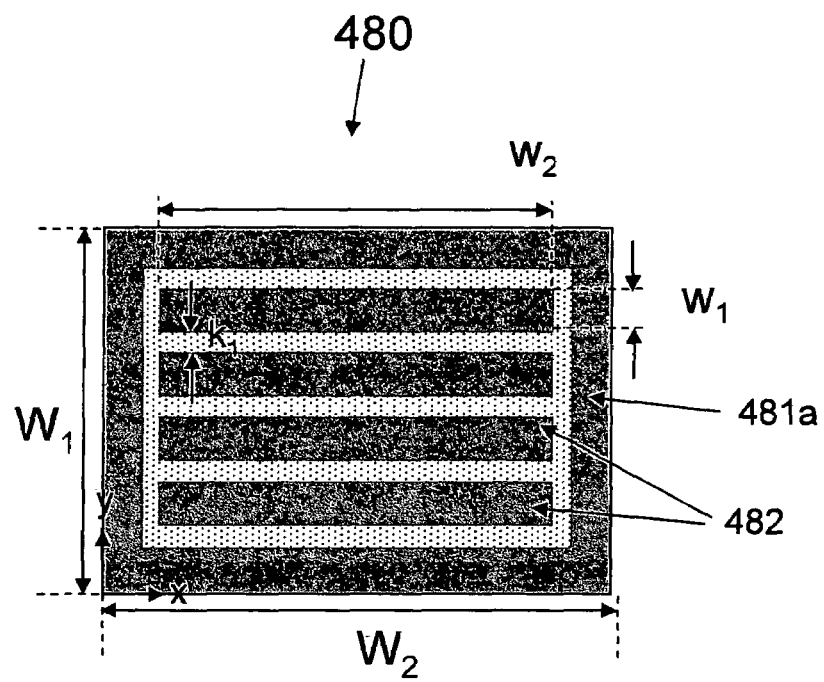
FIG. 4K shows a front plan view of a one-dimensional rectangular optical element array usable in the projection systems described herein.
Figure 4L:
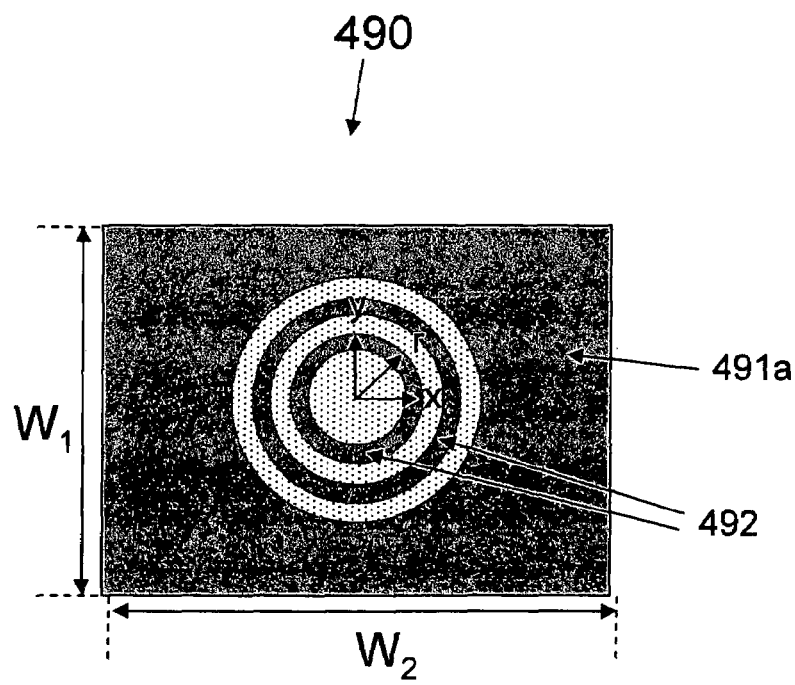
FIG. 4L shows a front plan view of an optical element array consisting of rings of waveguides, which is usable in the projection systems described herein.
Figure 4M:
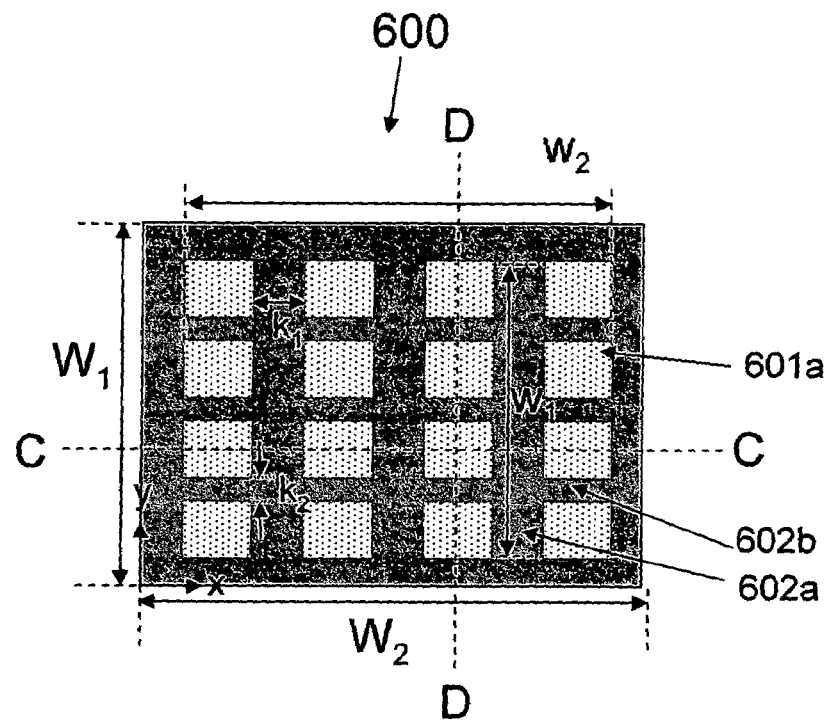
FIG. 4M shows front plan view of a two-dimensional, straight, rectangular optical element array with a cross-hatched structure, which is usable in the projection systems described herein.
Figure 4N:
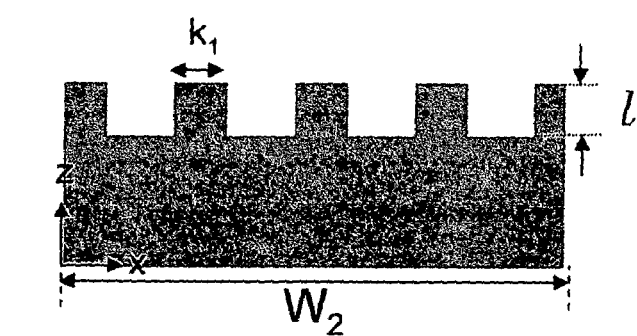
FIG. 4N shows a cross-sectional view of the straight optical element array of FIG. 4M, along line C.
Figure 4O:
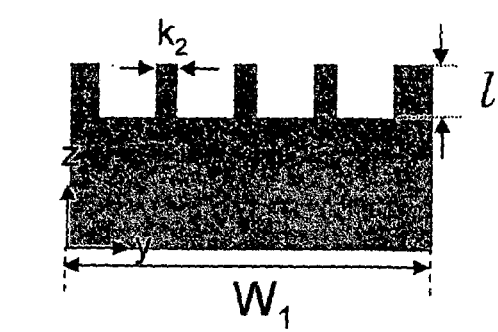
FIG. 4O shows a cross-sectional view of the straight optical element array of FIG. 4M, along line D.

The micro-elements within the optical element arrays 34a, 34c, 440a, 440c, 54 and 104 can be waveguide and micro-lens arrays such as those of FIGS. 4A-4O and FIGS.

5A-5G. In addition, it is possible to use micro-tunnel and optical element arrays described in U.S. patent application Ser. No. 10/458,390 to Abu-Ageel, which is incorporated by reference. Optical element arrays 34a, 34c, 440a, 440c, 54 and 104 can have any combinations of waveguide, micro-lens and micro-tunnel elements. In addition to using spherical micro-lenses, aspherical micro-lenses may be used in a micro-lens array to correct for spherical aberrations of the fundamental spherical shape of the aspherical micro-lens, thus, improving the imaging quality. Other types of optical element arrays such as those shown in FIGS. 4 and 5 can perform the function of optical element arrays 34a, 34c, 440a, 440c, 54 and 104 of FIGS. 2A-2D and 2K. Optical element arrays of FIG. 6 can be used to perform the function of optical element arrays 253 and 283 in projection systems of FIGS. 3E-3F. For example, FIGS. 6V-6W show optical element arrays 1200 and 1300 which are specifically useful for illumination systems utilizing more than one light source or light source arrays.

FIGS. 4A-4O show solid (i.e. not hollow) straight and tapered optical element arrays. FIG. 4A shows a plan view of a two-dimensional waveguide array system 300, which consists of waveguides 332 arranged in two dimensions (x and y). In general, an optical element array 300 can have waveguides 332 ranging from few to millions with each waveguide being distinct in terms of size and shape of its cross section. For simplicity of illustration, the array 300 is shown to have 12 waveguides 332 arranged in 3 rows and 4 columns. Each waveguide 332 has $w_1 \times w_2$ cross section area ranging from tens to several hundreds $\mu m^2$ while the array 300 has a cross section area of $W_1 \times W_2$ ranging from several $mm^2$ to several hundreds $mm^2$. To avoid light diffraction phenomenon in case of visible light, the waveguide 332 dimensions $w_1$ and $w_2$ are preferably $\geq 5$ $\mu m$. However, it is possible to design elements with sizes of entrance/exit aperture being <5 $\mu m$ or even at the nano scale. In such case, the design should consider the diffraction phenomenon and behavior of light at such scales in order to provide homogeneous light distributions in terms of intensity, viewing angle and color over a certain area. Separations $k_2$ and $k_1$ between the waveguides in the x- and y-directions, respectively, are preferably zero but can be up to several tens of microns depending on the application. $k_2$ and $k_1$ can be uniform as shown in FIG. 4A and can be non-uniform or random across the length and width of the optical element array. Each waveguide 332 within optical element array 300 can have its own orientation, which might be different from the orientation of optical element array 300. For example, waveguide 332R is rotated with respect to the axes of optical element array 300 as shown in FIG. 4A. In addition, the distribution of the individual waveguides 332 within the optical element array 300 can be non-uniform or random in both x- and y-directions.

FIG. 4B shows a cross section view of FIG. 4A taken along line A. The waveguides 332 of FIG. 4B are of the straight type (FIG. 4D) but can be also of the tapered type (FIGS. 4F and 4H). As shown in FIG. 4B, the waveguides 332 length is l and the frame 335 thickness is t. The frame 335 material is preferably made of an optically transmissive material with optically smooth surfaces, which can be but not limited to glass (Pyrex, quartz, corning 1737F) and polymers (PMMA, PC, Arton, Zeonor). The frame 335 is preferably thick enough to support the whole array 300. The waveguides 332 and frame 335 can be made from the same material as shown in FIGS. 4B, 4C and 4E. On the other hand, the waveguides 332 can be fabricated then bonded to a substrate or frame 335 made from a different material. The area 336 surrounding the solid waveguides 332 can be air or any other material that has an index of refraction less than that of waveguides 332.

FIG. 4D shows a 3-dimensional view of the waveguide 332 with the entrance $a_1$ and exit $a_2$ apertures being equal to $w_1 \times w_2$. The waveguide 332 of FIG. 4D has four sidewalls that make zero degree angles with the z-axis (i.e. the normal to the surface of optical element array 300). Waveguides 332 are preferably made of an optically transmissive material with optically smooth entrance aperture, exit aperture and sidewalls.

As shown in FIG. 4B, the sidewalls of some or all solid waveguides 332 within an optical element array 300 can be coated with a reflective material 337 such as aluminum, silver and/or dielectric mirror (i.e. alternating layers of low-index and high index dielectric materials such as $SiO_2$ and $TiO_2$). This reflective coating 337 can be a cold mirror coating, thus leading to the removal of a major portion of IR heat from the light beam without the use of transmissive heat filters that reduce substantially the visible light in the beam. Deposition techniques such as sputtering, thermal or e-beam evaporation, plating and/or electroplating can be used to coat the sidewalls 338 of waveguides 332 and/or areas 336 and 331a with a reflective layer(s). As shown in FIG. 4B, part of light beam 333 incident on the entrance aperture of array 300 enters through the entrance apertures of waveguides 332 and gets transmitted via 0, 1, 2 or more reflections within waveguides 332 to the other side as light beam 334. The rest of the light beam 333 is reflected away from the entrance aperture of the array 300 by the reflective coating 337 deposited on areas 336, 338 and 331a.

In FIG. 4C, the sidewalls of solid waveguides 332 within an optical element array 300 are not coated with a reflective layer, thus, all the incident light 333 gets transmitted 334 through the optical element array 300 except for Fresnel reflections or absorption losses in the transparent optical element array 300. Fresnel reflections can be minimized by coating the entrance and exit apertures of the optical element array 300 with antireflection coating (ARC). The area 336 surrounding the waveguides 332 can be air or other transparent material with a smaller refractive index in order to satisfy one condition for total internal reflection (i.e. the reflection of the total amount of incident light at the boundary between two medium) within a waveguide 332. The other condition is satisfied when the angle of incidence of light propagating within the waveguide is smaller than the critical angle of a waveguide 332.

In this case, part of the light 333 incident upon the entrance aperture of the array 300 enters the entrance apertures of the waveguides 332 and the rest of the light enters area 336 surrounding the waveguides 332. Some of the light that enters the entrance apertures of waveguides 332 experiences total internal reflection (TIR) at the sidewalls of the waveguides 332 and some does not depending on the indices of refraction of both the waveguides 332 and the surrounding material 336 as well as the angle of incidence of light beam 333 upon the entrance aperture of each waveguide 332. The light that enters area 336 does not experience TIR and passes through the frame area 335 at the bottom of area 336 or passes through the sidewalls of waveguides 332 and may experience TIR within waveguides 332.

The ratio of the total cross-section area of the waveguides to the total area of the array defines the waveguide density of the array. For example, waveguide density of array 300 of FIG. 4A is $(12 \times w_1 \times w_2)/(W_1 \times W_2)$. This ratio can be increased by reducing $k_1$ and/or $k_2$ (i.e. reducing the size of area 336 surrounding the waveguides 332). The ratio of transmitted light 334 to incident light 333 defines the transmission ratio of the optical element array 300. Applying a reflective coating to the sidewalls 338 of waveguides 332 and area 336 (FIG. 4B) leads to a lower transmission ratio when compared to a completely transparent optical element array 300 (FIG. 4C).

The cross-section (i.e., entrance aperture) of each waveguide 332 in an array 300 can be designed in terms of size and shape independently of other waveguides 332 within the array 300. In general, there are no design or fabrication constraints on the shape of entrance aperture of a waveguide. Shapes such as square, triangular, rectangular, circular, oval, and irregular, in addition, combinations of various shapes within an array 300 are possible. Furthermore, the cross-section (i.e., entrance aperture) of the overall array 300 can have various sizes and shapes independent of sizes and shapes of waveguide entrance apertures.

Waveguides 332 of array 300 can be tapered rather than straight as shown in FIGS. 4E-4H. FIG. 4E shows a cross-sectional view of an optical element array 300 of FIG. 4A along line A with tapered waveguides 332 of the type shown in FIG. 4F. The entrance aperture $b_1$ of the tapered waveguide 332 of FIG. 4F is larger than the exit aperture $b_2$. In this case, the transmitted light 334 is less collimated (i.e. has larger cone angle) than the received light 333. In FIG. 4E, the waveguide 332 has a length l, which is smaller than the frame 335 thickness t. FIG. 4G shows a cross-sectional view of an optical element array 300 of FIG. 4A along line A with tapered waveguides 332 of the type shown in FIG. 4H. The entrance aperture $c_1$ of the tapered waveguide 332 of FIG. 4H is smaller than the exit aperture $c_2$. Therefore, optical element array of FIG. 4G delivers more collimated (i.e. has smaller cone angle) light 334 than the received light 333. If optical element array of FIG. 4G is rotated by 180°, it will perform the function of optical element array of FIG. 4E and vice versa. This 180° rotation is equivalent to reversing the direction of the light beams 333 and 334 so that the optical element array of FIG. 4G receives light beam 334 and delivers light beam 333.

FIG. 4I shows an optical element array 300 where the waveguides 332 have a prism shape, as shown in FIG. 4J. The prism's four sidewalls extend from the exit aperture $d_2$ of the prism and meet at one point $d_1$. The prism sidewalls form the entrance aperture of the prism assuming that the light beam is received from the left side 338 of the array. If the light beam is received from the opposite side 339, the base $d_2$ of the prism will form the entrance aperture.

An optical element array can be two-dimensional 300, 490 and 600 as shown in FIGS. 4A, 4L and 4M, respectively, as well as one-dimensional 480 as shown in FIG. 4K. In FIG. 4K, the waveguides 482 are arranged in one dimension along the y-axis and separated by a distance $k_1$. Each waveguide 482 has a $w_1 \times w_2$ size with two long sidewalls along the x-axis and two short sidewalls along the y-axis. The waveguide 482 shape can be straight, tapered, prism or combinations of various shapes. This one-dimensional array 480 alters light distribution along the y-axis without impacting light uniformity along the x-axis. FIG. 4L shows an array 490 with rings of waveguides 492 arranged along the radius r, which is capable of altering light distribution along x- and y-axes. The optical element array is not limited to the previously mentioned examples and can be composed of various types of waveguides arranged in endless ways. For example, an optical element array 600 can have intersecting waveguides 602 forming a crosshatched structure as shown in FIG. 4M. FIGS. 4N and 4O show cross-sectional views of FIG. 4M taken along lines C and D, respectively. The sizes of waveguides 602a and 602b are $w_1 \times k_1 \times l$ and $w_2 \times k_2 \times l$, respectively. Optical element array 600 can have straight waveguides 602 as shown in FIGS. 4N-4O and can also have other types of waveguides with various sizes, shapes and arrangements. $k_1$ and $k_2$ can be uniform across the length and width of the optical element array, respectively, as shown in FIG. 4M and can have non-uniform or random distributions in the x- and/or y-directions.

FIGS. 5A, and 5D-5I show additional optical element array configurations. One and two dimensional arrays 700, 730, 740, 750 and 760 have combinations of waveguide and micro-lens elements. FIGS. 5B-5C show one-dimensional 720A-B and two-dimensional 710 arrays consisting of only micro-lens elements. These types of micro-lens arrays 710 and 720 have been reported in the prior art of projection systems.

Figure 5A:
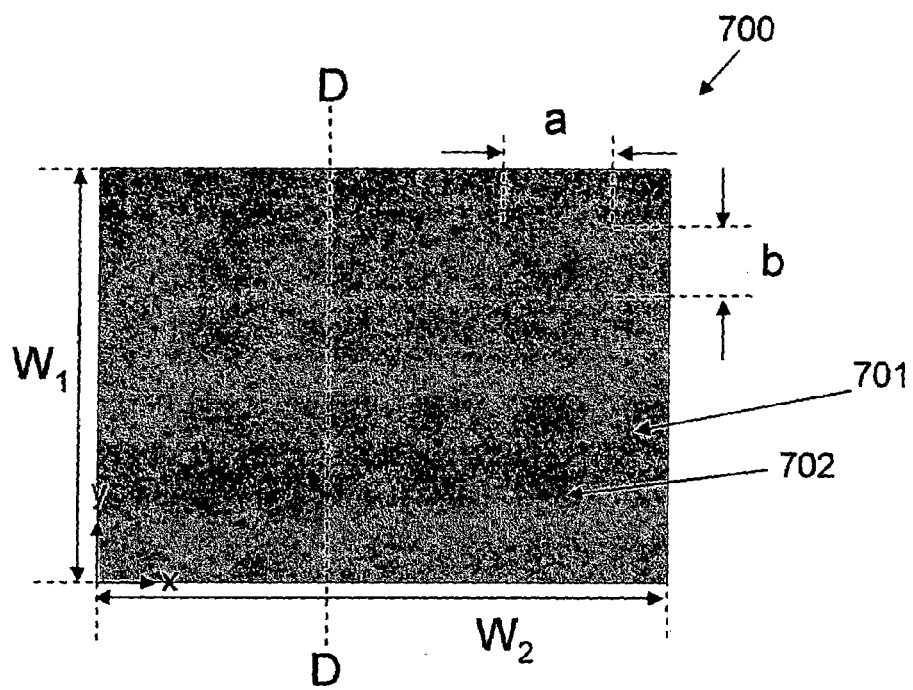
FIG. 5A shows front plan view of another two-dimensional rectangular micro-lens optical element array, which is usable in the projection systems described herein.
Figure 5B:
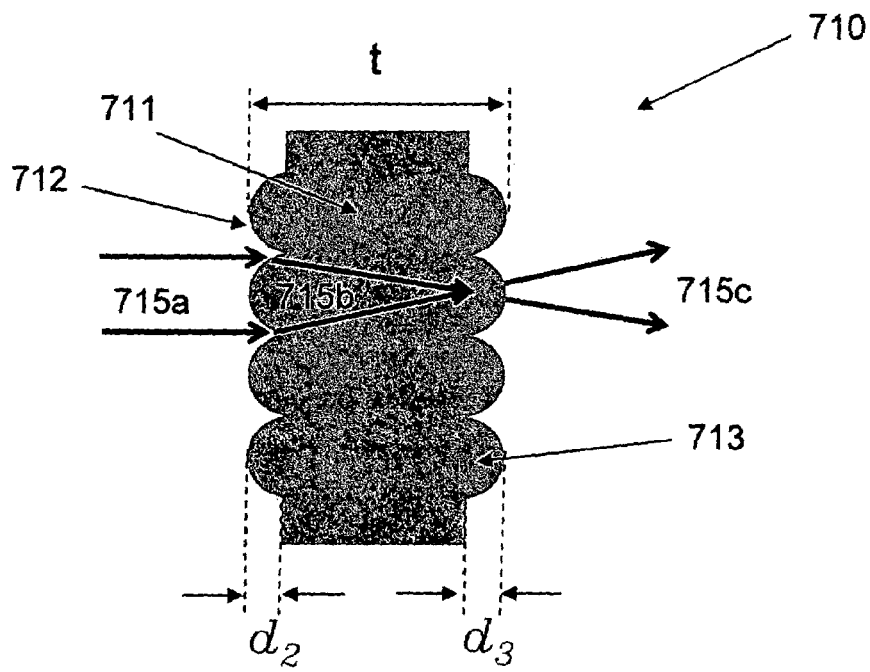
FIG. 5B shows a cross-sectional view of a first type of micro-lens array of FIG. 5A, along line D.
Figure 5C:
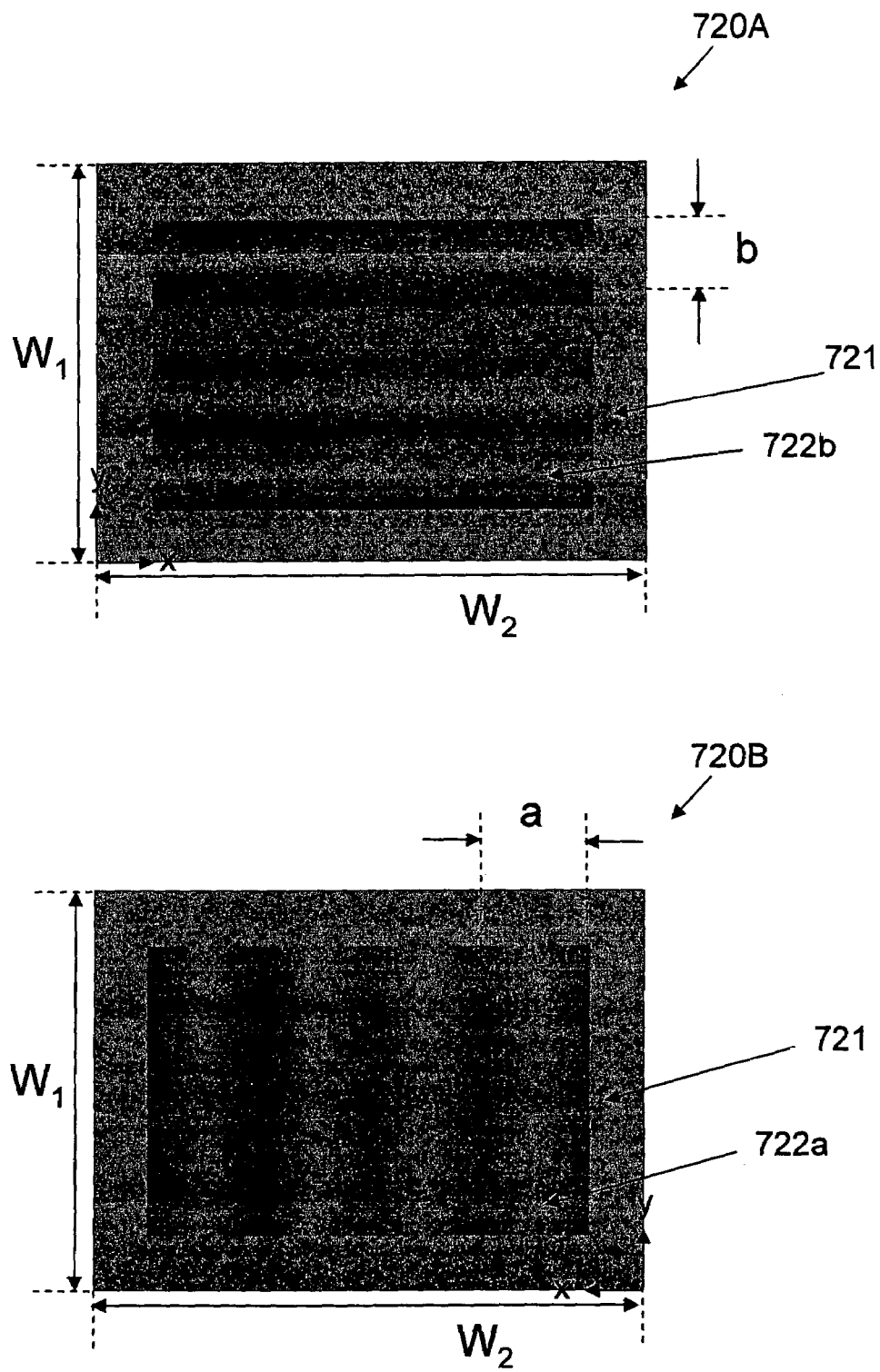
FIG. 5C shows front plan and back plan views of a rectangular micro-lens array. Each side has one-dimensional micro-lens array and both arrays are perpendicularly oriented with respect to each other.

FIG. 5A shows a two dimensional optical element array 700, which consists of 16 micro-elements arranged in 4 rows and 4 columns in the xy-plane. Micro-elements within array 700 can be micro-lenses as reported in the prior art (FIGS. 5B-5C) as well as combinations of micro-lenses and waveguides (FIGS. 5D-5G). FIG. 5B shows a cross-sectional view of array 700 of FIG. 5A along line D. Each micro-element has a length a and width b and each micro-lens has a depth $d_1$ or $d_2$ as shown in FIGS. 5A-5B. When optical element array 700 is used in a projection system such as the one of FIG. 1C (i.e. replacing array 223), the ratio a/b of the micro-element 702 is equal or proportional to the ratio A/B (A and B are the display panel's length and width in xy-plane, respectively) of the display panel 227, which is illuminated by the light beam 226. FIG. 5C shows a one dimensional micro-lens array 720A-B, which consists of 4 cylindrical micro-lenses 722b arranged horizontally in 4 rows on the array 720 front side 720A and 4 cylindrical micro-lenses 722a arranged vertically in 4 columns on the array back side 720B (i.e. the cylindrical axes of the micro-lenses on the front side is perpendicular to those of the cylindrical micro-lenses on the back side). Other arrangements, orientations and types of micro-lenses such as spherical, aspherical and cylindrical can be used within the micro-lens array 700 and 720.

Figure 5D:
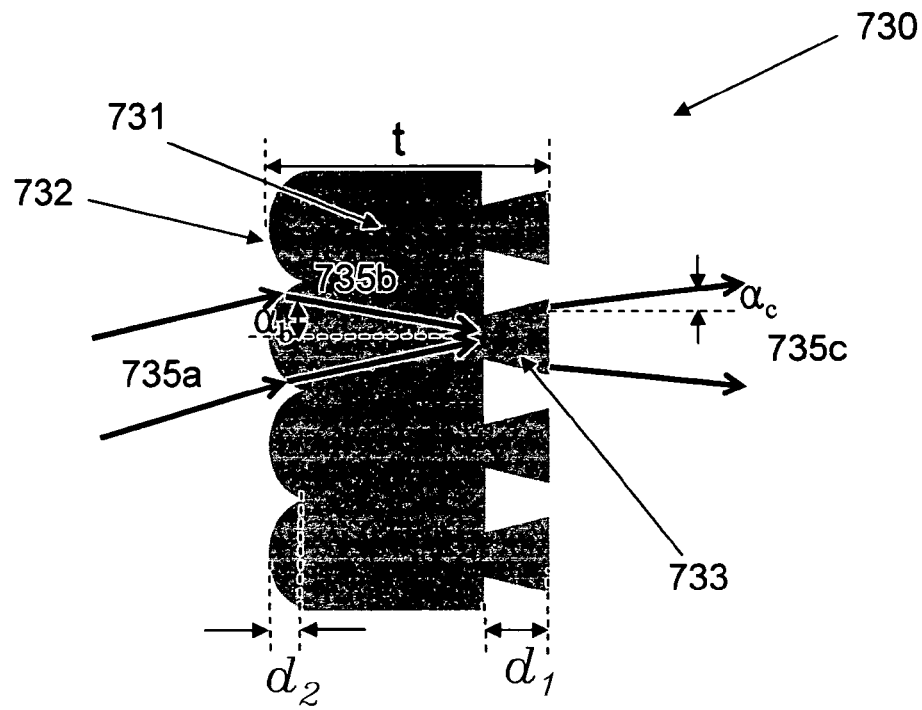
FIG. 5D shows a cross-sectional view of a second type of optical element array of FIG. 5A, along line D. The micro-elements consist of micro-lenses on the front side and waveguides on the back side.

FIGS. 5D-5I show cross-sectional views of four variations 730, 740, 750, 760, 750A and 760A of two dimensional optical element array 700 along line D. In these variations 730, 740, 750, 760, 750A and 760A, combinations of solid waveguides 733, 743, 753, 762 and 764 and micro-lenses 732, 742, 752, 754, 763, 752A, 754A and 763A are used on both sides of the array 700. In FIG. 5D, the light beam 735a enters the micro-lens 732 entrance aperture and gets focused into the entrance aperture of the corresponding waveguide 733. The light beam 735b received by waveguide 733 propagates within the waveguide via total internal reflection (TIR), assuming that the light incident angle $\alpha_b$ is larger than the critical angle of the waveguide 733, and exits waveguide 733 more collimated with a cone angle $\alpha_c < \alpha_b$. The cone angle $\alpha_c$ depends on the design parameters of waveguide 733 such as its length, sizes of its entrance and exit apertures, and its sidewall taper. Micro-lenses 732 focus all or large portion of the incident light 735a into the entrance apertures of waveguides 733 thus collimating all or large portion of the received light 735a by waveguides 733. If micro-lenses 732 are not fabricated on the entrance aperture of array 700 (i.e. the entrance aperture of array 700 has a flat surface), some of the incident light 735a will pass through the open areas surrounding waveguides 733 without being collimated.

Figure 5E:
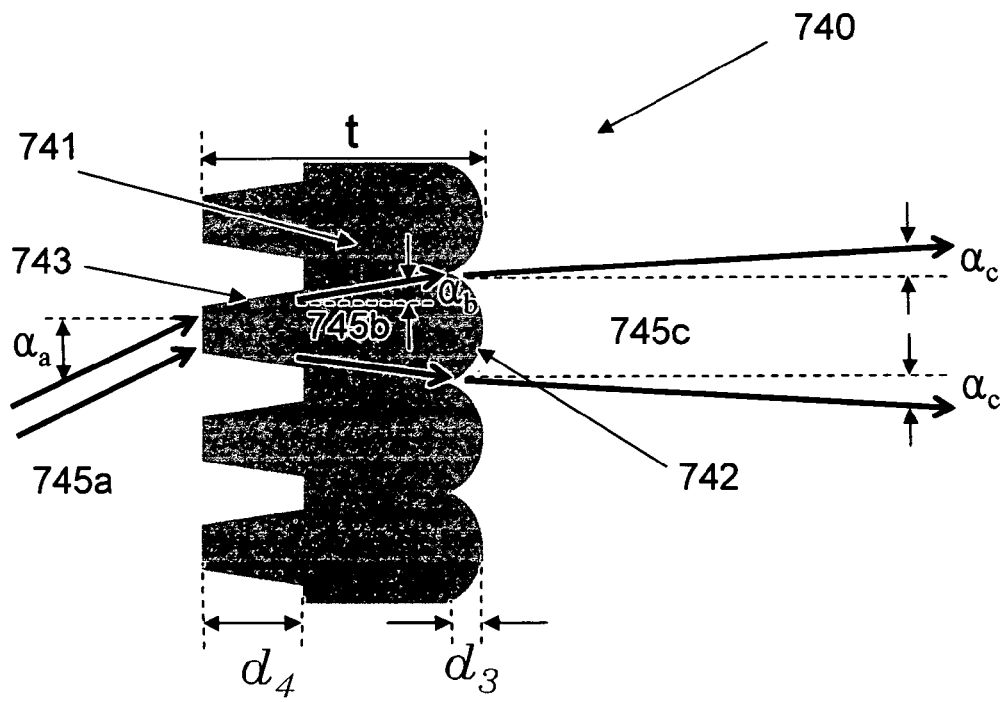
FIG. 5E shows a cross-sectional view of a third type of optical element array of FIG. 5A, along line D. The micro-elements consist of waveguides on the front side and micro-lenses on the back side.

In FIG. 5E, the light beam 745a enters entrance aperture of waveguide 743 and experiences TIR within waveguide 743, assuming that the incident angle $\alpha_a$ is larger than the critical angle of the waveguide 743. The received light beam 745a exits waveguide 743 as a more collimated light beam 745b with a cone angle $\alpha_b<\alpha_a$. Light beam 745b experiences further collimation via the corresponding micro-lens 742 and exits micro-lens 742 as a more collimated light beam 745c with a cone angle $\alpha_c<\alpha_b$. Some of the light incident on the entrance aperture of array 700 enters the entrance apertures of waveguides 743 experiencing TIR and exiting waveguides 743 as a more collimated light 745b. Portion of the incident light that does not enter the entrance apertures of waveguides 743 passes through the open areas surrounding waveguides 743 without experiencing TIR within the waveguides 743. In this case, the percentage of the light that will get collimated depends on the cone angle $\alpha_a$ of received light, sizes of open areas surrounding waveguides 743 as well as parameters of waveguide 743 such as its length, sizes of its entrance and exit apertures, and its sidewall taper.

Figure 5F:
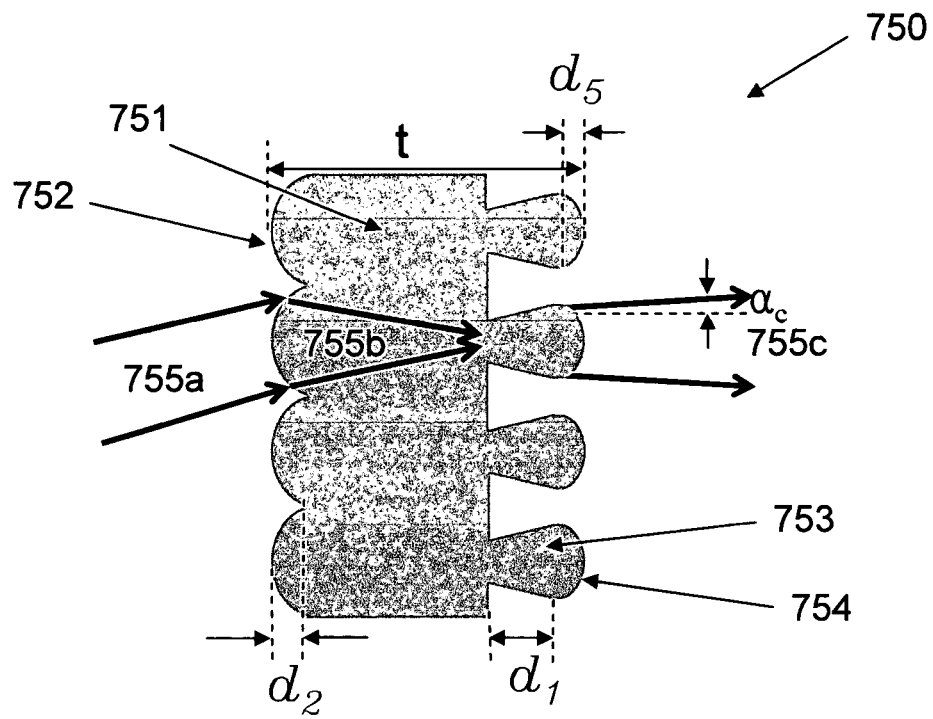
FIG. 5F shows a cross-sectional view of a fourth type of optical element array along line D of FIG. 5A. The micro-elements consist of convex micro-lenses on the front side and lensed waveguides on the back side.

FIG. 5F and FIG. 5D are similar except that waveguides 753 of FIG. 5F have micro-lenses 754 fabricated at their exit apertures. The above discussion associated with FIG. 5D applies to FIG. 5F except that micro-lenses 754 of FIG. 5F provide further collimation of the light as it exits corresponding waveguides 753. Thus, cone angle $\alpha_c$ of delivered light beam 755c is smaller than that of delivered light beam 735c assuming that the received light is same in both cases.

Figure 5G:
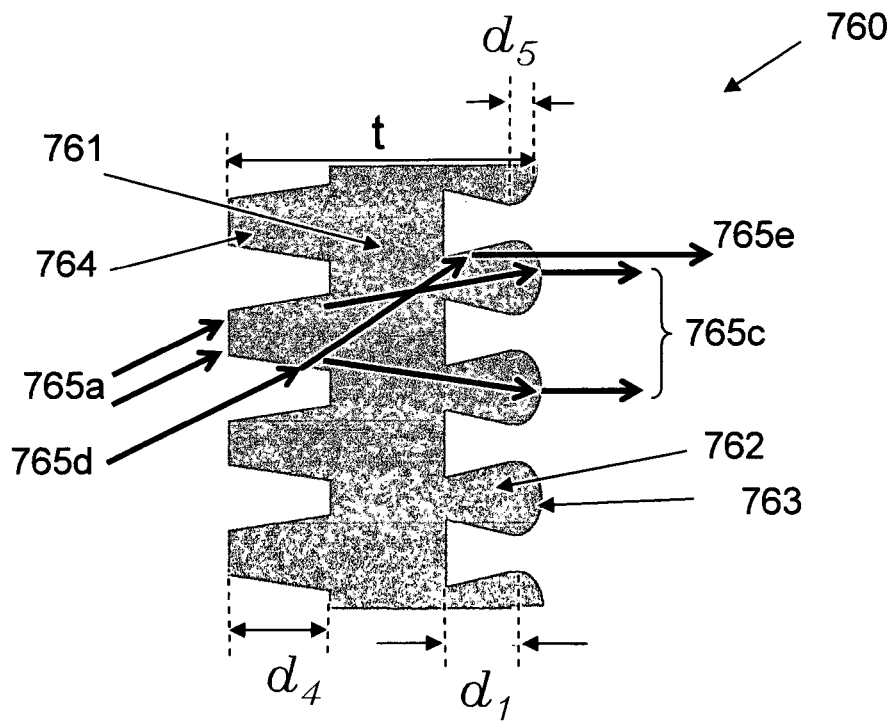
FIG. 5G shows a cross-sectional view of a fifth type of optical element array along line D of FIG. 5A. The micro-elements consist of waveguides on the front side and lensed waveguides on the back side.
Figure 5H:
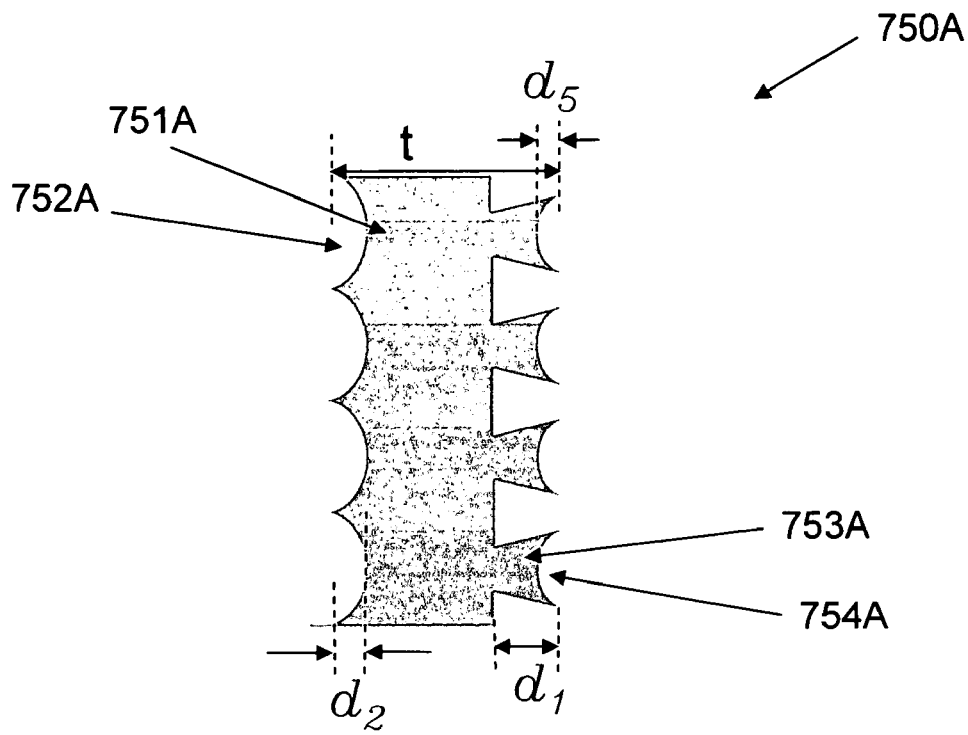
FIG. 5H shows a cross-sectional view of a sixth type of optical element array along line D of FIG. 5A. The micro-elements consist of concave micro-lenses on the front side and waveguides with concave lenses on the back side.
Figure 5I:
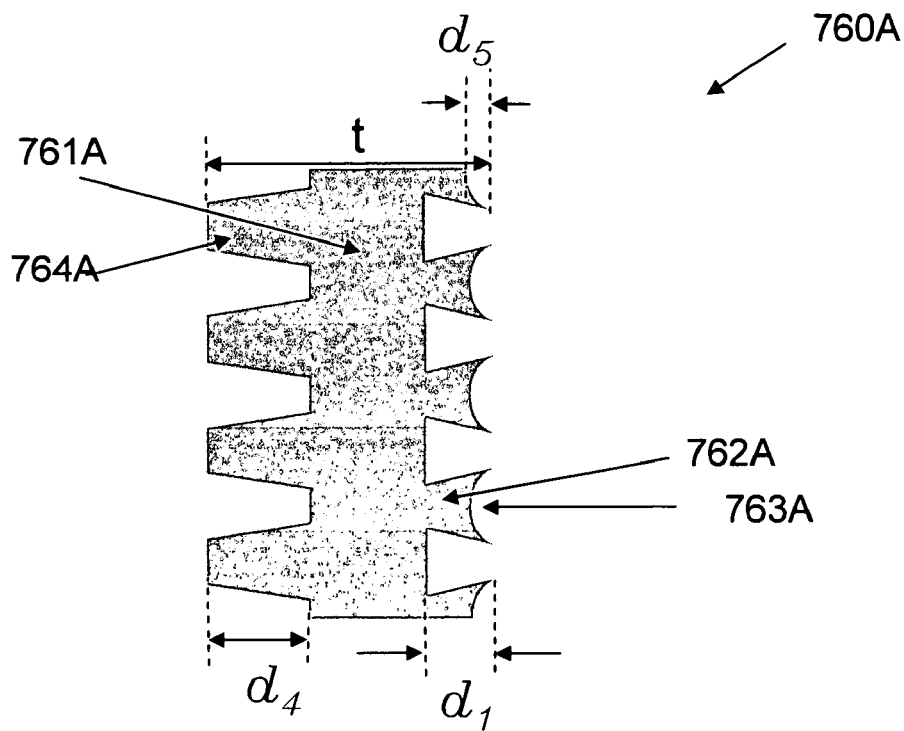
FIG. 5I shows a cross-sectional view of a seventh type optical element array along line D of FIG. 5A. The micro-elements consist of waveguides on the front side and waveguides with concave lenses on the back side.

FIG. 5G and FIG. 5F are similar except that micro-lenses 752 are replaced by collimating waveguides 764. Therefore, above discussion associated with waveguides 743 of FIG. 5E applies to waveguides 764 of FIG. 5G. In case of FIG. 5G, the percentage of the light that will get collimated depends on the cone angle of received light, sizes of open areas surrounding waveguides 764, parameters of waveguide 764 such as its length, sizes of its entrance and exit apertures, and its sidewall taper as well as density and distribution of lensed waveguides 762. For example, light rays 765a and 765d get collimated and exit as rays 765c and 765e, respectively, as shown in FIG. 5G. FIG. 5H and FIG. 5I use concave micro-lenses 752A, 754A and 763A rather than convex micro-lenses.

The waveguide depths $d_1$ and $d_4$ as well as micro-lens depths $d_2$ and $d_3$ range from few to hundreds of microns. Each micro-element within an optical element array 700 can be designed in terms of size and shape independently of other micro-elements within the array 700. The micro-lenses can also have a single axis of curvature and can be convex. Antireflection coating (ARC) can be applied to the front and/or back sides of the optical element array 700 to reduce Fresnel reflections. The sidewalls and/or the separations between adjacent micro-elements within an optical element array 700 can be coated with reflective or cold mirror coatings.

Figure 3D:
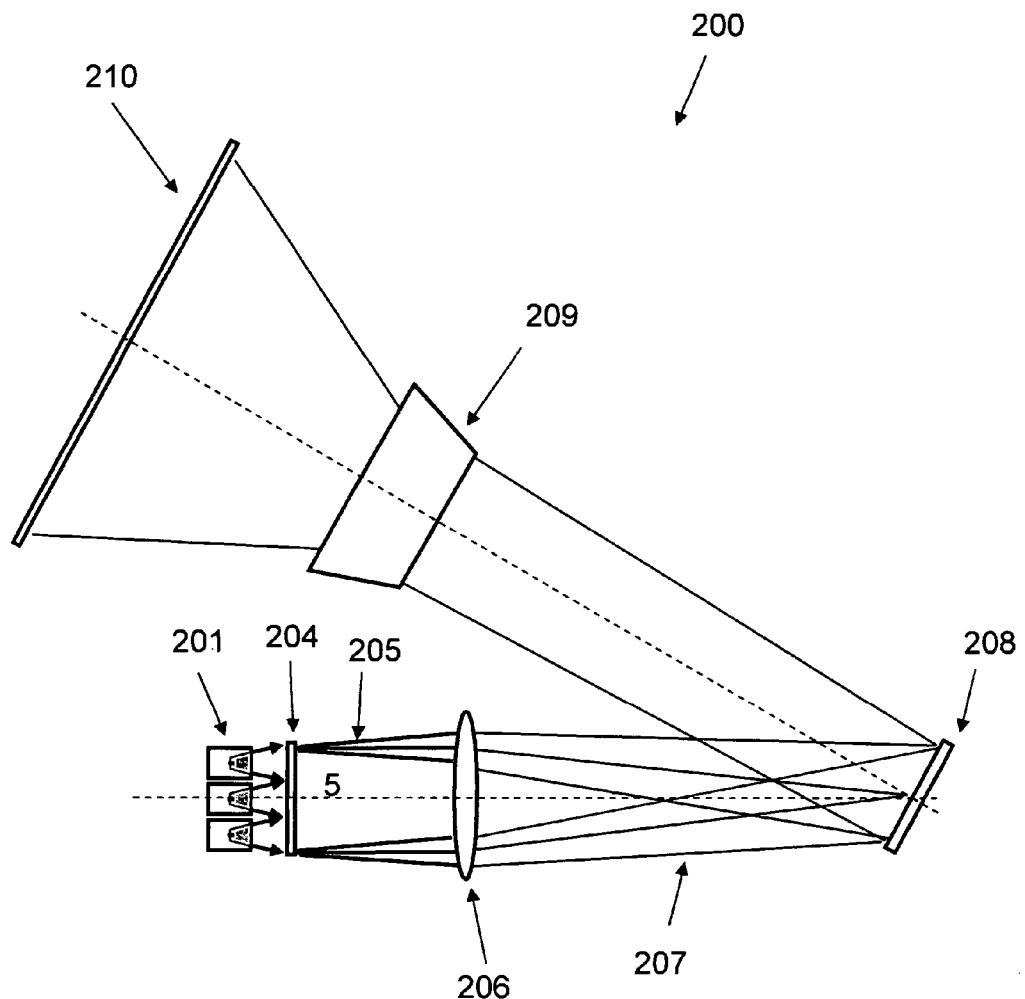
FIG. 3D shows a cross-sectional view of a projection system utilizing an array of light sources (e.g., LEDs, lasers, CCFLs) and an optical element array coupled with a focusing lens to provide uniform light distribution to a reflective display panel in accordance with a tenth embodiment of the present invention.
Figure 3E:
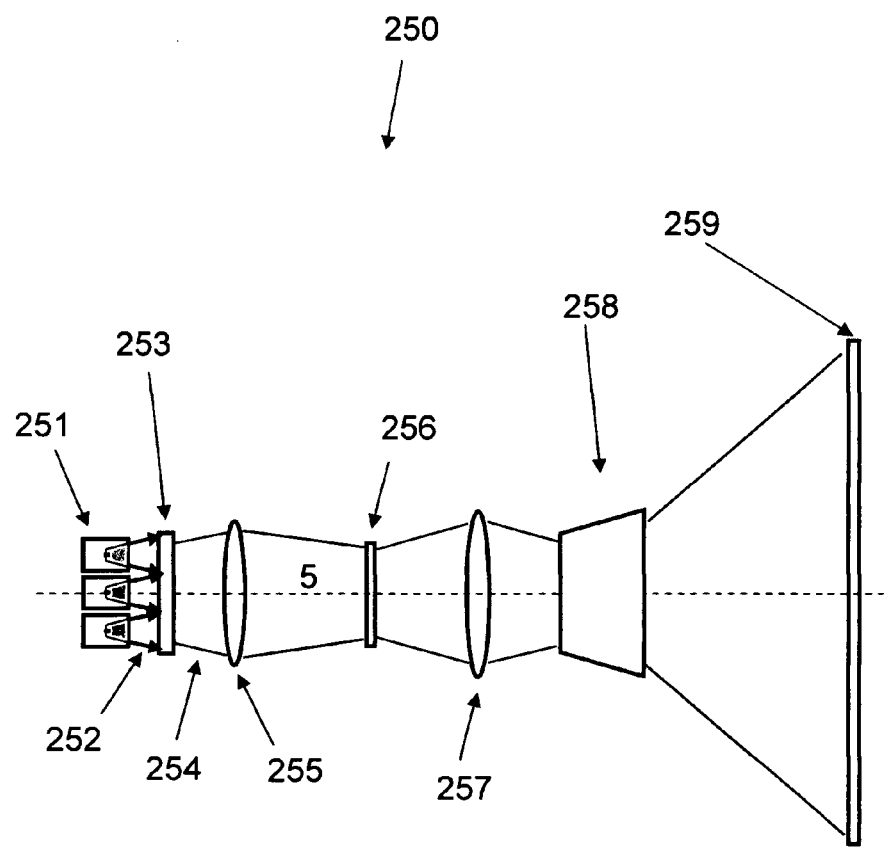
FIG. 3E shows a cross-sectional view of a projection system utilizing an array of light sources (e.g., LEDs, lasers, CCFLs) and an optical element array to provide uniform light distribution to a transmissive display panel in accordance with an eleventh embodiment of the present invention.
Figure 3F:
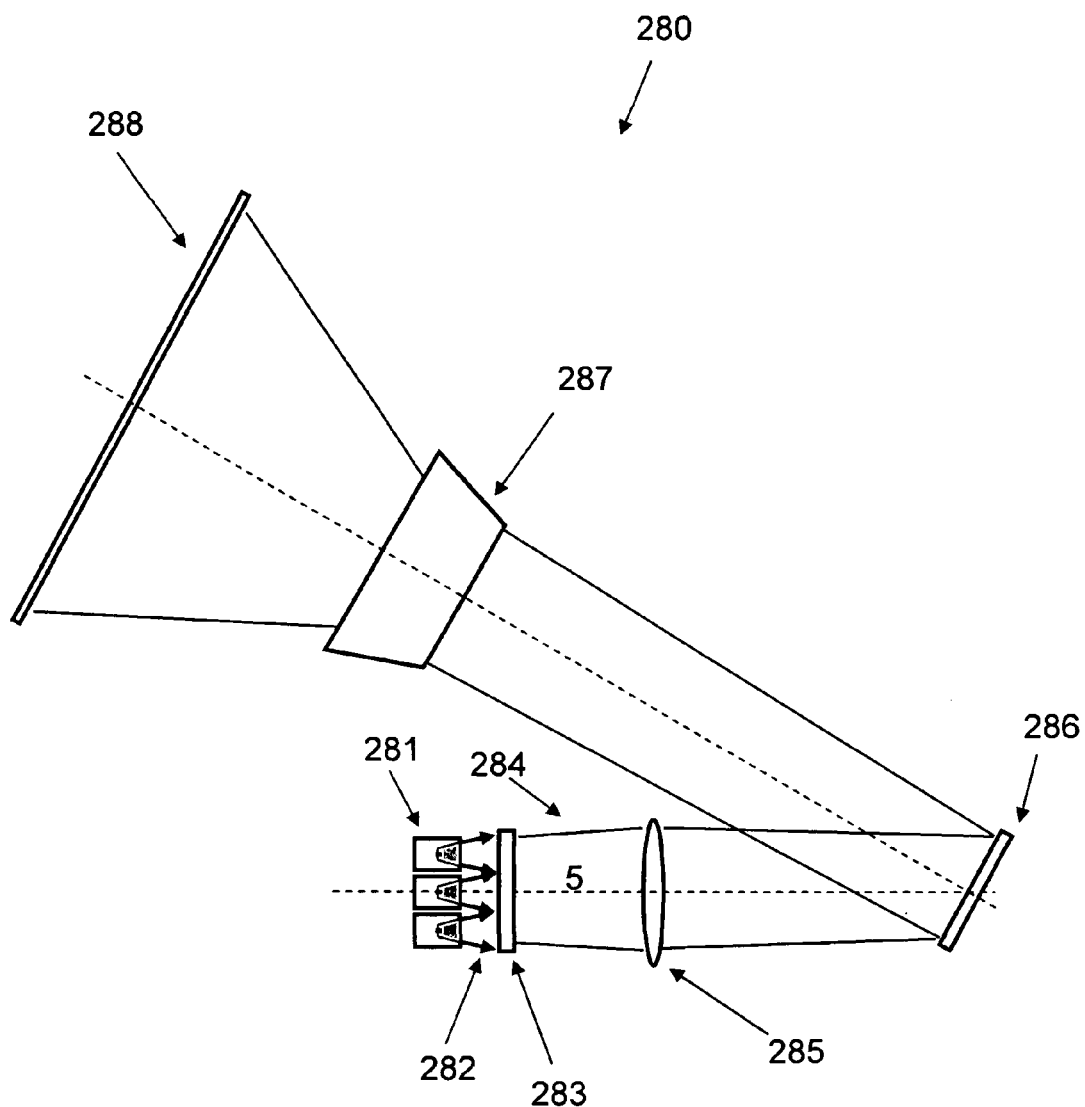
FIG. 3F shows a cross-sectional view of a projection system utilizing an array of light sources (e.g., LEDs, lasers, CCFLs) and an optical element array to provide uniform light distribution to a reflective display panel in accordance with a twelfth embodiment of the present invention.

When two dimensional optical element arrays of FIGS. 4A-4O and FIGS. 5A and 5D-5I are used in a projection system such as the one of FIGS. 2B, 2D, 3B and 3D (i.e. replacing arrays 54, 104, 154 and 204), the ratio $w_2/w_1$ (FIG. 4A) and a/b (FIG. 5A) of the micro-elements 332 and 702 is equal or proportional to the ratio A/B (A and B are the display panel's length and width, respectively) of the display panel 58, 108, 158 and 208 area, which is illuminated by the light beam 57, 107, 157 and 207, respectively. It is possible to vary this ratio ($w_2/w_1$ and a/b) from one micro-element to another within the optical element array in order to obtain a certain distribution of light intensity at the illuminated area of the display panel or to compensate for Keystone distortion, which occurs when the display panel is tilted obliquely to system's optical axis 5 as shown in FIGS. 2D and 3D. Keystone distortion does not occur when the optical axis 5 is perpendicular to the display panel surface as shown in FIGS. 2B and 3B.

Figure 7A:
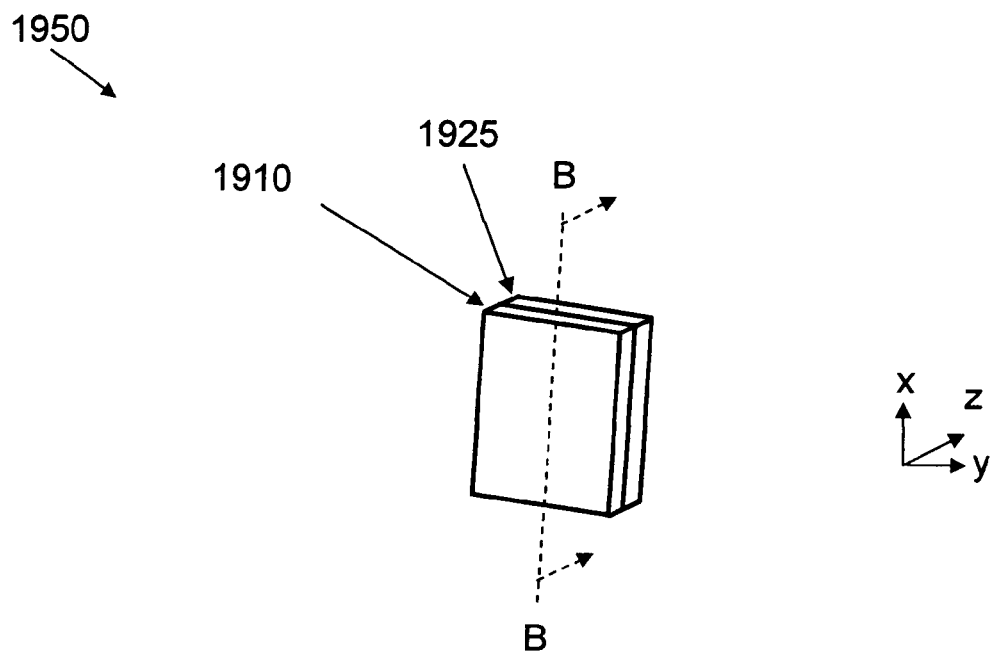
FIG. 7A shows a perspective view of another type of compact homogenizer usable with the projection systems described herein.
Figure 7B:
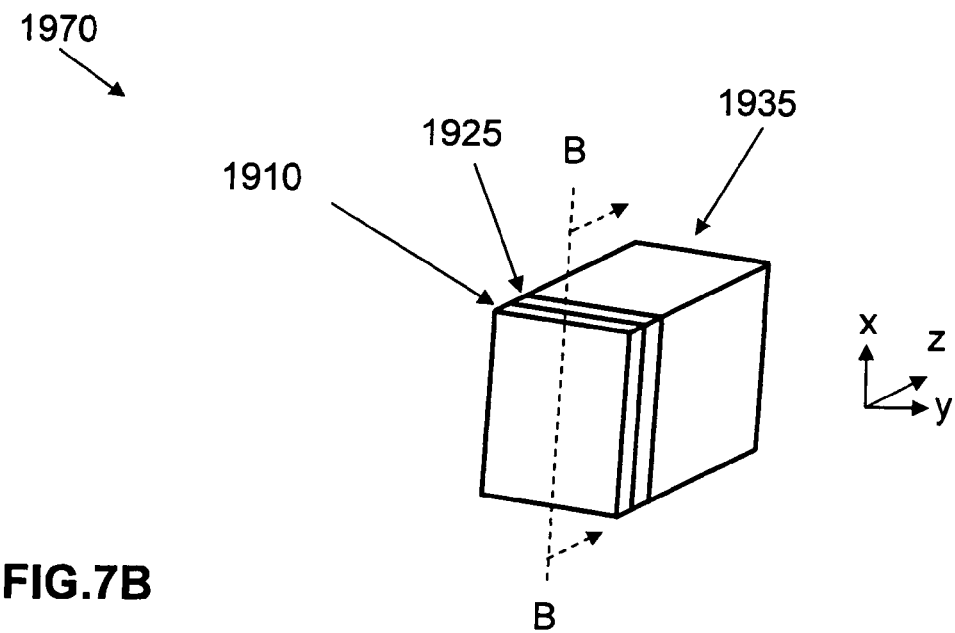
FIG. 7B shows a perspective view of another type of homogenizer usable with the projection systems described herein.
Figure 7C:
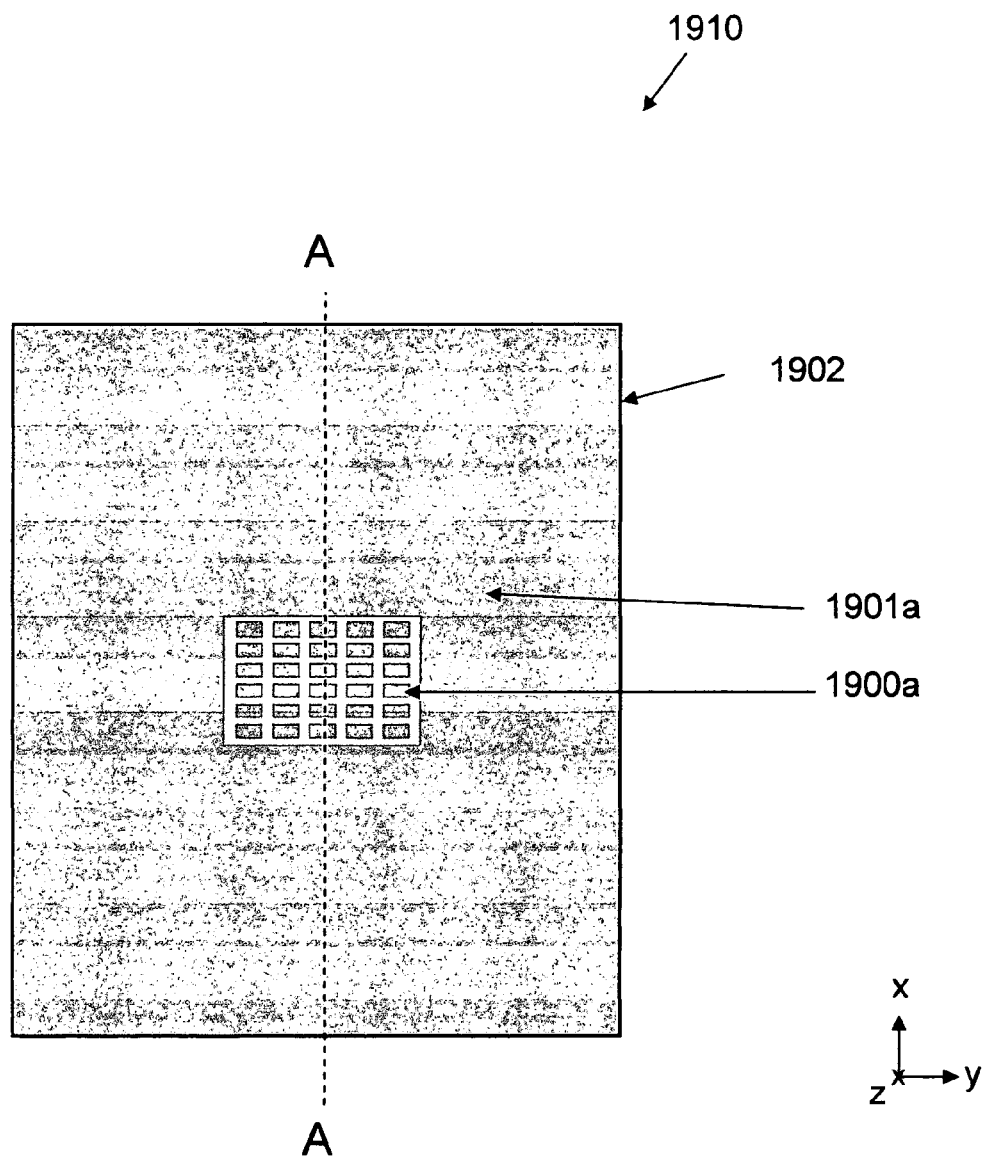
FIG. 7C shows a front plan view of one of the optical element arrays of FIGS. 7A-7B.
Figure 7D:
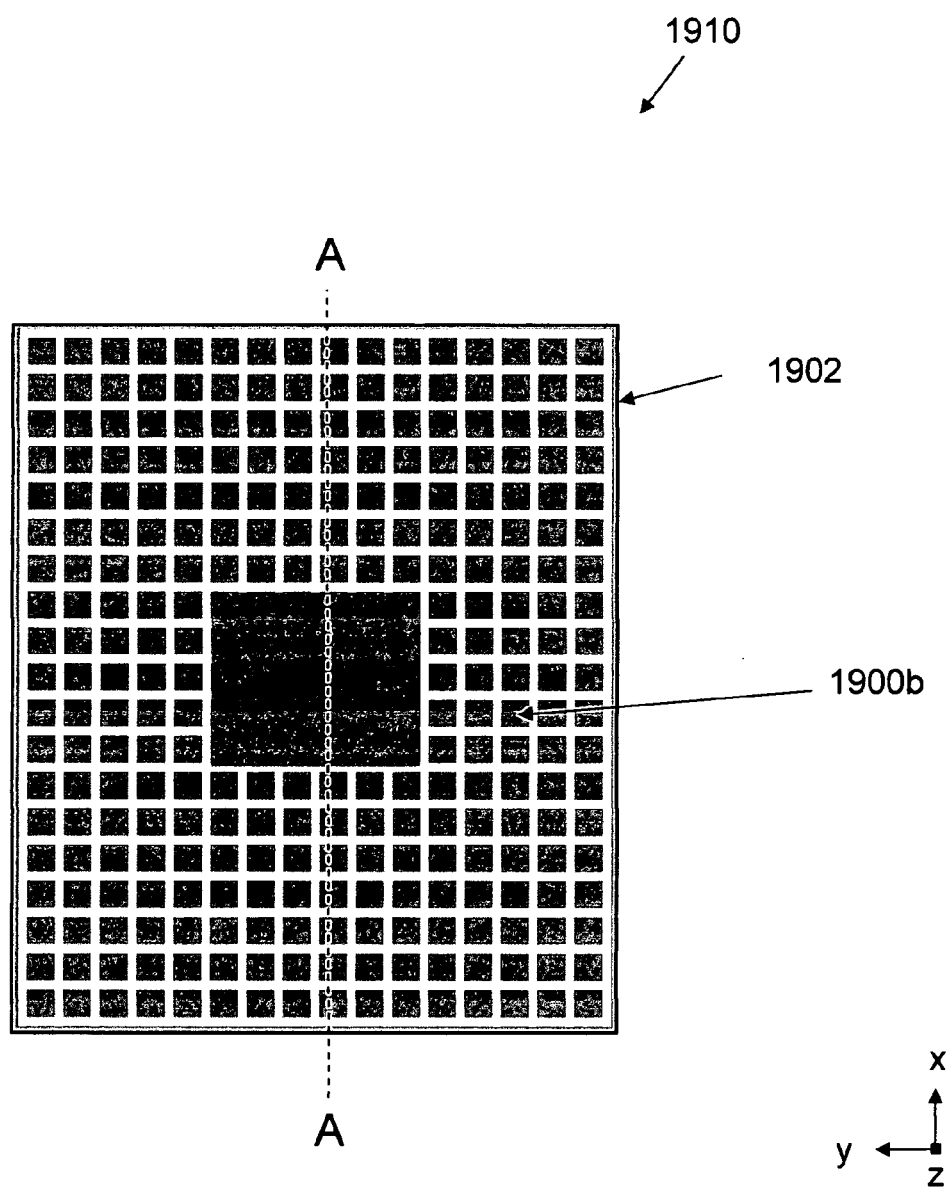
FIG. 7D shows a back plan view of one of the optical element arrays of FIGS. 7A-7B.
Figure 7E:
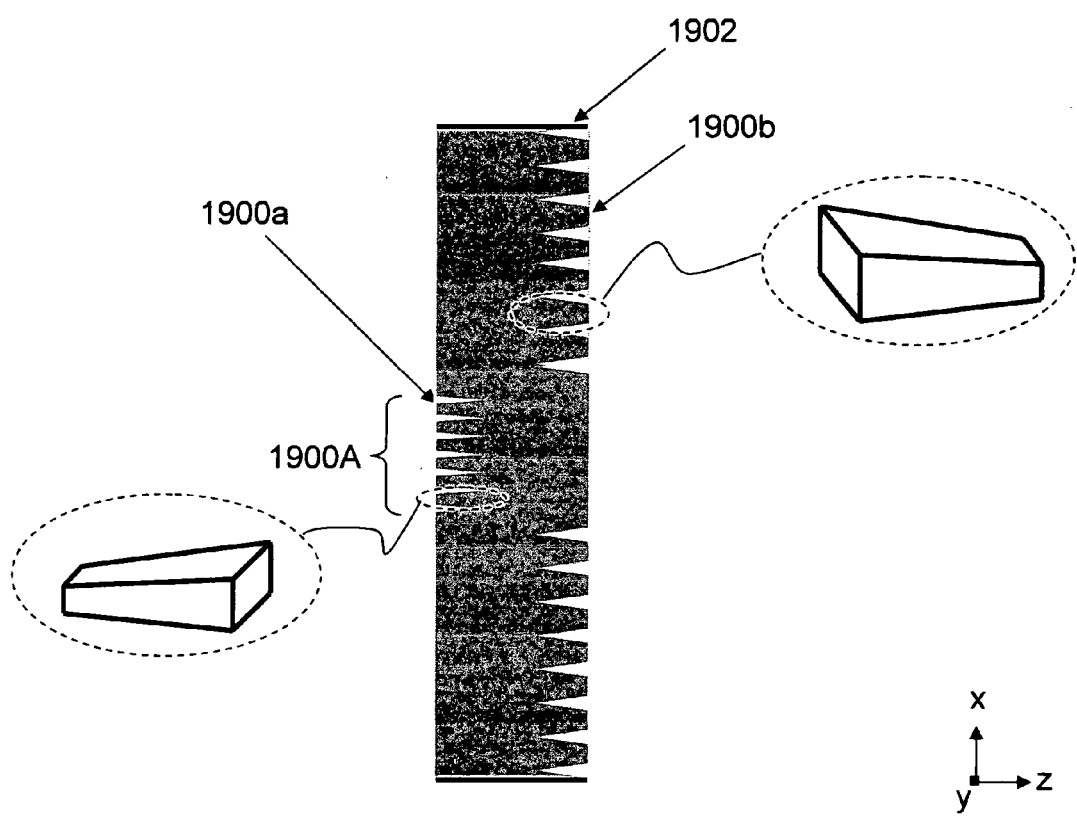
FIG. 7E shows a cross-sectional view of one of the optical element arrays of FIGS. 7A-7B.
Figure 7F:
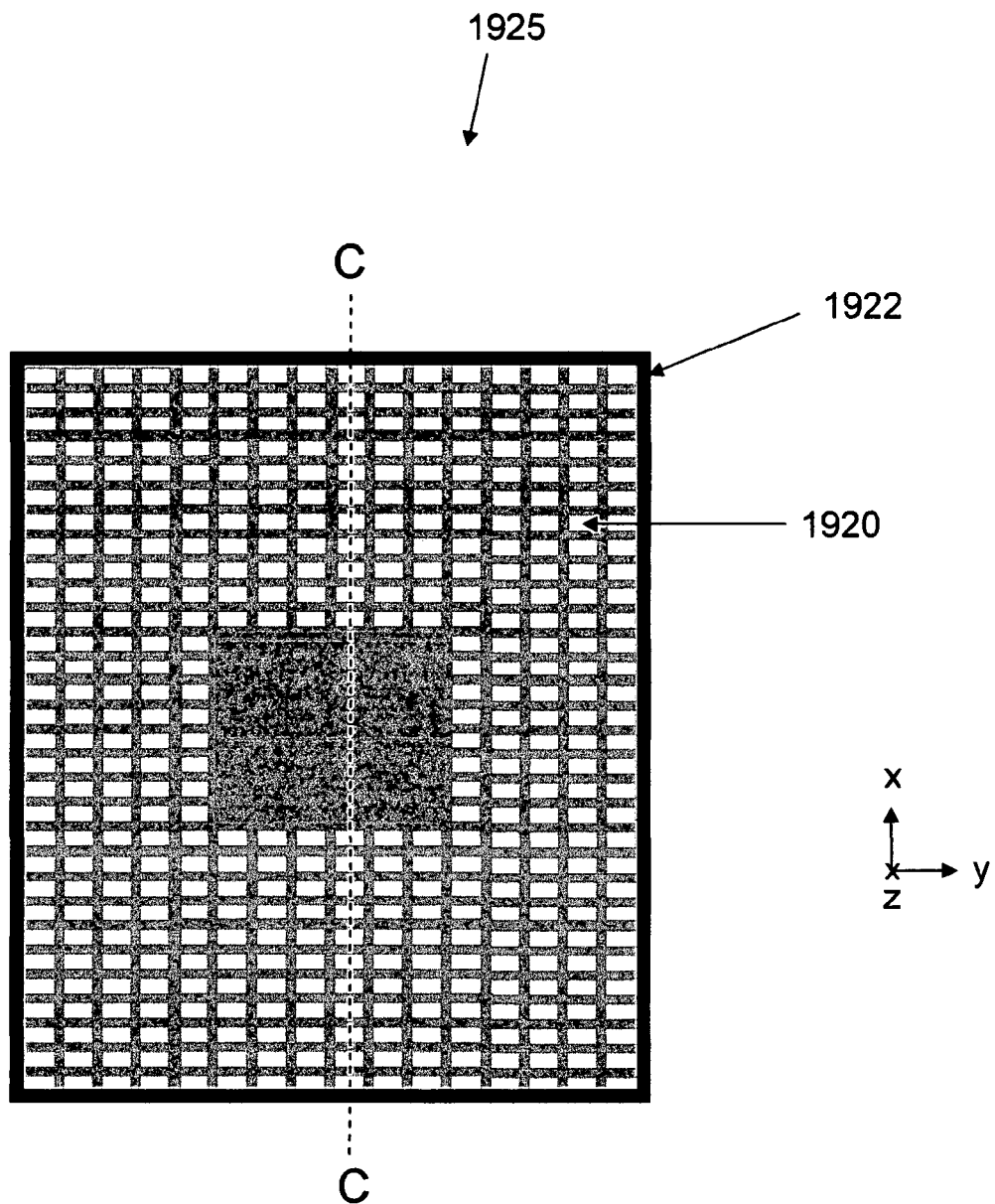
FIG. 7F shows a front plan view of one of the optical element arrays of FIGS. 7A-7B.
Figure 7G:
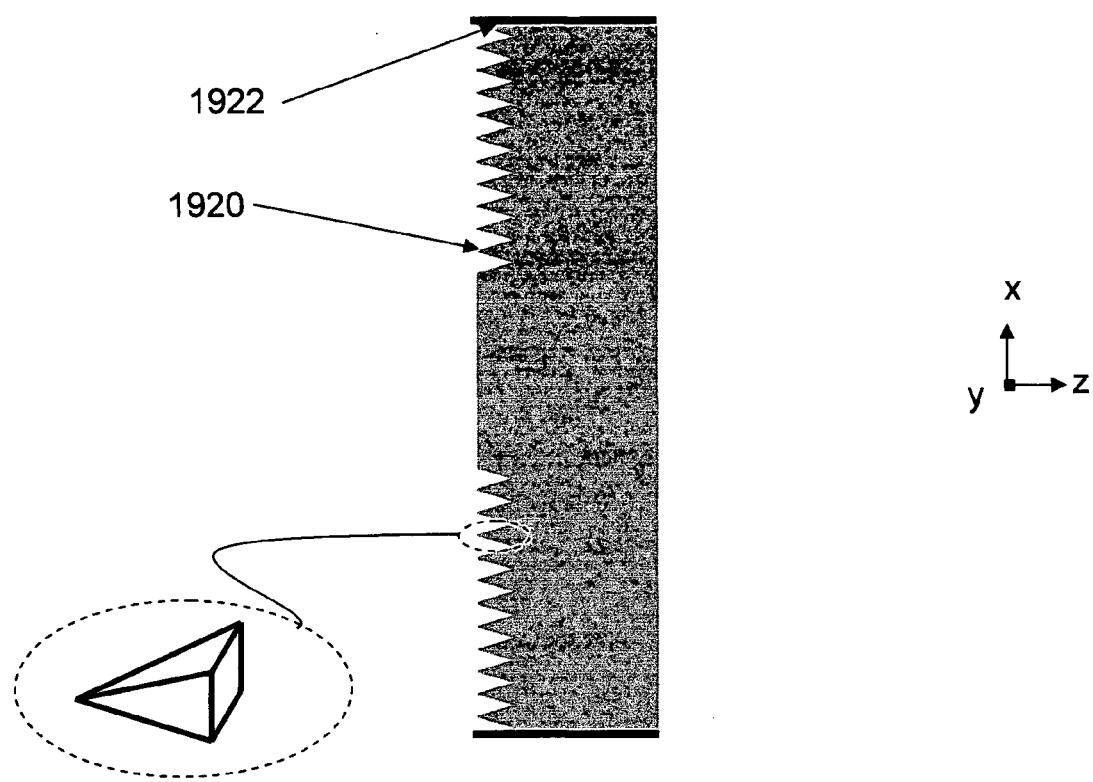
FIG. 7G shows a cross-sectional view of the optical element array of FIG. 7F.
Figure 7H:
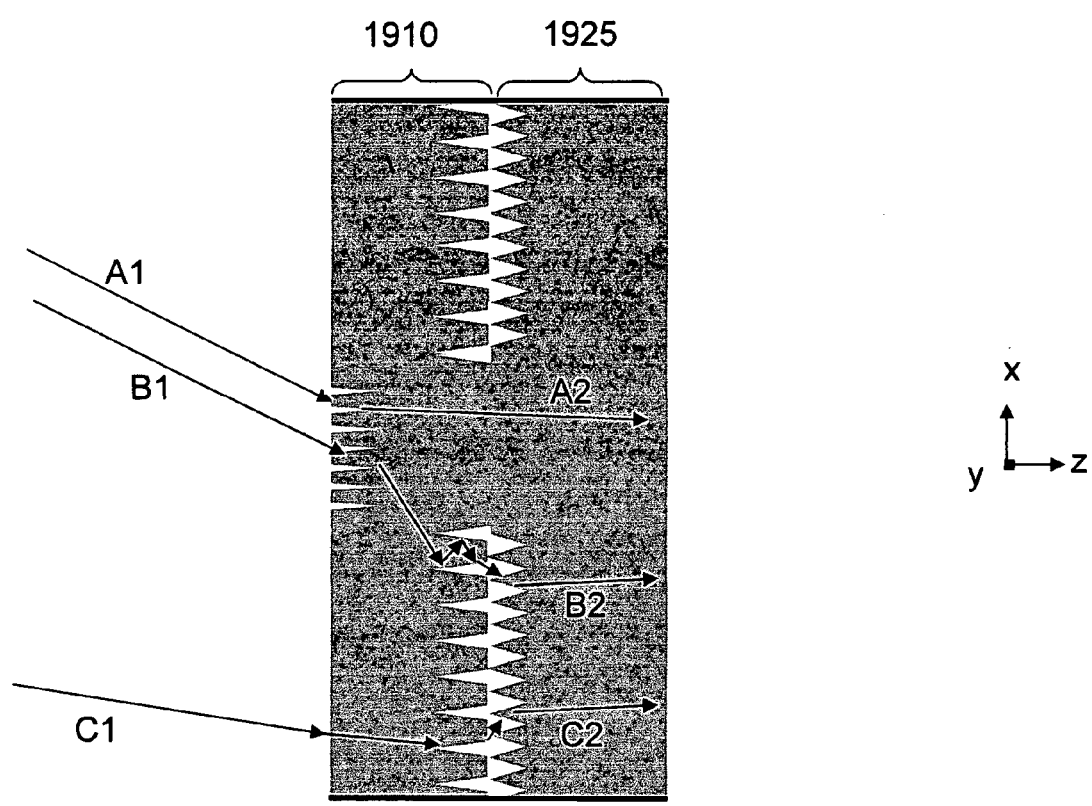
FIG. 7H shows a cross-sectional view of homogenizer of FIG. 7A.
Figure 7I:
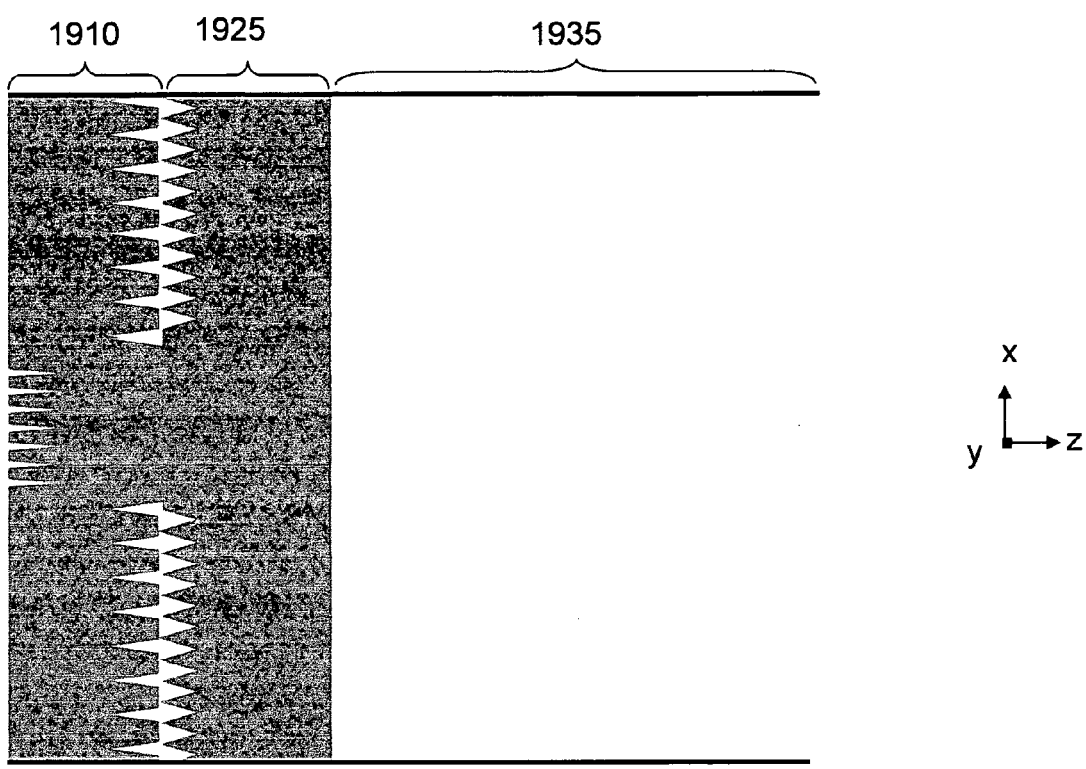
FIG. 7I shows a cross-sectional view of homogenizer of FIG. 7B.

FIGS. 7A-7B show perspective views of two homogenizers 1950 and 1970. Homogenizers 1950 uses two optical element arrays 1910 and 1925 in its structure, whereas, homogenizers 1970 uses in addition to that a light pipe/tunnel 1935. FIGS. 7C and 7D show a top and bottom views of optical element array 1910 and FIG. 7E shows a cross-sectional view of FIGS. 7C-7D along line A. A collimating optical element array 1900A is shown on the top surface of optical element array 1910, which correspond to the location of the hot spot of the input light beam. On the bottom side of array 1910, there are extraction waveguides 1900b arranged in an array in the xy-plane. Distribution of these extraction waveguides 1900b can be uniform (FIG. 7D), non-uniform or random. Non-uniform distribution is preferable since it allows uniform extraction of light over the homogenizer's exit aperture. Exploded perspective views of collimating waveguides 1900a and extraction waveguides 1900b are shown in FIG. 7E. FIGS. 7F and 7G show a perspective view and cross-sectional view of collimating optical element array 1925 along line C of FIG. 7F. As shown in FIGS. 7F-7G, micro-prisms 1920 are distributed over the surface of array 1925 in areas that do not correspond to the hot spot of input light (i.e. collimating array 1900A). A perspective view of micro-prisms 1920 is shown in FIG. 7G. Cross-sectional views of homogenizers 1950 and 1970 are shown in FIGS. 7H-7I along plane B of FIGS. 7A-7B.

The operation of homogenizers 1950 and 1970 is based on collimating part of the input light that passes through the entrance apertures of the collimating waveguides 1900a of array 1900A. Such part of input light is made of substantially high angles. The input light that passes through the sidewalls of waveguides 1900a is diverged (i.e. cone angle is increased) and gets spatially separated from the collimated light as it reaches the extraction waveguides 1900b. For simplicity of illustration, rays A1 and A2 represent the input light that goes through the entrance apertures of the collimating waveguides 1900a and rays B1 and B2 represent the input light that goes through their sidewalls as shown in FIG. 7H. Light extracted from the body of array 1910 is collimated by micro-prism array 1925 while light collimated by array 1900A travels through plates 1910 and 1925 without encountering any micro-elements. Light outside the hot-spot area, which has low intensity and is made of substantially low angles, passes through the extraction waveguides 1900b and exits with a larger cone angle, thus, becoming a candidate for being collimated by the micro-prism array 1925. Rays C1 and C2 represent such case in FIG. 6H. A small part of light enters micro-prism array 1925 with low angles (i.e. already collimated) and, therefore, exits micro-prisms 1920 with a high angle and gets recycled back toward array 1910 via TIR and reflections off of coated plate edges 1902 and 1922. Light exiting plate 1925 enters light pipe/tunnel 1935 for further homogenization then to next stage (FIG. 7I), otherwise, it is delivered directly to next stage (FIG. 7H). Homogenizers 1950 and 1970 have the same key advantages of homogenizers 34 and 440 in addition to providing a high level of collimation using a simple fabrication and assembly processes.

The optical element arrays of this disclosure (FIGS. 4A-4O, FIGS. 5A, 5D-5I, and FIGS. 6A-6S) have five key advantages over known micro-lens 23a, 23b and 223 (FIG.

1B-1C) and known lens arrays 710 and 720 (FIGS. 5B-5C). First, the optical element arrays of this disclosure provide higher level of light uniformity due to the large number of virtual sources formed by these arrays. Images of these virtual sources are superimposed on top of each other forming an extremely uniform distribution of the light source over a certain area such as the light valve area. Second, higher coupling efficiency between the light source and the light valve can be provided by the optical element arrays of this disclosure resulting in more efficient use of light by the light valve, thus, reducing the required number of light sources and/or their power. In this case, the optical element arrays (FIGS. 4A-4O, FIGS. 5A, 5D-5I, FIGS. 6A-6S and FIGS. 7A-7I) do not increase the etendue of substantial amount of light delivered to the light valve thus enhancing coupling efficiency and increasing display brightness. Etendue is proportional to the cone angle and cross-sectional area of light beam. Third, the optical element arrays of this disclosure provide a superior level of compactness and light-weight. The length (i.e. thickness) of the these arrays can be lower than the length of known light guides and lens plates by up to three orders of magnitude resulting in very compact light-weight illumination systems. In addition, the high coupling efficiency enables the use of small size display panels ($\leq 0.5"$) which results in using smaller optical components such as the projection lens, thus, leading to very compact projection systems. Fourth, lower cost is achieved by using the optical element arrays of this disclosure due to the reduced size of the optical components used within the projection system. As the size of optical components is reduced, their cost is reduced and the cost of the overall system is reduced. Fifth, the optical element arrays of this disclosure provide control over the spatial distribution of light in terms of angle and intensity over a selected area such as the area of a display panel.

Optical element arrays disclosed herein can be made using various methods including, but not limited to, dry etch techniques such as reactive ion etch (RIE) technique, wet etch techniques such as the use of fluoride-based aqueous etching in case of Pyrex substrates and the use of buffered oxide etch (BOE) to form micro-elements in fused silica substrates, techniques that use photosensitive glasses such as Foturan® produced by Schott Glass, Inc., a technique that combines spin-on glass (SOG) process and standard LIGA techniques to fabricate optical element arrays, glass-drawing technique which is commonly used in fabricating micro-channel plates (MCPs), laser patterning techniques, nano-technology techniques and combinations of two or more of these techniques.

Figure 8A:
FIGS. 8A-8J are cross-sectional views illustrating exemplary fabrication steps for the optical element arrays using dry etch methods.

A method of fabricating optical element arrays of FIGS. 4, 5, 6 and 7 is shown in FIGS. 8A-8F. A cross section view of a substrate 801 is shown in FIGS. 8A-8F. As shown in FIG. 8A, the fabrication process starts with a substrate 801 which has a thickness t ranging preferably from tens to hundreds of microns but can reach thousands of microns. Substrate 801 is preferably made of an optically transparent material such as glass (Pyrex, quartz, corning 1737F) and polymers (PMMA, PC, Arton, Zeonor) with optically smooth surfaces including front and back sides.

Figure 8B:
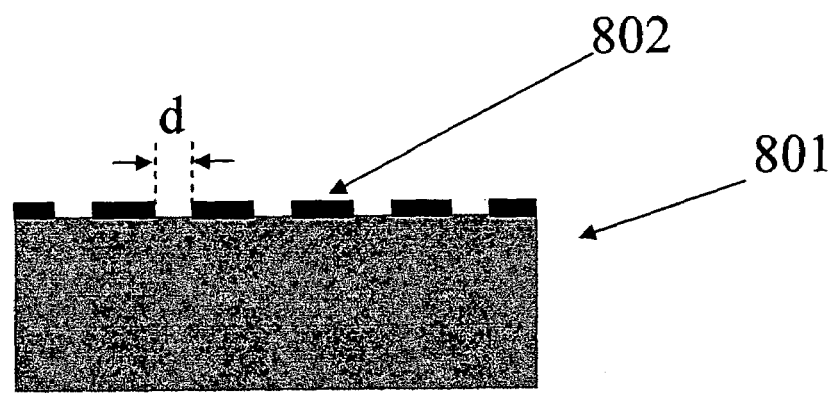
Figure 8C:
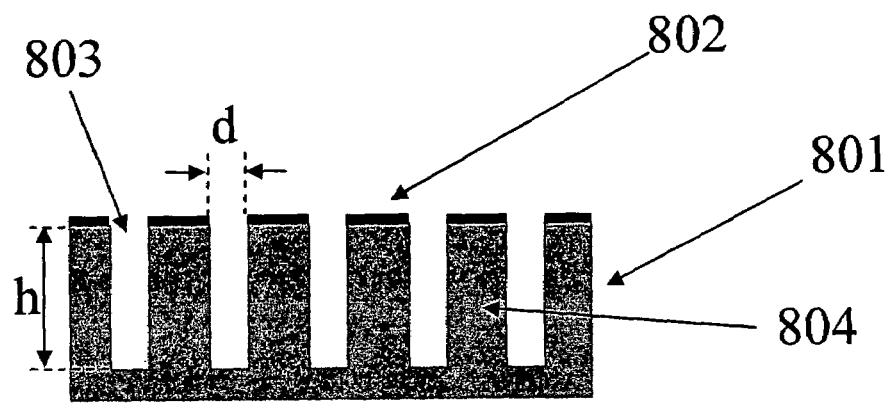
Figure 8D:
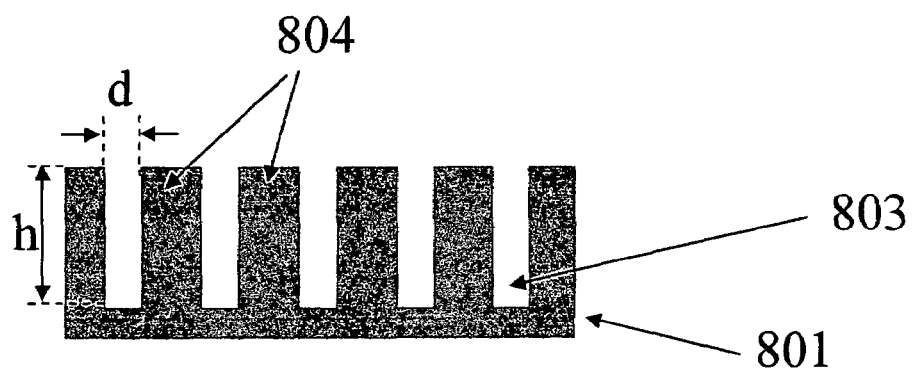
Figure 8E:
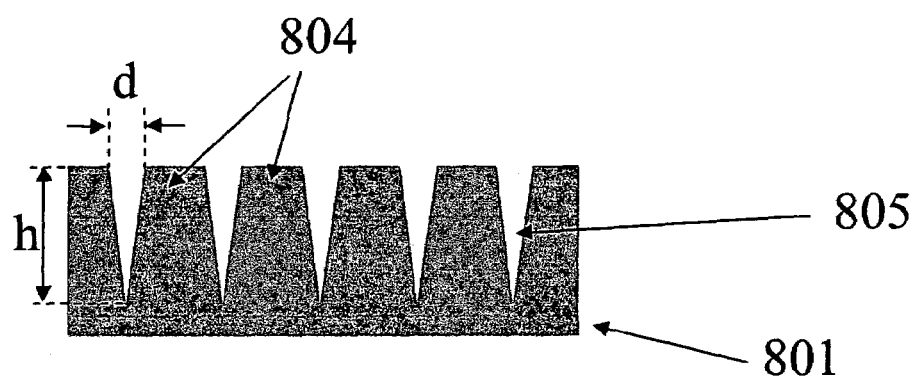
Figure 8F:
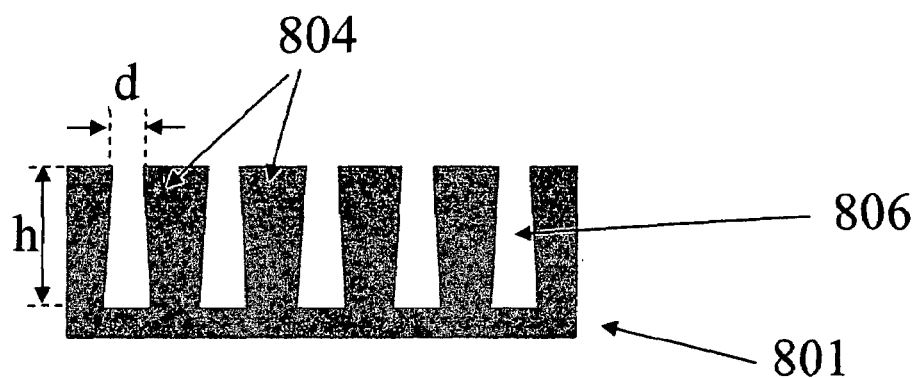
Figure 8G:
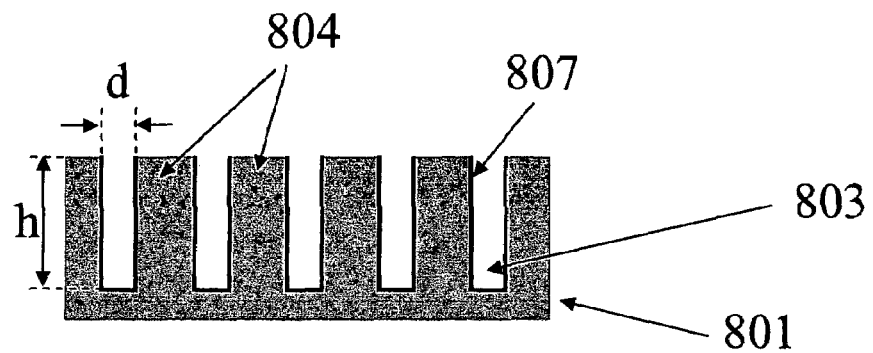
Figure 8H:
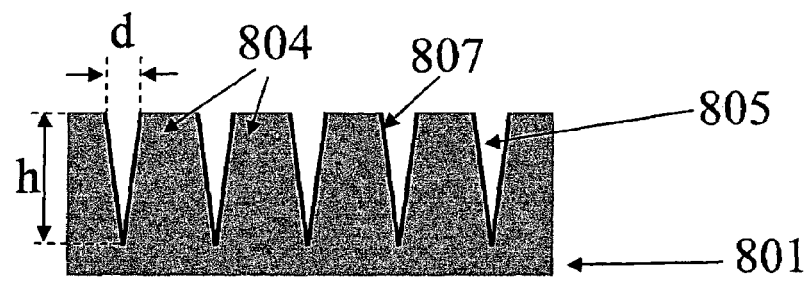
Figure 8I:
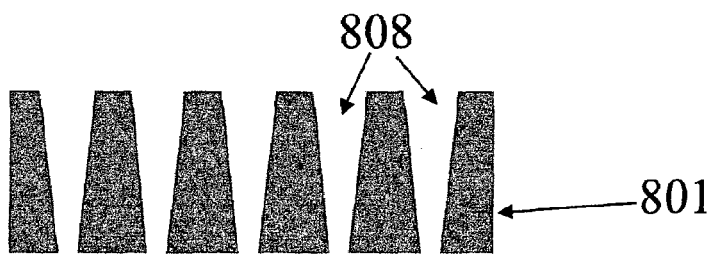
Figure 8J:
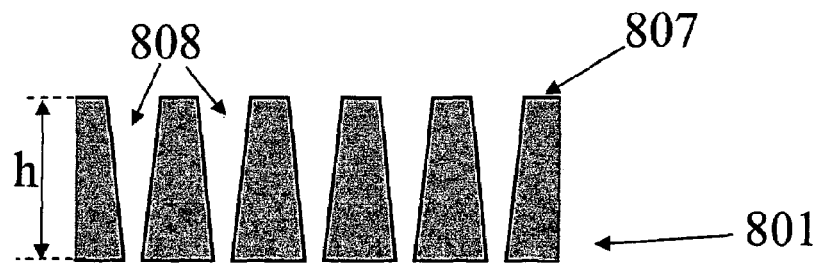

FIG. 8B shows a cross section view of a patterned layer 802, which defines an optical element array This layer 802 is deposited on top of substrate 801 and patterned as shown in FIG. 8B. This patterned layer acts as a masking layer during the process of etching substrate 801 to a depth h. The etch depth h preferably ranges from few microns to tens of microns depending on the cross-sectional size of the micro-element and the application. This masking layer 802 can be Cr, Ni, NiCr, Al, silicon, photoresist or another suitable material. FIG. 8C shows a cross section view of optical element array 804 after etching substrate 801 to a depth h in the areas that have no masking protection using, for example, plasma etch techniques. As shown in FIG. 8C, the masking layer 802 gets etched during the etch process but usually at a lower etch rate than that of the substrate 801. Systems such as Advanced Oxide Etcher (AOE) from Surface Technology Systems (STS) Limited and Magnetic Neutral Loop Discharge (NLD) Etcher from ULVAC Technologies, Inc. are preferably used to perform the etch process especially when fabricating optical element arrays with high aspect ratio h/d (i.e. etch depth over diameter of unmasked area). The masking layer 802 is removed as shown in FIG. 8D using wet etching or plasma etching techniques. The sidewalls of the etched area 803 can have vertical profile (FIG. 8D), straight and positive tilt or V-profile 805 (FIG. 8E) as well as straight and negative tilt 806 (FIG. 8F). Other profiles such as convex or concave profiles are possible. In order to reduce Fresnel reflections and enhance transmission efficiency of light, anti-reflective coating (ARC) may be applied to the front and/or back sides (not shown in FIG. 8) of optical element arrays of FIGS. 8D-8F. FIGS. 8G-8H show optical element arrays 804 with a reflective coating 807 (e.g., a metal layer and/or a dielectric mirror of alternating dielectric layers which have high and low indices of refraction) applied to waveguide sidewalls and areas separating waveguides.

Fabrication method of FIG. 8 can be repeated to make another optical element array on the bottom side of substrate 801. Alignment between top and bottom optical element arrays can be achieved using known double side alignment techniques. In addition, it is possible to repeat this fabrication method of FIG. 8 to make lensed waveguides (FIGS. 5F-5G) as well as circulation and extraction arrays (FIGS. 6A-6J). In case of lensed waveguides, the fabrication method is used initially to make a micro-lens array then repeated again to make an optical element array. Both of the masking layers used in fabricating the micro-lens array and the optical element array require alignment. Simplicity and precision of alignment in this method allows its use for fabricating lens arrays with millions of micro-lenses on both sides of a single plate or substrate rather than using one plate for each lens array with a limited number (e.g., tens or hundreds) of lenses per plate. This fabrication advantage also applies to known lens arrays such as those of FIG. 5A-5B.

Fabrication method of FIG. 8 can be utilized to make micro-tunnel arrays if appropriate masking patterns are used and the etch step is performed all the way through the substrate. For example, image reversing the masking pattern of FIG. 8B used in case of making an optical element array 804 coupled with an etch through step results in a micro-tunnel array 808 of FIG. 8I. Both sides of the substrate 801 and the micro-tunnel 808 sidewalls are then coated with a reflective layer 807 as shown in FIG. 8J.

Figure 9A:
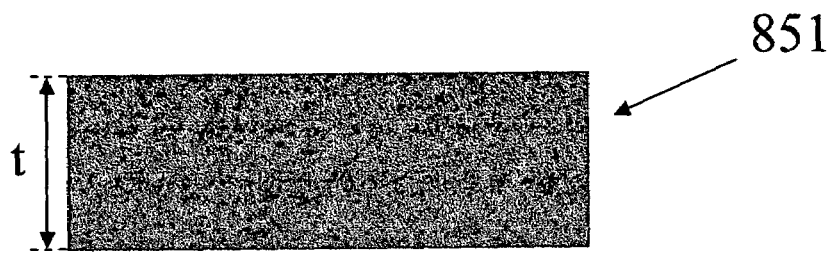
FIGS. 9A-9J are cross-sectional views illustrating exemplary fabrication steps for the optical element arrays using photosensitive etchable glass.
Figure 9B:
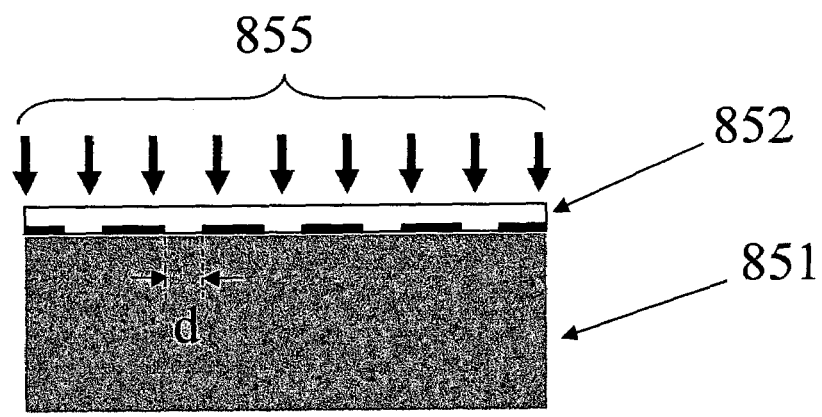
Figure 9C:
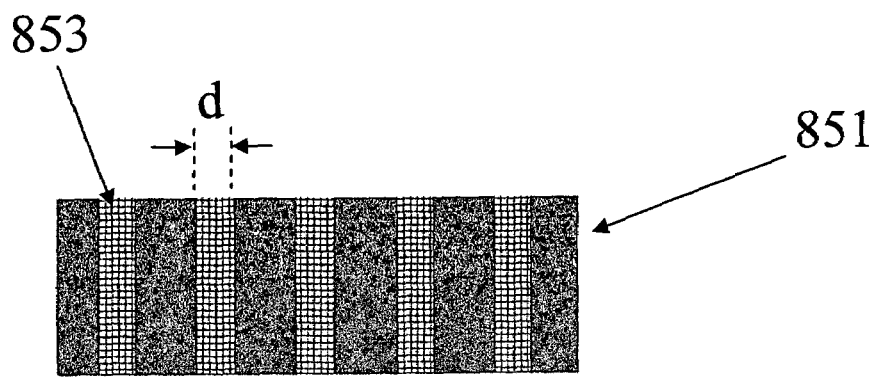

FIGS. 9A-9H show a fabrication method for optical element arrays of FIGS. 4, 5, 6 and 7 utilizing photosensitive etchable glass. FIG. 9A shows a cross-sectional view of a substrate 851. The substrate 851 is optically transparent with optically smooth surfaces and made of a photosensitive glass such as HOYA PEG3 from Hoya Optics and Foturan® produced by Schott Glass, Inc. The substrate 851 is exposed to ultraviolet light 855 through a patterned mask 852 as shown in FIG. 9B. The substrate 851 is treated with heat in order to crystallize the exposed part of the substrate. The crystallized part 853 of the substrate is shown in FIG. 9C.

Figure 9D:
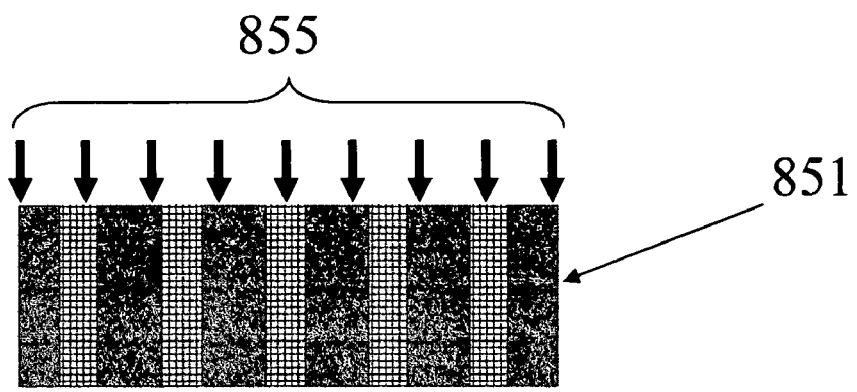
Figure 9E:
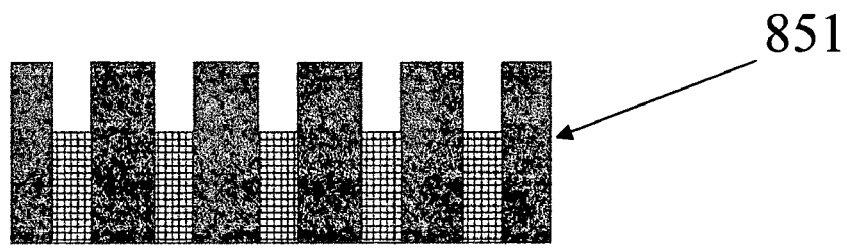
Figure 9F:
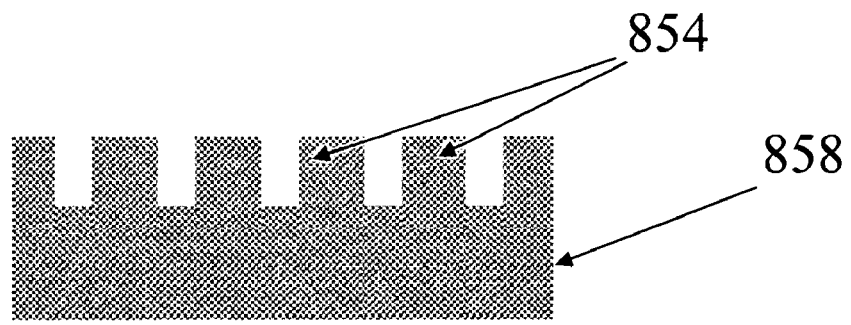
Figure 9G:
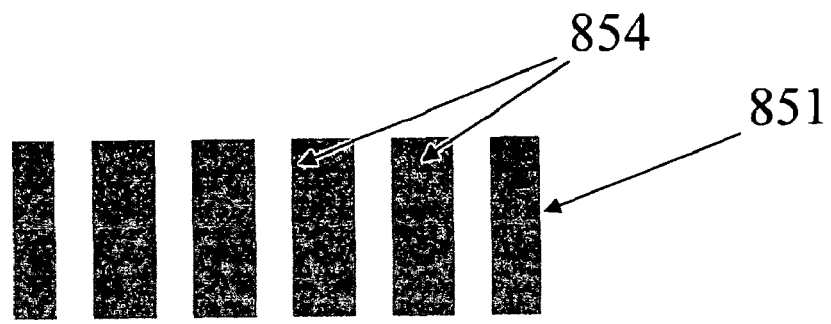
Figure 9H:
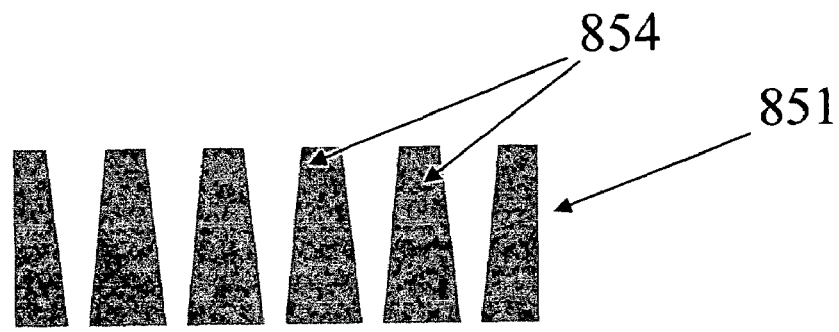
Figure 9I:
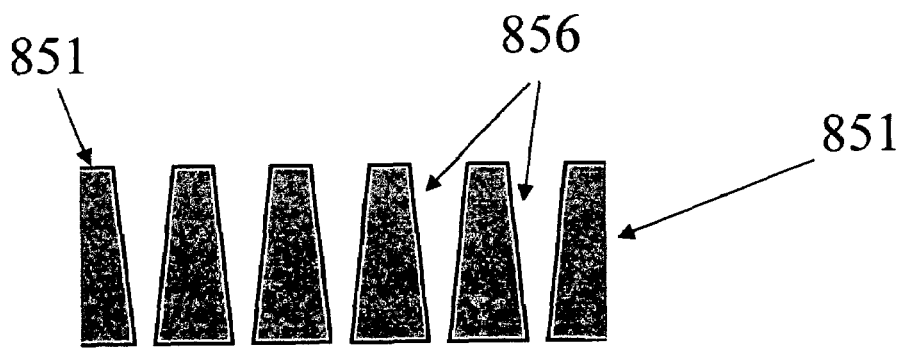
Figure 9J:
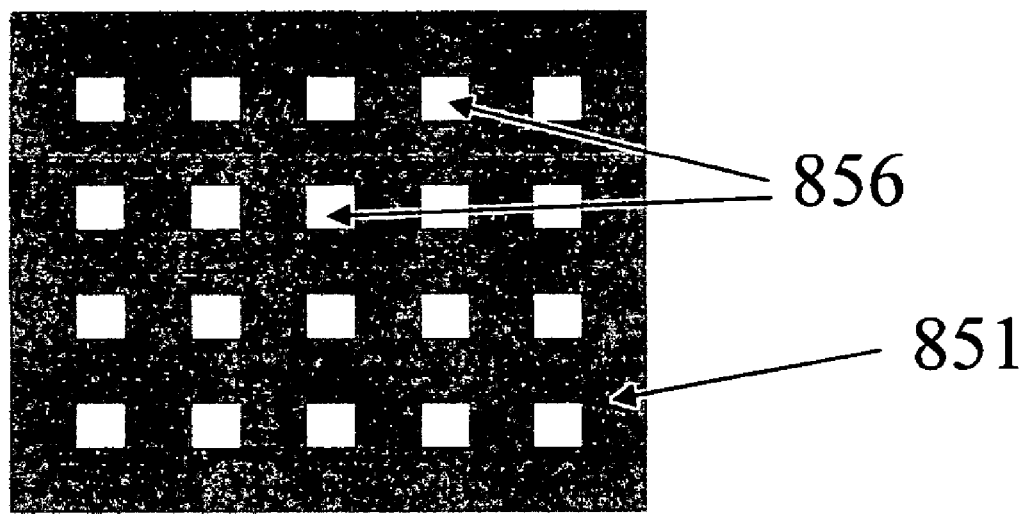

The substrate 851 is then exposed directly to ultraviolet light 853 without using a patterned mask 852 as shown in FIG. 9D. A timed etching step is then performed to remove part of the crystallized region 853 of the substrate 851 as shown in FIG. 9E. A second heat treatment is performed on the substrate 851 resulting in a substrate 858 and optical element array 854 which are not sensitive to ultraviolet light (FIG. 9F). Top and/or bottom sides of the substrate 858 can be coated with anti-reflective (ARC) layers. FIGS. 9A-9D coupled with FIGS. 9G-9J show fabrication steps of a micro-tunnel array 856 rather than a solid optical element array utilizing photosensitive etchable glass. In this case, mask pattern is a reversed image of that used in mask 852 of FIG. 9A and fabrication steps of FIGS. 9A-9D remain the same. The second ultraviolet exposure step (FIG. 9D) may be skipped and after the crystallization step (FIG. 9C), the crystallized region 853 of the substrate 851 is etched through as shown in FIG. 9G. As shown in FIG. 9H, the sidewalls of the etched micro-tunnels may be tapered. A plan view of the substrate 851 at this stage is shown in FIG. 9J. Both sides of the substrate 851 and the micro-tunnel 856 sidewalls are then coated with a reflective layer 851 as shown in FIG. 9I.

Figure 10A:
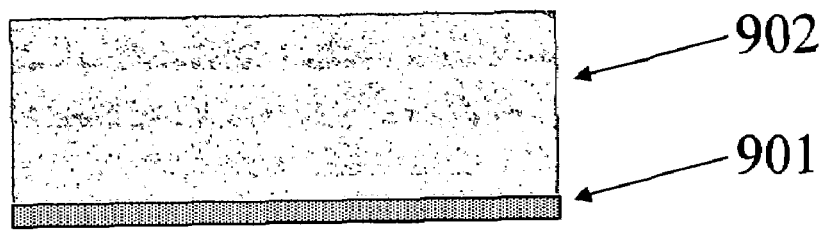
FIGS. 10A-10G are cross-sectional views illustrating exemplary fabrication steps of a metal mold and an optical element array using both spin-on glass and LIGA processes.
Figure 10B:
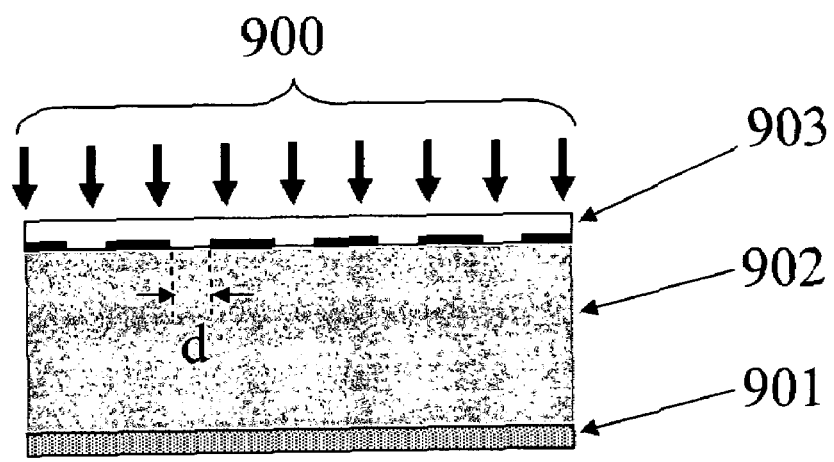
Figure 10C:
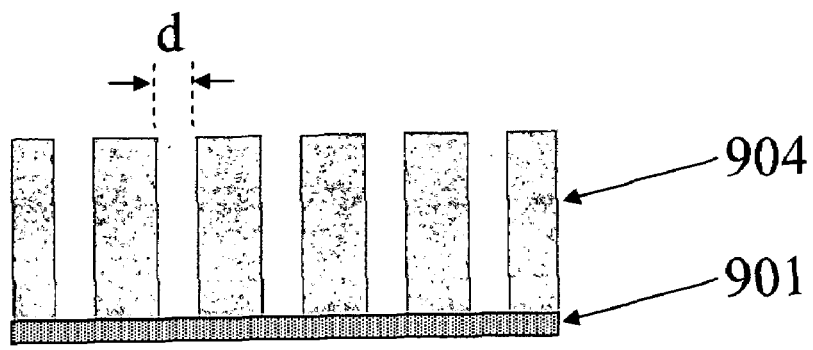
Figure 10D:
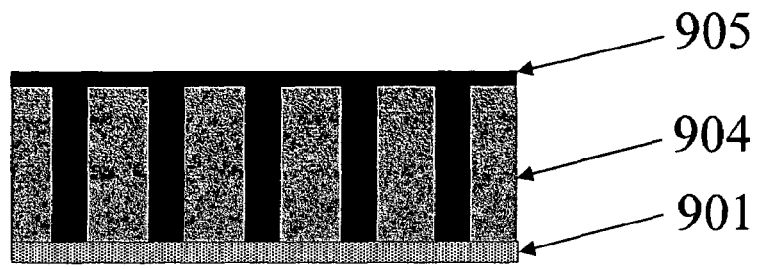
Figure 10E:
Figure 10F:
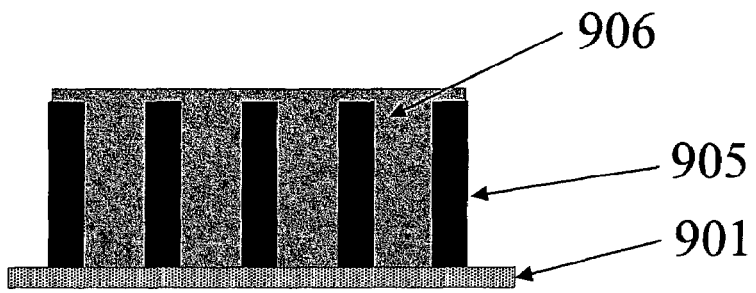
Figure 10G:
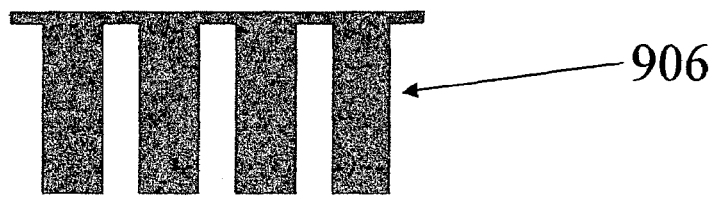

Another fabrication method of optical element arrays of FIGS. 4, 5, 6 and 7 is shown in FIGS. 100A-10G. In this method, molding of thermoplastic materials and polymers in a metal mold is used to replicate optical element arrays. Molding techniques such as injection molding and hot embossing can be used. The metal mold (i.e. the original structure or the master) can be fabricated by several means such as laser etching, laser lithography and electroforming, and chemical etching. FIGS. 10A-10G show the fabrication of a metal mold using both spin-on glass (SOG) and LIGA processes. LIGA process is a combination of synchrotron radiation lithography, electroforming and micromolding (in German: Lithographie, Galvanoformung, Abformung). FIG. 10A shows a substrate 901 such as silicon bonded to an x-ray sensitive material 902 such as polymethyl methacrylate (PMMA). The PMMA sheet 902 is exposed to deep x-ray radiation 900 through a patterned x-ray mask 903 as shown in FIG. 10B. A PMMA mold 904 is formed after development of the PMMA sheet as shown in FIG. 10C. A negative Ni mold 905 is formed in the PMMA mold 904 using Ni electroforming as shown in FIG. 10D. FIG. 10E shows the Ni mold 905 after surface planarization and PMMA removal. SOG is applied to the Ni mold 905 as shown in FIG. 10F. Finally, the Ni mold 905 is dissolved by reverse electroplating releasing the optical element array 906 (i.e. SOG structure) as shown in FIG. 10G. More details of this method are discussed by Robin H. Liu et al. in a paper published in the Journal of Microelecromechanical Systems, Vol. 8, No. 2, June 1999, which is hereby incorporated by reference. Top and/or bottom sides of the array 906 can be coated with a reflective layer and/or anti-reflective (ARC) layers. Fabrication method of FIG. 10 can be utilized to make micro-tunnel arrays if appropriate masking patterns are used and a reflective coating can be applied to both sides of the final array including sidewalls of micro-tunnels. This method combined with other fabrication methods of this disclosure can be used to make optical element arrays of FIGS. 6A-6J.

Figure 11A:
FIGS. 11A-11D are cross-sectional views illustrating exemplary fabrication steps of an optical element array using methods that allow the creation of a refractive index profile in a substrate.
Figure 11B:
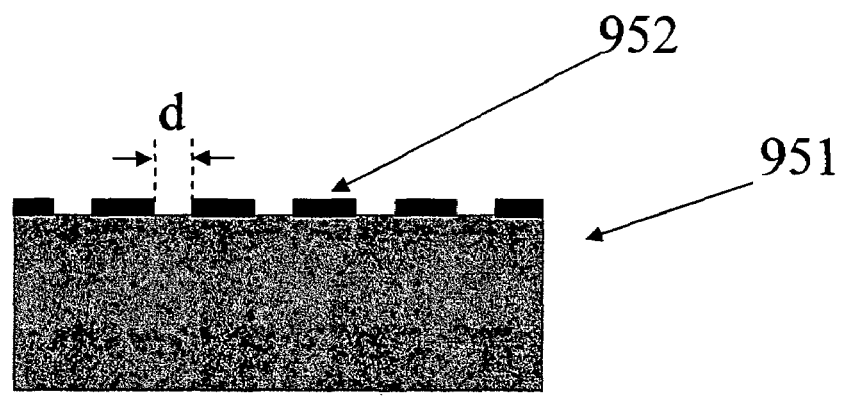
Figure 11C:
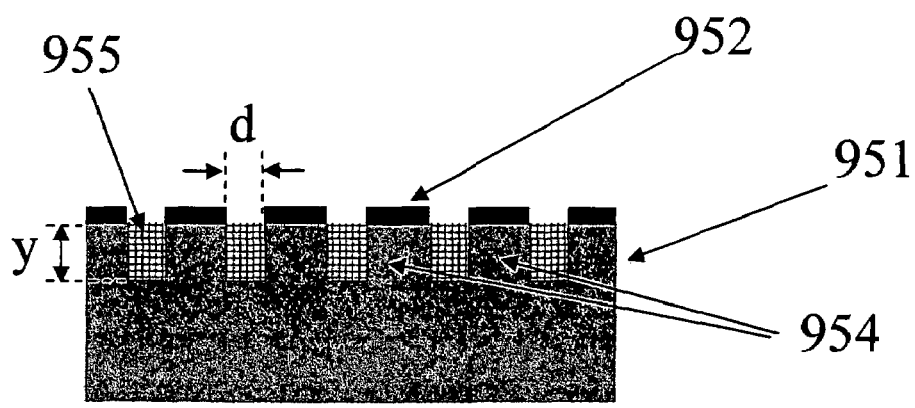
Figure 11D:
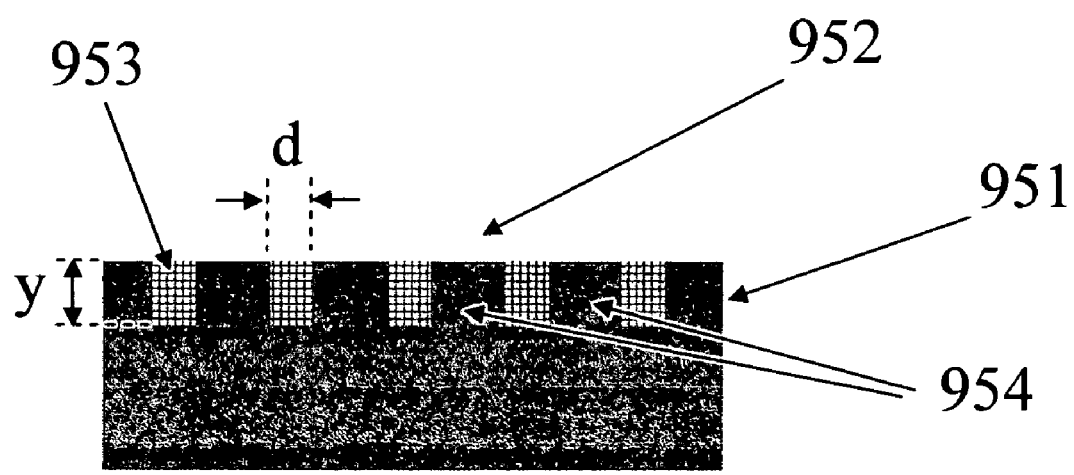

FIGS. 11A-11D show another fabrication method for optical element arrays of FIGS. 4-7. This method is preferably used to make micro-lens arrays or waveguides, which are preferably up to few microns deep. FIG. 11A shows a cross-sectional view of a substrate 951. The substrate 951 has a thickness t and is preferably made of an optically transparent material such as glass (Pyrex, quartz, corning 1737F) and polymers (PMMA, PC, Arton, Zeonor) with optically smooth surfaces. A layer 952 such as silicon oxide, silicon nitride, Cr, Ni, or photoresist is deposited on top of substrate 951 and patterned as shown in FIG. 11B. This patterned layer 952 defines the optical element array 954. An ion implantation and/or diffusion steps are subsequently performed leading to ions penetrating the substrate 951 surface in areas not covered by layer 952 to a depth y smaller than the substrate 951 thickness t as shown in FIG. 11C. Layer 952 acts as an implantation or diffusion stop preventing ions from penetrating areas of the substrate 951 located below layer 952 during the implantation or diffusion process. Layer 952 is then removed resulting in an optical element array 954 as shown in FIG. 11D. The index of refraction of these implanted regions 955 is decreased (or increased) in comparison to the non-implanted regions of the substrate 951. In addition to ion implantation and/or diffusion, other techniques can be used to create refractive index profiles in a substrate 951. For example, a glass substrate can be dipped in a molten salt, where metal ions such as alkaline ions are exchanged between the glass substrate 951 and the molten salt leading to a glass substrate which has a refractive index profile corresponding to a mask pattern 952. Top and/or bottom sides of the substrate 951 can be coated with a reflective layer and/or anti-reflective (ARC) layers. Two or more of the previous fabrication methods (FIGS. 8-11) can be combined to fabricate optical element arrays of this invention.

Figure 12C:
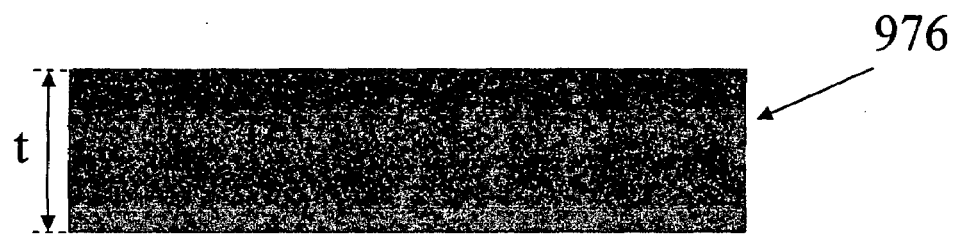
FIGS. 12C-12G are cross-sectional views illustrating exemplary fabrication steps of the optical element array of FIGS. 12A-12B utilizing isotropic wet etch techniques.
Figure 12D:
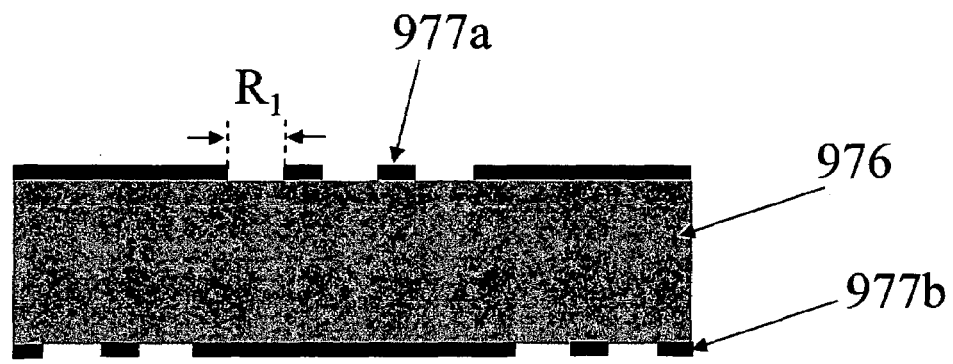
Figure 12E:
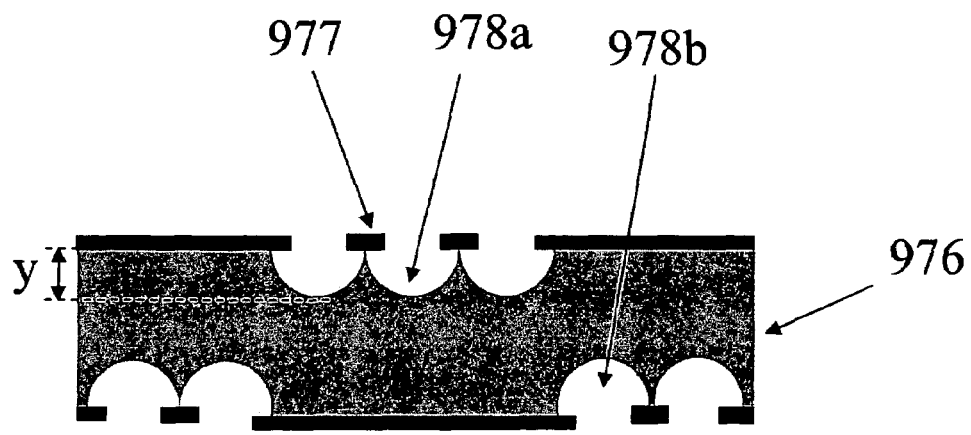
Figure 12F:
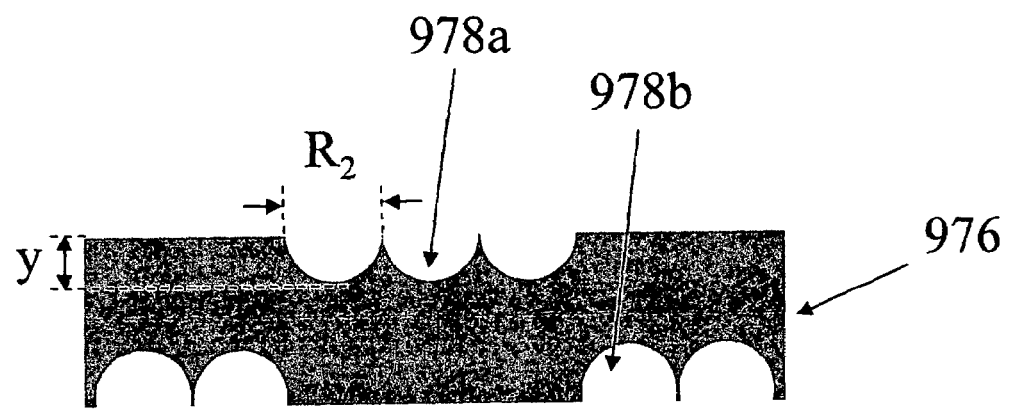
Figure 12G:
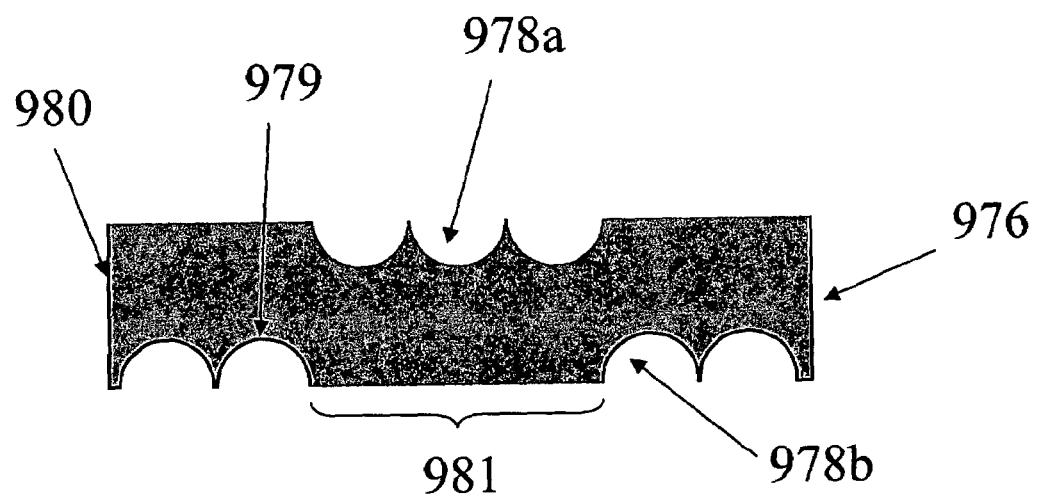

FIGS. 12C-12G show another fabrication method for optical element array 975 of FIGS. 12A-12B utilizing isotropic wet etch techniques. The front and back sides of array 975 are shown in FIGS. 12A and 12B, respectively. FIG. 12C shows a cross-sectional view of a substrate 976 taken along line C of FIGS. 12A-12B. The substrate 976 has a thickness t and is preferably made of an optically transparent material such as glass with optically smooth surfaces. A layer such as silicon nitride, Cr, Ni, or photoresist is deposited on top and bottom of substrate 976 and patterned as shown in FIG. 12D. This patterned layers 977a and 977b define arrays 978a and 978b. An isotropic wet etch step is subsequently performed resulting in an etch profile of size $R_2$ and depth y as shown in FIGS. 12E-12F. Such wet etch techniques include the use of fluoride-based aqueous etching for Pyrex substrates and the use of buffered oxide etch (BOE) for fused silica substrates. Layers 977a and 977b are then removed resulting in an optical element array 975 as shown in FIG. 12F. Sidewalls and part of backside of the substrate 976 are coated with reflective layers 979 and 980 as shown in FIG. 12G. Anti-reflective (ARC) layers may be applied to non-metallized sides of the substrate prior or after the application of the reflective layers 979 and 980. Two or more of the previous fabrication methods (FIGS. 8-12) can be combined to fabricate optical element arrays of this invention.

Figure 13A:
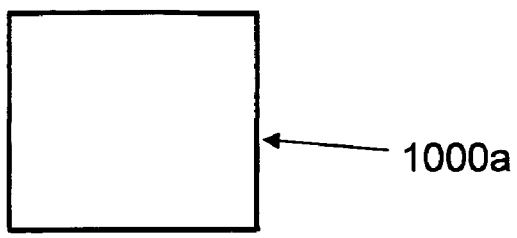
FIGS. 13A-13E illustrate an exemplary assembly process for a homogenizer.
Figure 13B:
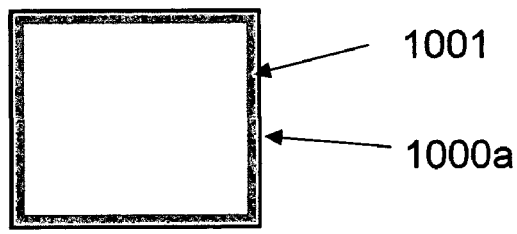
Figure 13C:
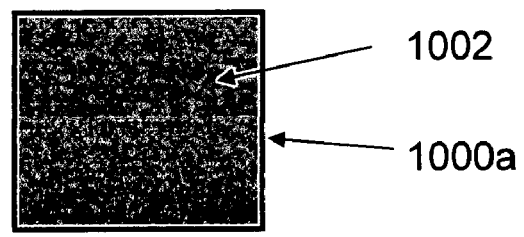
Figure 13D:
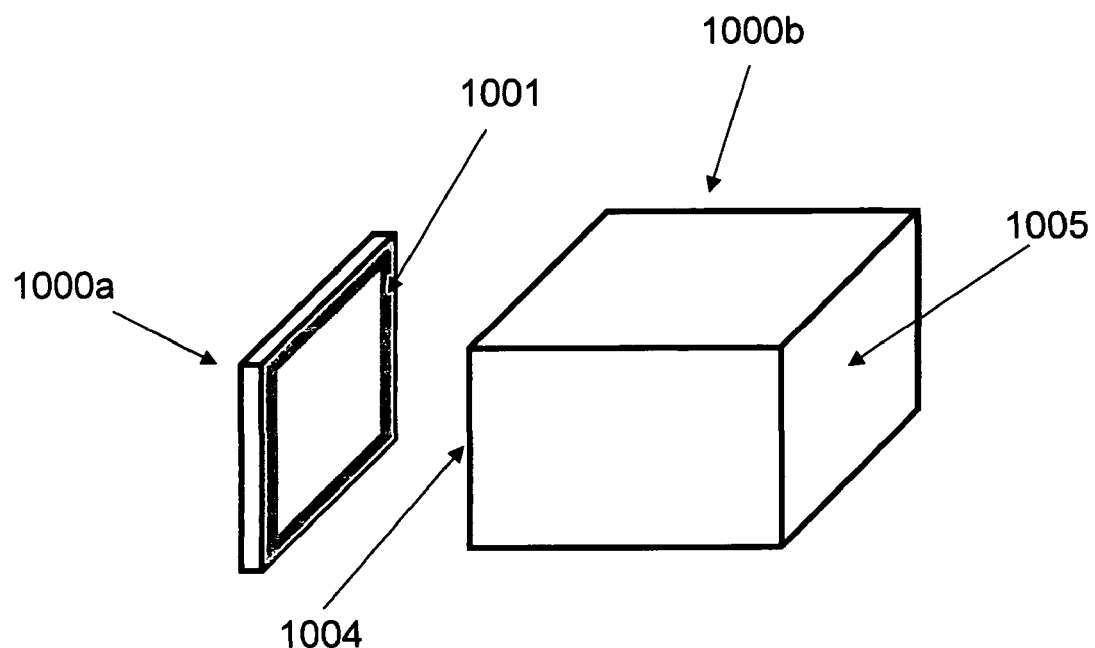
Figure 13E:
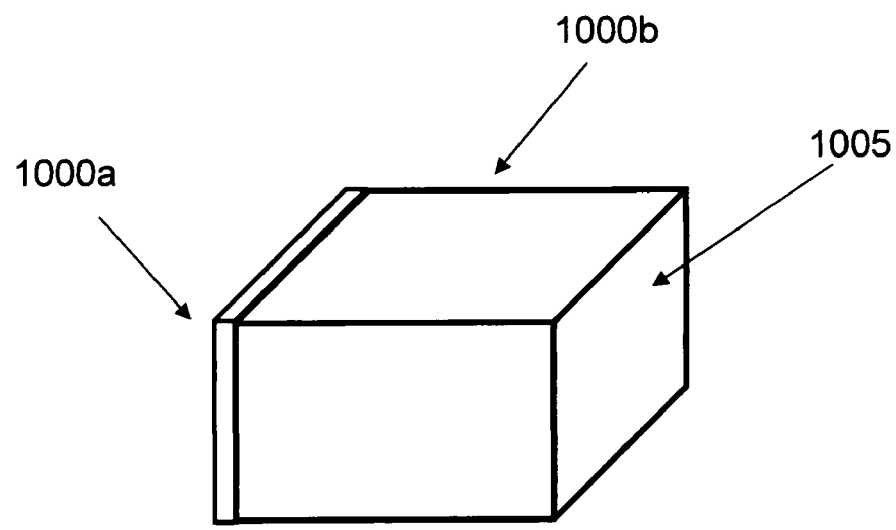

The assembly of homogenizers of FIGS. 2A, 2C, 3A, 3C and FIG. 7B is shown in FIGS. 13A-13E. Optical element array 1000a is shown in FIG. 13A. A thin layer of an optically transmissive adhesive 1001 and 1002 is applied to part (FIG. 13B) or all (FIG. 13C) of surface area of optical element arrays 1000a Adhesive 1001 is applied to the circumference of the array 1000a, thus, it can be optically non-transmissive. The application of the adhesive 1001 and 1002 is not limited to the ways shown in FIGS. 13B-13C and can have other configurations such as using adhesive dots rather than lines near the corners and/or near the center of the array 1000a. In general, any combinations of adhesive lines, circles, . . . etc. can be used to apply the adhesive to the array 1000*a*. After the application of the adhesive 1001 and 1002 to the array 1000*a*, the array 1000*a* is bonded to aperture 1004 of light guide (or light tunnel) 1000*b* then adhesive 1001 is cured. FIGS. 13D and 13E show perspective views of the homogenizer before bonding the array 1000*a* to light guide 1000*b* and after bonding/curing the adhesive, respectively. Light guide 1000*b* can be solid light guide made of optically transmissive material such as glass with polished surfaces or hollow light guide with reflective sidewalls and can also be straight (FIG. 1C) or tapered (FIG. 1D) light guide with entrance and/or exit apertures of any shape. The assembly process shown in FIGS. 13A-13E can be used to bond another optical element array to aperture 1005 of light guide 1000*b*.

Optical element arrays and homogenizers disclosed herein have broad applications, including, but not limited to, projection displays such as projectors, projection TV, digital TV, home theater and monitors; direct-view displays and micro-displays used in gaming consoles, camcorders, cameras, cell phones, internet appliances, and headsets; lithography and photomask generation equipment; laser thermal processing; microscopy; fiber optic illumination; medical instrumentation and portable patient monitoring; GPS/navigation units; indicators on a car's dashboard; barcode scanners and test-and-measurement equipment.

While various embodiments of the invention have been described, it will be apparent to those of ordinary skill in the art that more embodiments and implementations, other than those specifically described above, are possible that are within the scope of this invention. Further, the foregoing summary, detailed description, drawings and embodiments described above are considered as illustrative only of the principles of the invention and are not intended to limit the scope of the invention. Since other modifications and changes may be or become apparent to those skilled in the art, the invention is thus not limited the exact embodiments shown and described above, and accordingly, all suitable modifications and equivalents are deemed to fall within the scope of the invention, as it is defined by the claims below.

What is claimed is:

1. A projection system, comprising:
   a light source;
   a homogenizer receiving light from the light source and outputting light having a predetermined cone angle and a predetermined intensity, the homogenizer comprising:
      an optically transmissive substrate having an entrance surface and an exit surface, and
      a substantially planar optical element array formed on the substrate's exit surface, the array having a plurality of optical micro-elements including a first group of optical micro-elements configured to pass a predetermined first portion of light incident on the substrate's exit surface and a second group of optical micro-elements configured to return a predetermined second portion of the incident light back into the substrate; and
   a display panel having a plurality of pixels for selectively outputting light output from the optical element array.

2. The projection system of claim 1, wherein homogenizer is configured to circulate the predetermined second portion of the incident light within the optically transmissive substrate until the predetermined second portion of the incident light exits through the optical micro-elements of the array or otherwise leaves the homogenizer.

3. The projection system of claim 1, further comprising a second substantially planar optical element array formed on the substrate's entrance surface, the second substantially planar optical element array having a plurality of optical micro-elements.

4. The projection system of claim 3, wherein at least some of the optical micro-elements of the second substantially planar optical element array are configured to output light having a greater cone angle than the cone angle of input light incident on the second substantially planar optical element array.

5. The projection system of claim 3, wherein at least some of the optical micro-elements of the second substantially planar optical element array are configured to recycle the predetermined second portion of the incident light back into the optically transmissive substrate.

6. The projection system of claim 3, wherein the homogenizer further comprises:
   a light guide between the arrays of optical micro-elements.

7. The projection system of claim 3, wherein the homogenizer further comprises:
   a third substantially planar array of optical micro-elements formed on an entrance surface of a second optically transmissive substrate receiving light output from the array of optical micro-elements on the exit surface of the first transmissive substrate, the third array of optical micro-elements being configured to direct light output from the array of optical micro-elements on the exit surface in a direction substantially perpendicular to the exit aperture of the third array of optical micro-elements.

8. The projection system of claim 1, wherein at least some of the optical micro-elements included in the array are coated with a reflective layer.

9. The projection system of claim 1, wherein the first and second groups of the optical elements are arranged in predetermined spatial distributions on the exit surface of the substrate.

10. The projection system of claim 1, wherein the homogenizer further comprises:
    a light guide receiving light output from the substrate's exit surface.

11. The projection system of claim 1, wherein the optical micro-elements are selected from the group consisting of lenses, prisms, optical waveguides, and any suitable combination of the foregoing.

12. The projection system of claim 1, further comprising:
    a reflector for reflecting light from the light source toward the homogenizer.

13. The projection system of claim 1, further comprising:
    relay optics for directing the light output from the optical element array onto the display panel.

14. The projection system of claim 1, further comprising:
    a projection lens receiving light output from the display panel.

15. The projection system of claim 14, further comprising:
    a field lens located between the display panel and the projection lens, passing light from the display panel to the projection lens.

16. The projection system of claim 14, further comprising:
    a screen receiving light output from the projection lens.

17. The projection system of claim 1, wherein the light source includes a plurality of individual light sources.

* * * * *